United States Patent
Sagawai

(10) Patent No.: US 10,908,737 B2
(45) Date of Patent: Feb. 2, 2021

(54) INPUT DEVICE, ELEMENT DATA CONFIGURATION METHOD, AND PROGRAM

(71) Applicant: ALPS ALPINE CO., LTD., Tokyo (JP)

(72) Inventor: Shinichi Sagawai, Miyagi-ken (JP)

(73) Assignee: ALPS ALPINE CO., LTD., Tokyo (JP)

(*) Notice: Subject to any disclaimer, the term of this patent is extended or adjusted under 35 U.S.C. 154(b) by 0 days.

(21) Appl. No.: 16/583,380

(22) Filed: Sep. 26, 2019

(65) Prior Publication Data
US 2020/0026409 A1 Jan. 23, 2020

Related U.S. Application Data

(63) Continuation of application No. PCT/JP2018/008555, filed on Mar. 6, 2018.

(30) Foreign Application Priority Data

Mar. 31, 2017 (JP) .................................. 2017-072051

(51) Int. Cl.
*G06F 3/044* (2006.01)
*G06F 3/041* (2006.01)

(52) U.S. Cl.
CPC ........ *G06F 3/04186* (2019.05); *G06F 3/0446* (2019.05); *G06F 3/041* (2013.01); *G06F 3/0445* (2019.05); *G06F 2203/04101* (2013.01)

(58) Field of Classification Search
CPC ........ G06F 3/041; G06F 3/044; G06F 3/0354; G06F 3/03547; H03K 17/955
(Continued)

(56) References Cited

U.S. PATENT DOCUMENTS 9,658,723 B2* 5/2017 Guarneri ................. G06F 3/044
9,841,859 B2* 12/2017 Besshi .................... G06F 3/038
(Continued)

FOREIGN PATENT DOCUMENTS

WO 2016/021356 2/2016

OTHER PUBLICATIONS

Non-Final Office Action dated Feb. 6, 2020 in co-pending U.S. Appl. No. 16/282,570.

*Primary Examiner* — Jason M Mandeville
(74) *Attorney, Agent, or Firm* — Hunton Andrews Kurth LLP

(57) ABSTRACT

A data configuration process is repeatedly performed at least twice, and a sum of a value obtained by multiplying a difference between a first temporary value $(PA_j^{t-1})$ of element data obtained by the first data configuration process and a second temporary value $(PA_j^{t-2})$ of the element data obtained by the second data configuration process by a predetermined proportionality coefficient γ and the first temporary value $(PA_j^{t-1})$ is calculated for each of M sections $A_1$ to $A_M$ as values approximated to a convergence value of the element data. By this, the number of times the data configuration process is repeatedly performed is considerably reduced when compared with a case where a convergence value of element data is obtained by repeatedly performing the data configuration process a number of times.

20 Claims, 30 Drawing Sheets

(58) Field of Classification Search
USPC .......................................................... 345/173
See application file for complete search history.

(56) References Cited

U.S. PATENT DOCUMENTS

| | | | |
|---|---|---|---|
| 9,946,397 B2* | 4/2018 | Dorfner | G06F 3/0446 |
| 10,083,287 B2* | 9/2018 | Kwon | G06F 21/83 |
| 10,761,666 B2* | 9/2020 | Sagawai | G06F 3/041 |
| 2015/0002461 A1* | 1/2015 | Guarneri | G06F 3/04886 |
| | | | 345/174 |
| 2016/0170530 A1* | 6/2016 | Lee | G06F 3/0416 |
| | | | 345/174 |
| 2017/0061108 A1* | 3/2017 | Kwon | G06F 3/0416 |
| 2019/0187838 A1* | 6/2019 | Sagawai | G06F 3/03547 |

* cited by examiner

FIG. 3

$$P_1 \quad P_2 \quad \cdots \quad P_j \quad \cdots \quad P_M$$
$$\| \quad \| \quad \| \quad \|$$
$$S_1 = U_{11} + U_{12} + \cdots + U_{1j} + \cdots + U_{1M}$$
$$+ \quad + \quad + \quad +$$
$$S_2 = U_{21} + U_{22} + \cdots + U_{2j} + \cdots + U_{2M}$$
$$+ \quad + \quad + \quad +$$
$$\vdots \quad \vdots \quad \vdots \quad \vdots \quad \vdots$$
$$+ \quad + \quad + \quad +$$
$$S_i = U_{i1} + U_{i2} + \cdots + U_{ij} + \cdots + U_{iM}$$
$$+ \quad + \quad + \quad +$$
$$\vdots \quad \vdots \quad \vdots \quad \vdots \quad \vdots$$
$$+ \quad + \quad + \quad +$$
$$S_N = U_{N1} + U_{N2} + \cdots + U_{Nj} + \cdots + U_{NM}$$

FIG. 4

$$S_1 = P_1 \times K_{11} + P_2 \times K_{12} + \cdots + P_j \times K_{1j} + \cdots + P_M \times K_{1M}$$
$$S_2 = P_1 \times K_{21} + P_2 \times K_{22} + \cdots + P_j \times K_{2j} + \cdots + P_M \times K_{2M}$$
$$\vdots$$
$$S_i = P_1 \times K_{i1} + P_2 \times K_{i2} + \cdots + P_j \times K_{ij} + \cdots + P_M \times K_{iM}$$
$$\vdots$$
$$S_N = P_1 \times K_{N1} + P_2 \times K_{N2} + \cdots + P_j \times K_{Nj} + \cdots + P_M \times K_{NM}$$

FIG. 5

$$SA_1 = PA_1 \times K_{11} + PA_2 \times K_{12} + \cdots + PA_j \times K_{1j} + \cdots + PA_M \times K_{1M}$$

$$SA_2 = PA_1 \times K_{21} + PA_2 \times K_{22} + \cdots + PA_j \times K_{2j} + \cdots + PA_M \times K_{2M}$$

$$\vdots$$

$$SA_i = PA_1 \times K_{i1} + PA_2 \times K_{i2} + \cdots + PA_j \times K_{ij} + \cdots + PA_M \times K_{iM}$$

$$\vdots$$

$$SA_N = PA_1 \times K_{N1} + PA_2 \times K_{N2} + \cdots + PA_j \times K_{Nj} + \cdots + PA_M \times K_{NM}$$

INPUT DEVICE, ELEMENT DATA CONFIGURATION METHOD, AND PROGRAM

CLAIM OF PRIORITY

This application is a Continuation of International Application No. PCT/JP2018/008555 filed on Mar. 6, 2018, which claims benefit of Japanese Patent Application No. 2017-072051 filed on Mar. 31, 2017. The entire contents of each application noted above is incorporated herein by reference.

BACKGROUND OF THE INVENTION

1. Field of the Invention

The present invention relates to an input device which is used to input information in an information apparatus, such as a computer or a smartphone, and particularly, relates to an input device which is used to specify a region to which an object, such as a finger or a pen, approaches an operation plane, and which inputs information based on the specified region.

2. Description of the Related Art

Input devices, such as a touch pad or a touch panel, which are used to input information by specifying a contact position of a finger in accordance with a change of an electrostatic capacitance generally employ an image sensing method for simultaneously detecting a plurality of contact positions.

Furthermore, examples of a method for detecting a change of an electrostatic capacitance include a mutual capacitance method for detecting a change of an electrostatic capacitance between two electrodes and a self-capacitance method for detecting an electrostatic capacitance between an electrode and the ground. In a case where a hovering function of detecting an operation of a finger separated from an operation plane is to be realized, a sensor of the self-capacitance method which has high detection sensitivity of an electrostatic capacitance is advantageously used.

However, in a general self-capacitance type sensor, one electrode detects an electrostatic capacitance only in one location, and therefore, if this sensor is employed in an image sensing method, the higher a resolution is, the larger the number of electrodes is. To address this problem, according to International Publication No. WO2016/021356, an input device which configures electrostatic capacitance data (element data) in each of a plurality of sections set on an operation plane based on electrostatic capacitance data (detection data) detected by a smaller number of electrodes than a number of sections is disclosed.

SUMMARY OF THE INVENTION

In the input device disclosed in International Publication No. WO2016/021356, a data configuration process is repeatedly performed to configure m pieces of element data by using n pieces of detection data (m>n). In each data configuration process, temporary detection data is calculated by using temporary element data, and the temporary element data is corrected based on a comparison between the temporary detection data and actual detection data. As the number of repeating times of the data configuration process is increased, accuracy of configured element data is improved. However, in terms of reduction of a calculation load, it is desirable that the number of repeating times of the data configuration process is reduced.

The present invention is made in consideration of such a situation, and provides an input device capable of configuring element data indicating degrees of proximity of an object in a plurality of sections on an operation plane by a simple calculation using a smaller number of detection data than a number of the sections, a method for configuring the element data, and a program.

Solution to Problem

According to a first aspect of the present invention, an input device which inputs information corresponding to proximity of an object to an operation plane is provided. The input device includes a sensor unit configured to detect a degree of proximity of the object in one or more detection regions on the operation plane, generate one or more pieces of detection data corresponding to a result of the detection for each detection region, and generate N pieces of detection data as a whole, and an element data configuration unit configured to configure, based on the N pieces of detection data, M pieces of element data indicating degrees of proximity of the object in each of M sections (M is a natural number larger than N) which virtually divide the operation plane. Each of the M sections has at least one overlapping portion which overlaps with the detection region. Each of the M pieces of element data is a sum of partial element data distributed to each of the N pieces of detection data in predetermined rates. Each of the N pieces of detection data is approximated to a sum of the partial element data individually distributed from each of the M pieces of element data in the predetermined rates. The element data configuration unit calculates each of temporary values of the N pieces of detection data as sums of the partial element data distributed from each of temporary values of the M pieces of element data in the predetermined rates and repeatedly performs a data configuration process of correcting the temporary values of the M pieces of element data at least twice based on the N predetermined rates set for the individual M pieces of element data so that the calculated temporary values of the N pieces of detection data are approximated to the N pieces of detection data. Further, the element data configuration unit calculates, based on two temporary values obtained by the data configuration process performed twice on each of the M pieces of element data, a coefficient having an absolute value which becomes small as a difference between the two temporary values in the element data becomes large, and calculates, with respect to each of the M sections, a sum of a value obtained by multiplying a difference between a first temporary value of the element data obtained by the first data configuration process and a second temporary value of the element data obtained by the second data configuration process by the coefficient and the first temporary value as an estimation value of the element data obtained by repeatedly performing the data configuration process.

With this configuration, each of the M sections which virtually divide the operation plane has an overlapping portion which overlaps with at least one detection region, and the sensor unit generates at least one piece of detection data for each detection region. Therefore, at least one piece of detection data indicating a degree of proximity of the object is generated for each of the M sections.

Furthermore, each of the M pieces of element data is a sum of partial element data distributed to each of the N pieces of detection data in predetermined rates, and each of the N pieces of detection data is approximated to a sum of the partial element data distributed in the predetermined rates from each of the M pieces of element data. Specifically, conversion from the M pieces of element data into the N pieces of detection data is specified in accordance with the N predetermined rates set to each of the M pieces of element data.

In the data configuration process, temporary values of the N pieces of detection data are individually calculated as a sum of the partial element data distributed in the predetermined rates from the individual temporary values of the M pieces of element data. Furthermore, temporary values of the M pieces of element data are corrected based on the N predetermined rates set for each of the M pieces of element data so that the calculated temporary values of the N pieces of detection data become close to the N pieces of detection data. By repeatedly performing the data configuration process a number of times, a convergence value of the element data suitable for the N pieces of detection data may be obtained.

However, the element data configuration unit repeatedly performs the data configuration process at least twice so as to calculate a sum of a value obtained by multiplying a difference between a first temporary value of the element data obtained by the first data configuration process and a second temporary value of the element data obtained by the second data configuration process by the coefficient and the first temporary value as an estimation value of the element data obtained by repeatedly performing the data configuration process. Accordingly, calculation is simplified compared with a case where a convergence value of the element data is obtained by repeatedly performing the data configuration process a number of times.

Furthermore, the estimation value of the element data obtained as a sum of the value obtained by multiplying the difference between the first temporary value and the second temporary value by the coefficient and the first temporary value has a certain degree of error relative to the convergence value of the element data obtained by repeatedly performing the data configuration process a number of times. The coefficient which minimizes the error has a tendency to have an absolute value which becomes smaller as the difference between the two temporary values becomes larger in the element data. Accordingly, by calculating the coefficient such that the absolute value becomes small as the difference between the two temporary values becomes large in each of the element data based on the two temporary values obtained by the data configuration process performed twice on each of the M pieces of element data, the error may be reduced compared with a case where the coefficient is set to a fixed value.

Preferably, the element data configuration unit may calculate an evaluation value corresponding to a difference degree between the two temporary values of each of the M pieces of element data and obtain a value of a predetermined function using the evaluation value as a variable as the coefficient.

By this, the optimum coefficient corresponding to a difference degree of the two temporary values in each of the M pieces of element data may be obtained.

Preferably, the evaluation value may be increased as the difference degree of the two temporary values of each of the M pieces of element data is increased. In the predetermined function, an absolute value of a derivative in a range in which the evaluation value is smaller than a threshold value may be larger than an absolute value of a derivative in a range in which the evaluation value is larger than the threshold value.

As a distance between the objects approaching the operation plane 11 is reduced, a difference degree of the two temporary values in each of the M pieces of element data P tends to be small. Furthermore, when the distance between the objects is short, a boundary between the objects has a tendency to be clarified by increasing the coefficient. Therefore, an absolute value of the derivative in the range in which the evaluation value is smaller than the threshold value is made larger than an absolute value of the derivative in the range in which the evaluation value is larger than the threshold value, and thereby, the coefficient is easily increased when the evaluation value is reduced since the distance between the objects is reduced, and accordingly, the boundary between the objects may be clarified.

Preferably, the difference degree may be an absolute value of a difference between the two temporary values. The element data configuration unit may calculate the evaluation value according to a sum of the M difference degrees corresponding to the M pieces of element data. In this case, the predetermined function may be a linear function having a negative inclination. Furthermore, the evaluation value may be increased as the difference degree of the two temporary values of each of the M pieces of element data is increased. In the predetermined function, an absolute value of an inclination in a range in which the evaluation value is smaller than a threshold value may be larger than an absolute value of an inclination in a range in which the evaluation value is larger than the threshold value.

As the distance between the objects approaching the operation plane is reduced, the difference degree of the two temporary values in each of the M pieces of element data tends to be small. Furthermore, when the distance between the objects is short, the boundary between the objects tends to be clarified by increasing the coefficient. Accordingly, an absolute value of the inclination in the range in which the evaluation value is smaller than the threshold value is made larger than an absolute value of the inclination in the range in which the evaluation value is larger than the threshold value, and thereby, the coefficient is easily increased when the evaluation value is reduced since the distance between the objects is reduced, and accordingly, the boundary between the objects is more likely to be clarified.

Preferably, the evaluation value may be changed in accordance with the relative positional relationship between the plurality of objects approaching the operation plane.

Preferably, the two temporary values may be the first and second temporary values.

Accordingly, calculation is simplified as compared with the case where the two temporary values are different from the first and second temporary values.

Preferably, the first temporary value may be a temporary value of the element data obtained by the first data configuration process and the second temporary value may be a temporary value of the element data obtained by the second data configuration process.

Accordingly, since the data configuration process needs to be repeatedly performed only twice, calculation is simplified.

Preferably, the data configuration process may include a first process of converting temporary values of the M pieces of element data into temporary values of the N pieces of detection data based on the N predetermined rates set to each of the M pieces of element data, a second process of calculating N first coefficients indicating magnifications by which temporary values of the N pieces of detection data are to be multiplied so that the temporary values of the N pieces of detection data become equal to the N pieces of detection data, a third process of converting the N first coefficients into M second coefficients indicating magnifications by which the M pieces of element data are to be multiplied based on the N predetermined rates set to each of the M pieces of element data, and a fourth process of correcting the temporary values of the M pieces of element data based on the M second coefficients.

Preferably, in the first process, the element data configuration unit may convert a matrix having temporary values of the M pieces of element data as components into a matrix having temporary values of the N pieces of detection data as components based on a first conversion matrix including M×N components corresponding to the M pieces of element data and the N pieces of detection data, one component corresponding to the predetermined rate associated with the single partial element data distributed to the single detection data from the single element data.

Preferably, in the third process, the element data configuration unit may convert a matrix having the N first coefficients as components into a matrix having the M second coefficients as components based on a second conversion matrix including M×N components corresponding to the M pieces of element data and the N pieces of detection data, one component corresponding to the predetermined rate associated with the single partial element data distributed to the single detection data from the single element data.

Preferably, in the first data configuration process, the element data configuration unit may omit the first process but perform the second process using predetermined N initial values as temporary values of the N pieces of detection data.

Since the first process is omitted, a processing speed is improved.

Preferably, in the first data configuration process, the element data configuration unit may perform the first process using M initial values based on at least a group of M pieces of element data which has been just configured as temporary values of the M pieces of element data.

Since the first process is performed using initial values based on the element data which has been just configured, accuracy of the configured M pieces of element data is improved.

Preferably, the sensor unit may include N electrodes formed in the respectively different detection regions and an electrostatic capacitance detection unit configured to generate detection data corresponding to first electrostatic capacitances in portions between the object approaching the operation plane and the electrodes for each of the N electrodes. The single partial element data may be approximated to a second electrostatic capacitance generated between an overlapping portion of the single electrode in the single section and the object. The single element data may be approximated to a third electrostatic capacitance obtained by combining all the second electrostatic capacitances in the single section.

In this case, each of the predetermined rates may have a value corresponding to a rate of an area of an overlapping portion of a corresponding one of the electrodes in a corresponding one of the sections to an area of overlapping portions of all the electrodes in the corresponding one of the sections.

With this configuration, the element data corresponding to electrostatic capacitances between an overlapping portion of at least one electrode and the object are configured in each of the M sections on the operation plane.

Preferably, the sensor unit may include a plurality of electrodes which are formed in the respectively different detection regions and which have N terminals as a whole, each of the electrodes having a plurality of terminals, and an electrostatic capacitance detection unit configured to receive charges accumulated in portions between an object approaching the operation plane and the electrodes from the N terminals respectively and generate the detection data corresponding to electrostatic capacitances between the object and the electrodes for each of the N terminals based on the received charges. The electrostatic capacitance detection unit may simultaneously input the charges accumulated in one of the electrodes from the plurality of terminals disposed in the electrode. By the simultaneous input, partial charges accumulated in portions between an overlapping portion of the single electrode in the single section and the object may be distributed to each of the plurality of terminals as distribution charges in accordance with conductance in a range from the overlapping portion to each of the plurality of terminals. The single partial element data may be approximated to the distribution charge to be distributed to the single terminal by the simultaneous input. The single element data may be approximated to a combined charge obtained by combining all the partial charges accumulated in the overlapping portions of all the electrodes in the single section.

In this case, each of the predetermined rates may have a value corresponding to a rate of an area of an overlapping portion of a corresponding one of the electrodes in a corresponding one of the sections to an area of overlapping portions of all the electrodes in the corresponding one of the sections and a rate of conductance in a range from one of the terminals in the single electrode to the overlapping portion to conductance in a range from all the terminals in the single electrode to the overlapping portion.

With this configuration, the element data corresponding to the electrostatic capacitances between at least one overlapping portion of the electrode and the object may be configured in each of the M sections on the operation plane. Furthermore, since the plurality of terminals are disposed on the single electrode and single detection data is generated for each terminal, the number of electrodes becomes smaller than the number of detection data and a configuration of the sensor unit is simplified.

According to a second aspect of the present invention, there is provided an element data configuration method which causes an input device including a sensor unit which detects degrees of proximity of an object in a plurality of different detection regions on an operation plane and generates N pieces of detection data in accordance with a result of the detection to configure M pieces of element data indicating degrees of proximity of the object in each of M sections (M is a natural number larger than N) which virtually divide the operation plane based on the N pieces of detection data. Each of the M sections has at least one overlapping portion which overlaps with the detection region. Each of the M pieces of element data is a sum of partial element data distributed in predetermined rates to each of the N pieces of detection data, and each of the N pieces of detection data is approximated to a sum of the partial element data distributed in the predetermined rates from each of the M pieces of element data. The element data configuration method includes: calculating respective temporary values of the N pieces of detection data as sums of the partial element data distributed from each of temporary values of the M pieces of element data in the predetermined rates and repeatedly performs a data configuration process of correcting the temporary values of the M pieces of element data at least twice based on the N predetermined rates set for each of the M pieces of element data so that the calculated temporary values of the N pieces of detection data approximate the N pieces of detection data; calculating a coefficient having an absolute value which becomes smaller as a difference between the two temporary values in each of the element data becomes larger based on the two temporary values obtained by the data configuration process performed twice for each of the M pieces of element data; and calculating, for each of the M sections, a sum of a value obtained by multiplying a difference between a first temporary value of the element data obtained by the first data configuration process and a second temporary value of the element data obtained by the second data configuration process by the coefficient and the first temporary value as an estimation value of the element data obtained by repeatedly performing the data configuration process.

According to a third aspect of the present invention, there is provided a program that causes a computer to execute the element data configuration method according to the second aspect.

According to the present invention, element data indicating a degree of proximity of an object in a plurality of sections on an operation plane can be configured by a simple calculation using a number of detection data smaller than the number of sections.

BRIEF DESCRIPTION OF THE DRAWINGS

FIG. 2A is a diagram illustrating a plurality of sections and FIG. 2B is a diagram illustrating overlapping of a detection region on sections;

FIG. 3 is a diagram illustrating the relationship between N pieces of detection data and M pieces of partial element data;

FIG. 4 is a diagram explaining conversion from the M pieces of element data into the N pieces of detection data;

FIG. 5 is a diagram explaining conversion from temporary values of the M pieces of element data into temporary values of the N pieces of detection data;

FIG. 9A is a diagram illustrating a two-dimensional distribution of approach degrees of objects which are virtually set as a condition for the simulation and FIG. 9B is a diagram illustrating a two-dimensional distribution of element data which is converged after the data configuration process is repeatedly performed 1000 times;

FIG. 10A is a diagram illustrating the correlation between a value obtained by subtracting a first temporary value from a second temporary value and a value obtained by subtracting the first temporary value from a convergence value and FIG. 10B is a diagram illustrating a two-dimensional distribution of element data estimated using a coefficient calculated using a result of the data configuration process performed twice;

FIG. 11A is a diagram illustrating a two-dimensional distribution of approach degrees of the objects which are virtually set as a condition for the simulation and FIG. 11B is a diagram illustrating a two-dimensional distribution of element data which is converged after the data configuration process is repeatedly performed 1000 times;

FIG. 12A is a diagram illustrating the correlation between a value obtained by subtracting a first temporary value from a second temporary value and a value obtained by subtracting the first temporary value from a convergence value and FIG. 12B is a diagram illustrating a two-dimensional distribution of element data estimated using a coefficient calculated using a result of the data configuration process performed twice;

FIG. 13A is a diagram illustrating a two-dimensional distribution of approach degrees of the objects which are virtually set as a condition for the simulation and FIG. 13B is a diagram illustrating a two-dimensional distribution of element data which is converged after the data configuration process is repeatedly performed 1000 times;

FIG. 14A is a diagram illustrating the correlation between a value obtained by subtracting a first temporary value from a second temporary value and a value obtained by subtracting the first temporary value from a convergence value and FIG. 14B is a diagram illustrating a two-dimensional distribution of element data estimated using a coefficient calculated using a result of the data configuration process performed twice;

FIG. 16A is a diagram illustrating the correlation between a value obtained by subtracting a first temporary value from a second temporary value and a value obtained by subtracting the first temporary value from a convergence value and FIG. 16B is a diagram illustrating a two-dimensional distribution of element data estimated using the coefficient $\gamma'$;

FIG. 19A is a diagram illustrating the correlation between a value obtained by subtracting a first temporary value from a second temporary value and a value obtained by subtracting the first temporary value from a convergence value and FIG. 19B is a diagram illustrating a two-dimensional distribution of element data estimated using a coefficient calculated using a result of the data configuration process performed twice;

FIG. 22A is a diagram illustrating a plurality of sections on an operation plane and FIG. 22B is a diagram illustrating a pattern of electrodes overlapping with the individual sections;

FIG. 23A is a diagram illustrating a pattern of electrodes formed on an upper layer and FIG. 23B is a diagram illustrating a pattern of electrodes formed on a lower layer;

FIG. 27A is a diagram illustrating a plurality of sections in an operation plane and FIG. 27B is a diagram illustrating a pattern of electrodes overlapping with the individual sections;

FIG. 28A is a diagram illustrating a pattern of electrodes formed on an upper layer and FIG. 28B is a diagram illustrating a pattern of electrodes formed on a lower layer;

DESCRIPTION OF THE PREFERRED EMBODIMENTS

First Embodiment

Figure 1:
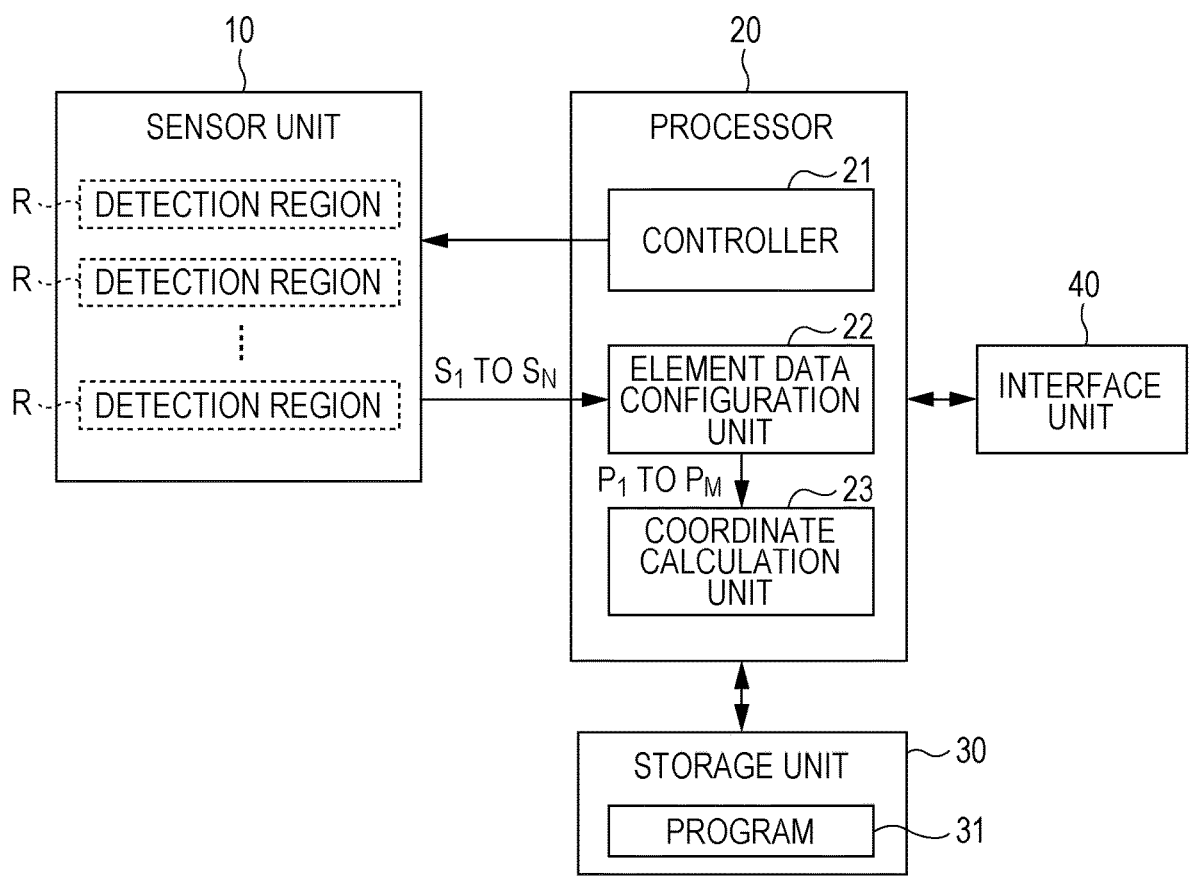
FIG. 1 is a diagram illustrating an example of a configuration of an input device according to a first embodiment.

FIG. 1 is a diagram illustrating an example of a configuration of an input device according to a first embodiment of the present invention.

The input device illustrated in FIG. 1 includes a sensor unit 10, a processor 20, a storage unit 30, and an interface unit 40. The input device according to this embodiment is used to input information corresponding to a proximity position in case that an object, such as a finger or a pen, approaches an operation plane in which a sensor is provided. Note that the term "proximity" in this specification means "to be closely located" and does not limit a contact state or a non-contact state.

Sensor Unit 10

The sensor unit 10 detects a degree of proximity of an object (such as a finger or a pen) in at least one detection region R on an operation plane 11 and generates N pieces of detection data $S_1$ to $S_N$ as a whole. The sensor unit 10 generates at least one piece of detection data $S_i$ for each detection region R. Note that "i" indicates an integer in a range from 1 to N. In a description below, the N pieces of detection data $S_1$ to $S_N$ are referred to as "detection data S" without distinguishing the detection data S1 to SN from one another where appropriate.

For example, the sensor unit 10 detects an electrostatic capacitance between an electrode disposed in the detection region R and an object, and generates detection data $S_i$ corresponding to a result of the detection. The sensor unit 10 may detect a degree of proximity of the object to the detection region R in accordance with a physical amount (such as a resistance change in accordance with a contact pressure) other than the electrostatic capacitance.

Figure 2A:
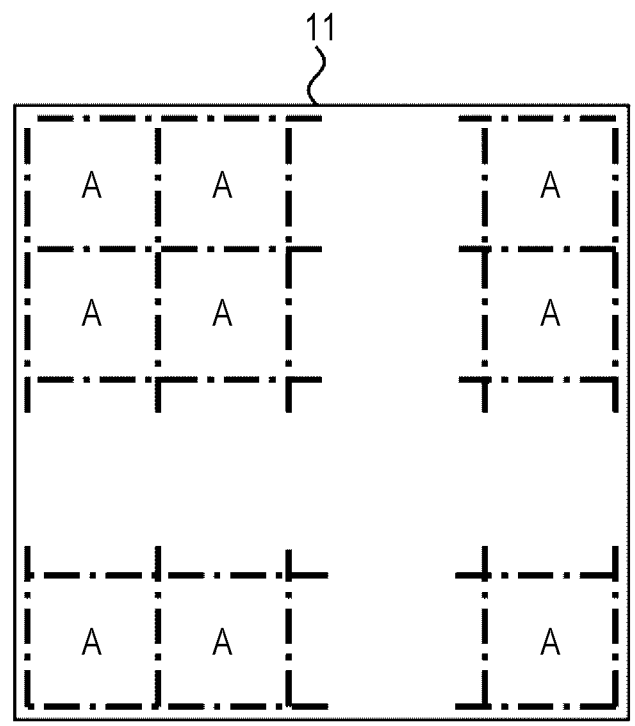
FIGS. 2A to 2B are diagrams illustrating a plurality of sections obtained by virtually dividing an operation plane, where
Figure 2B:
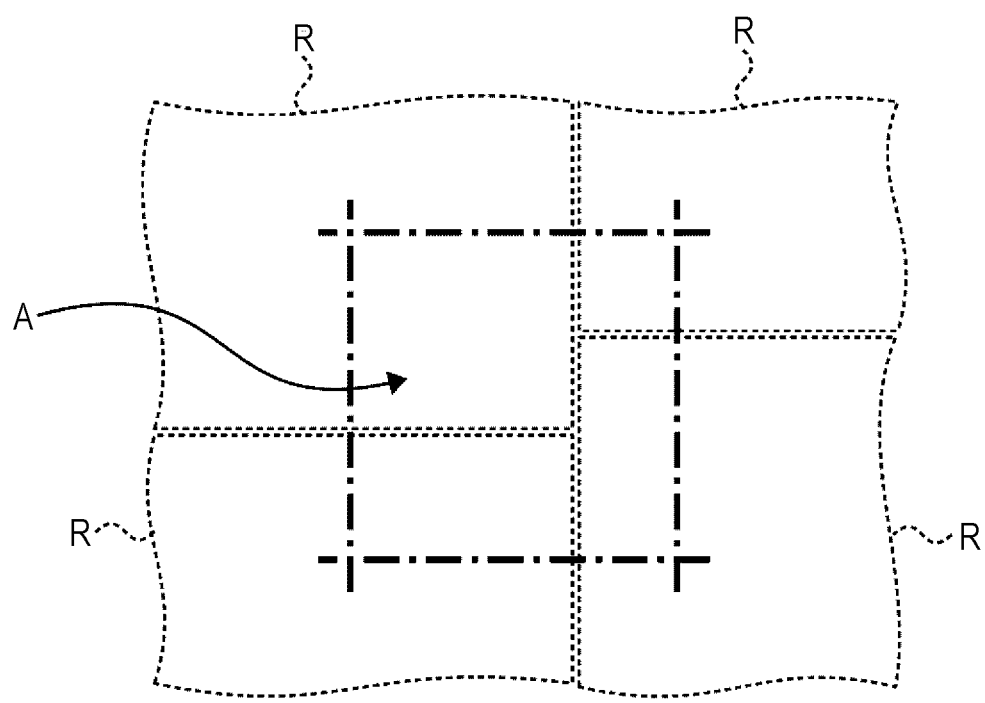

The operation plane 11 of the sensor unit 10 is virtually divided into a plurality of sections A as illustrated in FIG. 2A. In the example of FIG. 2A, the operation plane 11 is divided into a plurality of sections A in a grid. Furthermore, each of the plurality of sections A has at least one portion overlapping with a detection region R. In an example of FIG. 2B, a single section A overlaps with four detection regions R. Accordingly, the sensor unit 10 generates at least one piece of detection data S indicating a degree of proximity of the object for each of the plurality of sections A. It is assumed that the number of sections A is M which is larger than N (M>N) hereinafter. Furthermore, each of the sections A is referred to as a "section $A_j$" where appropriate in a distinguishable manner. Note that "j" indicates an integer in a range from 1 to M.

The input device of this embodiment configures M pieces of element data $P_1$ to $P_M$ indicating degrees of proximity of the object in each of the M sections $A_1$ to $A_M$ based on the N pieces of detection data $S_1$ to $S_N$. In a description below, the M pieces of element data $P_1$ to $P_M$ are referred to as "element data P" without distinguishing the element data $P_1$ to $P_M$ from one another where appropriate.

The certain relationship is established between the M pieces of element data $P_1$ to $P_M$ and the N pieces of detection data $S_1$ to $S_N$. Specifically, each of the M pieces of element data $P_1$ to $P_M$ is represented by a sum of partial element data U distributed to each of the N pieces of detection data $S_1$ to $S_N$ in predetermined rates. Assuming that the partial element data U distributed from the element data $P_j$ to the detection data $S_i$ is indicated by "$U_{ij}$", the element data $P_j$ is represented by the following equation.

$$P_j = \sum_{i=1}^{N} U_{ij} \quad (1)$$

Furthermore, each of the N pieces of detection data $S_1$ to $S_N$ is approximated to a sum of the partial element data $U_{ij}$ distributed from each of the M pieces of element data $P_1$ to $P_M$ in predetermined rates. The detection data $S_i$ is represented by the following equation.

$$S_i = \sum_{j=1}^{M} U_{ij} \quad (2)$$

FIG. 3 is a diagram illustrating the relationship between the N pieces of detection data $S_1$ to $S_N$ and the M pieces of element data $P_1$ to $P_M$ and represents the relationships of Expressions (1) and (2). As is apparent from in FIG. 3, the detection data $S_i$ is approximated to a value obtained by adding the partial element data $U_{i1}$ to $U_{iM}$ to one another distributed from a corresponding one of the N pieces of detection data $S_1$ to $S_N$. Therefore, if the partial element data $U_{i1}$ to $U_{iM}$ can be calculated from the element data $P_1$ to $P_M$, the detection data $S_i$ may be calculated in accordance with Expression (2).

In the input device according to this embodiment, it is assumed that a rate of the partial element data $U_{ij}$ distributed to single detection data $S_i$ in single element data $P_j$ is constant. Assuming that the predetermined rate is "constant data $K_{ij}$", the constant data $K_{ij}$ is represented by the following equation.

$$K_{ij} = \frac{U_{ij}}{P_j} \quad (3)$$

When the partial element data $U_{ij}$ obtained by Expression (3) is assigned to Expression (2), the detection data $S_i$ is represented by the following equation.

$$S_i = \sum_{j=1}^{M} K_{ij} P_j \quad (4)$$

FIG. 4 is a diagram illustrating conversion from the M pieces of element data $P_1$ to $P_M$ into the N pieces of detection data $S_1$ to $S_N$. The conversion from the element data $P_1$ to $P_M$ into the detection data $S_1$ to $S_N$ represented by Expression (4) is determined by N×M constant data $K_{ij}$. This conversion is represented by the following equation using matrices as is apparent from FIG. 4.

$$\underbrace{\begin{bmatrix} K_{11} & K_{12} & \cdots & K_{1M} \\ K_{21} & & & K_{2M} \\ \vdots & & & \vdots \\ K_{N1} & K_{N2} & \cdots & K_{NM} \end{bmatrix}}_{K} \begin{bmatrix} P_1 \\ P_2 \\ \vdots \\ P_M \end{bmatrix} = \begin{bmatrix} S_1 \\ S_2 \\ \vdots \\ S_N \end{bmatrix} \quad (5)$$

A matrix of N rows by M columns (a first conversion matrix K) on a left member of Expression (5) is general data defined by a configuration of the sensor unit 10, such as a state of overlapping between the detection regions R and the sections A and detection sensitivity for detecting overlapping portions of each of the detection regions R in each of the sections A of the sensor unit 10.

Processor 20

The processor 20 is a circuit which controls an entire operation of the input device, and is constituted by including, for example, a computer which performs a process in accordance with an instruction code of a program 31 stored in the storage unit 30, and a logic circuit which realizes a specific function. All processes of the processor 20 may be realized in accordance with programs in the computer, or some of or all the processes may be realized by a dedicated logic circuit.

In the example of FIG. 1, the processor 20 includes a controller 21, an element data configuration unit 22, and a coordinate calculation unit 23.

The controller 21 controls a timing of detection performed by the sensor unit 10. For example, the controller 21 controls various circuits included in the sensor unit 10 such that selection of one of the detection regions R to be subjected to detection, sampling of an analog signal obtained as a result of the detection, generation of detection data S by means of A/D conversion, and the like are performed at appropriate timings.

The element data configuration unit 22 performs a process of configuring the M pieces of element data $P_1$ to $P_M$ corresponding to the M sections A based on the N pieces of detection data generated by the sensor unit 10.

Although the element data configuration unit 22 is capable of converging the M pieces of element data $P_1$ to $P_M$ into a certain value by repeatedly performing a data configuration process described below a large number of times, the data configuration process is executed twice so that a calculation process is simplified. Then the element data configuration unit 22 obtains the M pieces of element data $P_1$ to $P_M$ (definite values) by a comparatively simple calculation process based on temporary values $PA_1$ to $PA_M$ of the M pieces of element data obtained by each of the two data configuration processes. Hereinafter, in a description below, the temporary values $PA_1$ to $PA_M$ of the M pieces of element data are referred to as a "temporary value PA" without distinguishing the temporary values $PA_1$ to $PA_M$ from one another where appropriate.

First, the data configuration process will be described. The element data configuration unit 22 calculates respective temporary values $SA_1$ to $SA_N$ of the N pieces of detection data as sums of the partial element data $U_{ij}$ distributed from each of the temporary values $PA_1$ to $PA_M$ of the M pieces of element data in predetermined rates (constant data $K_{ij}$) in the first data configuration process. Then the element data configuration unit 22 corrects the temporary values $PA_1$ to $PA_M$ of the M pieces of element data based on the N×M constant data $K_{ij}$ so that the calculated temporary values $SA_1$ to $SA_N$ of the N pieces of detection data become close to the N pieces of detection data $S_1$ to $S_N$ which are results of the detection performed by the sensor unit 10.

Specifically, the data configuration process includes four processes (first to fourth processes).

First Process

In the first process, the element data configuration unit 22 converts the temporary values $PA_1$ to $PA_M$ of the M pieces of element data into the temporary values $SA_1$ to $SA_N$ of the N pieces of detection data based on the N×M constant data $K_{ij}$ which have been obtained. The conversion is represented by the following equation using the first conversion matrix K in accordance with the relationship illustrated in Expression (5).

$$\underbrace{\begin{bmatrix} K_{11} & K_{12} & \cdots & K_{1M} \\ K_{21} & & & K_{2M} \\ \vdots & & & \vdots \\ K_{N1} & K_{n2} & \cdots & K_{NM} \end{bmatrix}}_{K} \begin{bmatrix} PA_1 \\ PA_2 \\ \vdots \\ PA_M \end{bmatrix} = \begin{bmatrix} SA_1 \\ SA_2 \\ \vdots \\ SA_N \end{bmatrix} \quad (6)$$

FIG. 5 is a diagram explaining conversion from the temporary values $PA_1$ to $PA_M$ of the M pieces of element data into the temporary values $SA_1$ to $SA_N$ of the N pieces of detection data. As the first conversion matrix K has been obtained in advance, when the temporary values $PA_1$ to $PA_M$ of the M pieces of element data are given, the temporary values $SA_1$ to $SA_N$ of the N pieces of detection data can be obtained in accordance with Expression (6).

Second Process

In the second process, the element data configuration unit 22 calculates N first coefficients $\alpha_1$ to $\alpha_N$ indicating magnifications by which the temporary values $SA_1$ to $SA_N$ of the N pieces of detection data are to be multiplied so that the temporary values $SA_1$ to $SA_N$ become equal to the N pieces of detection data $S_1$ to $S_N$. The first coefficient $\alpha_i$ is represented by the following equation.

$$\alpha_i = \frac{S_i}{SA_i} \quad (7)$$

The calculation of the first coefficients $\alpha_1$ to $\alpha_N$ in the second process is represented as follows using matrices.

$$\begin{bmatrix} \alpha_1 \\ \alpha_2 \\ \vdots \\ \alpha_N \end{bmatrix} = \begin{bmatrix} S_1/SA_1 \\ S_2/SA_2 \\ \vdots \\ S_n/SA_N \end{bmatrix} \quad (8)$$

Third Process

In the third process, the element data configuration unit 22 calculates M second coefficients $\beta_1$ to $\beta_M$ indicating magnifications by which the temporary values $PA_1$ to $PA_M$ of the M pieces of element data are to be multiplied. Specifically, the element data configuration unit 22 converts the N first coefficients $\alpha_1$ to $\alpha_N$ into the M second coefficients $\beta_1$ to $\beta_M$ based on the N×M constant data $K_{ij}$.

As illustrated by Expression (3), the partial element data $U_{ij}$ distributed from the element data $P_j$ to the element data $S_i$ has a rate corresponding to the constant data $K_{ij}$ relative to the entire element data $P_j$. The larger the constant data $K_{ij}$ is, the higher the correlation between the element data $P_j$ and the detection data $S_i$ is. Accordingly, it is estimated that the larger the constant data $K_{ij}$ is, the higher the correlation between the first coefficient $\alpha_i$ and the second coefficient $\beta_j$ is. Therefore, the element data configuration unit 22 does not merely average the N first coefficients $\alpha_1$ to $\alpha_N$ when the second coefficient $\beta_j$ is calculated but averages the N first coefficients $\alpha_1$ to $\alpha_N$ after weighting the N first coefficients $\alpha_1$ to $\alpha_N$ by the constant data $K_{ij}$. Specifically, the second coefficient $\beta_j$ is represented by the following equation.

$$\beta_j = \sum_{i=1}^{N} K_{ij} \alpha_i \quad (9)$$

Figure 6:
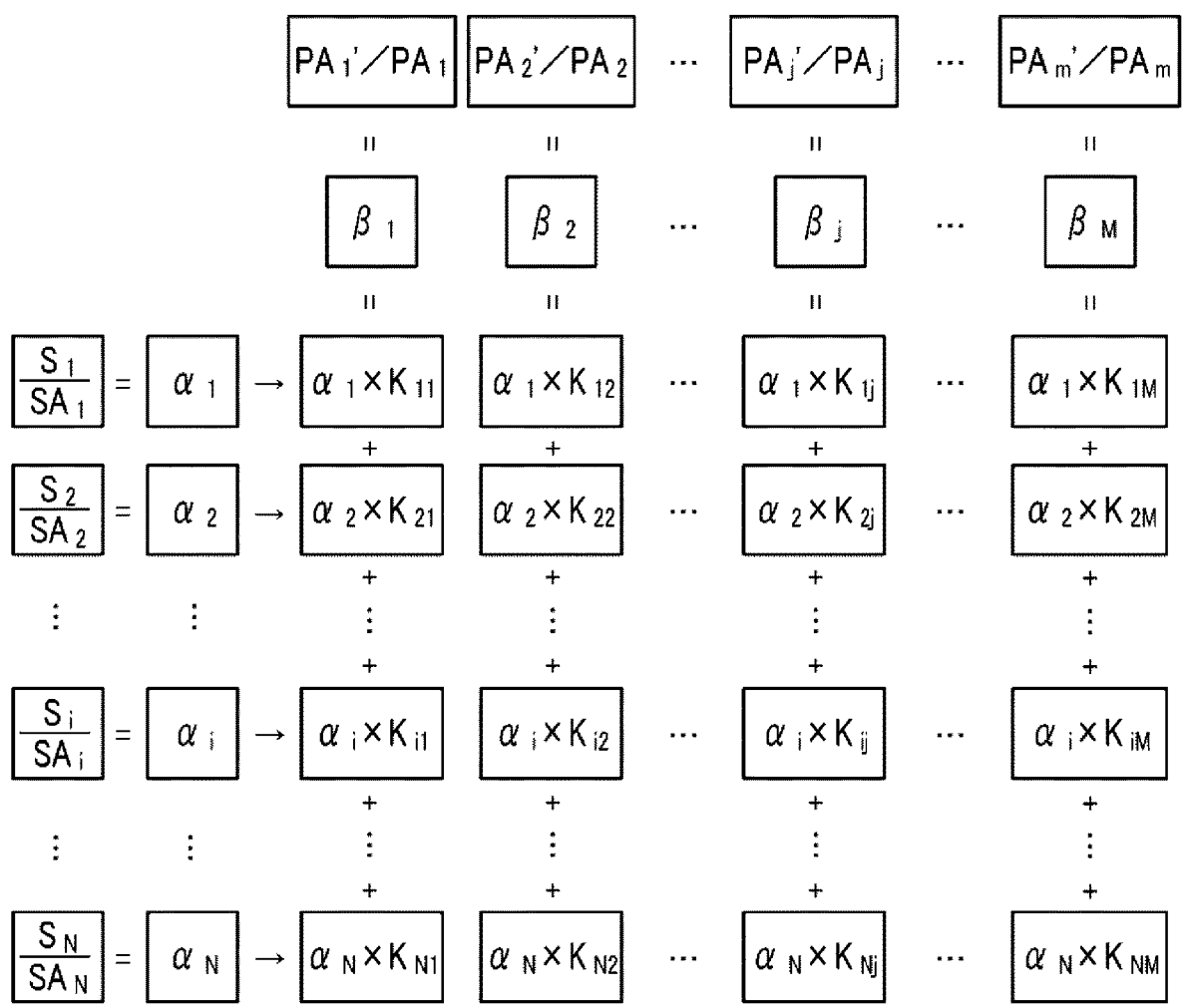
FIG. 6 is a diagram explaining conversion from N first coefficients into the M second coefficients.

FIG. 6 is a diagram explaining conversion from the N first coefficients $\alpha_1$ to $\alpha_N$ into the M second coefficients $\beta_1$ to $\beta_M$. As illustrated in FIG. 6, the relationship of Expression (9) is represented by the following equation using matrices.

$$\underbrace{\begin{bmatrix} K_{11} & K_{21} & \cdots & K_{N1} \\ K_{12} & & & K_{N2} \\ \vdots & & & \vdots \\ K_{1M} & K_{2M} & \cdots & K_{NM} \end{bmatrix}}_{K^T} \begin{bmatrix} \alpha_1 \\ \alpha_2 \\ \vdots \\ \alpha_N \end{bmatrix} = \begin{bmatrix} \beta_1 \\ \beta_2 \\ \vdots \\ \beta_M \end{bmatrix} \quad (10)$$

A matrix of M rows by N columns (a second conversion matrix $K^T$) on a left side in Expression (10) is a transposed matrix of the first conversion matrix K.

Fourth Process

In the fourth process, the element data configuration unit 22 corrects the temporary values $PA_1$ to $PA_M$ of the current element data so as to obtain new temporary values $PA'_1$ to $PA'_M$ based on the M second coefficients $\beta_1$ to $\beta_M$ obtained in the third process.

$$PA'_j = \beta_j PA_j \quad (11)$$

Calculation to obtain the temporary values $PA'_1$ to $PA'_M$ of the element data in the fourth process is represented by the following equation using matrices.

$$\begin{bmatrix} PA'_1 \\ PA'_2 \\ \vdots \\ PA'_M \end{bmatrix} = \begin{bmatrix} \beta_1 PA_1 \\ \beta_2 PA_2 \\ \vdots \\ \beta_M PA_M \end{bmatrix} \quad (12)$$

The element data configuration unit 22 repeatedly performs the data configuration process described above at least twice. Then the element data configuration unit 22 calculates a definite value of the element data $P_j$ based on a temporary value $PA_j$ (a first temporary value) of the element data obtained by the proceeding data configuration process and a temporary value $PA_j$ (a second temporary value) of the element data obtained by the succeeding data configuration process. Specifically, the element data configuration unit 22 calculates a sum of a value obtained by multiplying a difference between the first and second temporary values by the coefficient $\gamma$ and the first temporary value as the definite value of the element data $P_j$. The definite value of the element data $P_j$ is represented by the following equation.

$$P_j = \gamma \times (PA_j^{t=2} - PA_j^{t=1}) + PA_j^{t=1} \quad (13)$$

In Expression (13), "t" denotes repetition order of the data configuration process. Furthermore, "$PA_j^{t=1}$" indicates the temporary value $PA_j$ (the first temporary value) of the element data obtained by the first data configuration process, and "$PA_j^{t=2}$" indicates the temporary value $PA_j$ (the second temporary value) of the element data obtained by the second data configuration process.

As described hereinafter with reference to FIGS. 10A, 12A, and 14A, it is likely that a difference between a convergence value of the element data obtained by repetition of the data configuration process and the first temporary value is proportional to a difference between the second temporary value and the first temporary value. Accordingly, a sum of a value obtained by multiplying the difference between the first and second temporary values by a proportionality coefficient γ and the first temporary value is approximated to the convergence value of the element data obtained by repetition of the data configuration process. The element data configuration unit 22 calculates a definite value of the element data $P_j$ in accordance with Expression (13) for each of the M sections $A_1$ to $A_M$.

Note that, in a case where "q" and "r" are appropriate positive integers and q is smaller than r, "t=1" in Expression (13) may be replaced by "t=q", and "t=2" may be replaced by "t=r". In other words, the definite value of the element data P can be calculated based on the first temporary value $PA_j^{t=q}$ obtained by a q-th data configuration process and the second temporary value $PA_j^{t=r}$ obtained by an r-th data configuration process performed after the q-th data configuration process.

Next, a method for calculating the coefficient γ used to obtain the M pieces of element data $P_1$ to $P_M$ (definite values) will be described.

As described hereinafter with reference to FIGS. 10A to 14B, when the relative positional relationship of an object approaching the operation plane 11 is changed, a difference (a difference degree) between the two temporary values PA obtained by the data configuration process performed twice on each of the M pieces of element data P is changed. Furthermore, it is likely that, as the difference (the difference degree) between the two temporary values PA in each of the element data P becomes large, an absolute value of the coefficient γ becomes small. Therefore, the element data configuration unit 22 calculates the coefficient γ so that the absolute value becomes small as the difference (the difference degree) between the two temporary values PA in each of the element data P becomes large.

For example, the element data configuration unit 22 calculates an evaluation value D corresponding to the difference degree of the two temporary values PA in each of the M pieces of element data P, and obtains a value of a predetermined function using the evaluation value D as a variable as the coefficient γ.

The difference degree of the two temporary values PA is, for example, an absolute value of a difference between the two temporary values PA. The element data configuration unit 22 calculates the evaluation value D according to a sum of the M difference degrees (absolute values of differences between the two temporary values PA) corresponding to M pieces of element data P.

As described hereinafter with reference to FIG. 15 and the like, when the sum of the M difference degrees (the absolute values of the differences between the two temporary values PA) corresponding to the M pieces of element data P is determined as the evaluation value D, the coefficient γ may be approximated by a linear function having a negative inclination having the evaluation value D as a variable.

For example, the evaluation value D and the coefficient γ are calculated by the following equations.

$$D = \sum_{j=1}^{M} |PA_j^{t=2} - PA_j^{t=1}| \qquad (14\text{-}1)$$

$$\gamma = a_1 \times D + b_1 \qquad (14\text{-}2)$$

The evaluation value D of Expression (14-1) is obtained by adding absolute values (difference degrees) of differences between the first temporary values $PA_j^{t=1}$ of the element data obtained by the first data configuration process and the second temporary values $PA_j^{t=2}$ obtained in the second data configuration process. Furthermore, the coefficient γ of Expression (14-2) is a linear function having an inclination of "$a_1$" and an intercept of "$b_1$".

Note that the two temporary values PA of the element data P used for the calculation of the evaluation value D may not be the same as the first and second temporary values (Expression (13)) used for the calculation of the definite value of the element data P. For example, as another embodiment of the present invention, an absolute value of a difference between a temporary value $PA_j^{t=q}$ obtained by a q-th data configuration process (q is an integer larger than 1) and a temporary value $PA_j^{t=r}$ obtained by a r-th data configuration process (r is an integer larger than q) may be determined as the difference degree of the two temporary values PA corresponding to the element data $P_j$. Also in this case, the evaluation value D may be calculated by adding M difference degrees corresponding to the M pieces of element data P to one another.

Furthermore, the difference degree of the two temporary values is not limited to the absolute value of the difference between the two temporary values. As another embodiment of the present invention, the difference degree may be specified in accordance with a rate of the two temporary values PA. For example, the difference degree may be specified by a rate of a larger one of the two temporary values PA which serves as a numerator to a smaller one of the two temporary values PA which serves as a denominator. Even the difference degree specified as described above becomes larger as the difference between the two temporary values PA becomes larger.

Furthermore, a function of the evaluation value D which approximates the coefficient γ may be a function other than the linear function (a quadratic or higher-order polynomial function or the like). The function of the evaluation value D which specifies the coefficient γ may be determined by, for example, a least-square method in accordance with a result of simulation of the coefficient γ and the evaluation value and a result of an actual measurement.

Furthermore, the function of specifying the conversion from the evaluation value D into the coefficient γ is not limited to those represented by mathematical expressions. For example, the conversion from the evaluation value D into the coefficient γ may be specified based on a data table showing the corresponding relation between the evaluation value D and the coefficient γ.

The element data configuration unit 22 has been described as above.

The coordinate calculation unit 23 calculates a coordinate of a portion on the operation plane 11 approached by an object (a finger, a pen or the like) based on the element data $P_1$ to $P_M$ configured by the element data configuration unit 22. For example, the coordinate calculation unit 23 binarizes two-dimensional data represented by the element data $P_1$ to $P_M$ and specifies a region of gathered data indicating that the object has approached as an approach region of the object. Then the coordinate calculation unit 23 generates profile data for a horizontal direction and a vertical direction of the specified approach region of the object. The profile data in the horizontal direction is obtained by calculating a sum of the element data $P_j$ serving as a group in the vertical direction of the operation plane 11 for each column and arranging the sums of the element data $P_j$ in the horizontal direction of the operation plane 11. The profile data in the vertical direction is obtained by calculating a sum of the element data $P_j$ serving as a group in the horizontal direction of the operation plane 11 for each row and arranging the sums of the element data P in the vertical direction of the operation plane 11. The coordinate calculation unit 23 calculates a position of a peak of the element data $P_j$ and a position of the center of gravity of the element data $P_j$ for the profile data in the horizontal direction and the profile data in the vertical direction. The calculated position in the horizontal direction and the calculated position in the vertical direction indicate a coordinate in which the object approaches the operation plane 11. The coordinate calculation unit 23 stores data on the coordinate obtained by the calculation in a predetermined storage area of the storage unit 30.

Storage Unit 30

The storage unit 30 stores constant data and variable data to be used in processes performed by the processor 20. In case that the processor 20 includes a computer, the storage unit 30 may store the program 31 to be executed by the computer. The storage unit 30 includes a volatile memory, such as a DRAM or an SRAM, a nonvolatile memory, such as a flash memory, and a hard disk.

Interface Unit 40

The interface unit 40 is a circuit used for transmission and reception of data between the input device and other control devices (such as an integrated circuit (IC) for controlling an information device including an input device). The processor 20 outputs information to be stored in the storage unit 30 (such as information on a coordinate of an object and the number of objects) from the interface unit 40 to a control device, not illustrated. Furthermore, the interface unit 40 may obtain the program 31 executed by the computer included in the processor 20 from a non-transitory recording medium, such as an optical disk or a universal serial bus (USB) memory, or a server on a network and load the program 31 into the storage unit 30.

Here, a process of configuring the element data P performed by the input device according to this embodiment will be described with reference to flowcharts of FIGS. 7 and 8.

ST100: The processor 20 obtains N pieces of detection data $S_1$ to $S_N$ generated by the sensor unit 10.

ST105: The processor 20 obtains initial values of the temporary values $PA_1$ to $PA_M$ of the element data to be used in the data configuration process (ST110) described below. The element data configuration unit 22 obtains the constant data previously stored in the storage unit 30 as an initial value, for example.

Note that the element data configuration unit 22 may obtain the element data $P_{11}$ to $P_M$ obtained as a preceding configuration result (definite values) as initial values. Alternatively, the element data configuration unit 22 may, for example, calculate movement average values of the element data based on a plurality of groups of element data $P_1$ to $P_M$ which have been just obtained as a plurality of configuration results (definite values) and obtain the movement average values as initial values this time. When the first data configuration process (ST110) is performed using the initial values based on at least one group of the element data $P_1$ to $P_M$ which have been just configured, accuracy of the configured element data is improved as compared with a case where initial values having a large error relative to the element data are used.

ST110: The processor 20 performs the data configuration process (FIG. 8) including the four processes (the first to fourth processes).

First, the processor 20 calculates temporary values $SA_1$ to $SA_N$ of the N pieces of detection data in accordance with Expression (6) based on the temporary values $PA_1$ to $PA_M$ of the M pieces of element data and the first conversion matrix K in the first process (ST200).

Next, the processor 20 calculates N first coefficients $\alpha_1$ to $\alpha_N$ in accordance with Expression (8) based on the temporary values $SA_1$ to $SA_N$ of the N pieces of detection data and the N pieces of detection data $S_1$ to $S_{NN}$ in the second process (ST205).

Thereafter, the processor 20 calculates M second coefficients $\beta_1$ to $\beta_M$ in accordance with Expression (10) based on the N first coefficients $\alpha_1$ to $\alpha_N$ and the second conversion matrix $K^T$ in the third process (ST210). Subsequently, the processor 20 corrects the individual temporary values $PA_{11}$ to $PA_M$ of the M pieces of element data in accordance with Expression (12) using the second coefficients $\beta_1$ to $\beta_M$ in the fourth process (ST215).

The processor 20 calculates the M first temporary values $PA_1^{t=1}$ to $PA_M^{t=1}$ by the data configuration process described above.

ST115: The processor 20 calculates the M second temporary values $PA_1^{t=1}$ to $PA_M^{t=2}$ by performing the data configuration process (FIG. 8) which is the same as that described above on the M first temporary values $PA_1^{t=1}$ to $PA_M^{t=1}$.

ST120: The processor 20 calculates an evaluation value D in accordance with Expression (14-1) based on the M first temporary values $PA_1^{t=1}$ to $PA_M^{t=1}$ and the M second temporary values $PA_1^{t=2}$ to $PA_M^{t=2}$.

ST125: The processor 20 calculates the coefficient γ in accordance with Expression (14-2) based on the evaluation value D calculated in step ST120.

ST145: The element data configuration unit 22 calculates a definite value of the element data $P_j$ in accordance with Expression (13) based on the first temporary value $PA_j^{t=1}$ and the second temporary value $PA_j^{t=2}$ which are obtained by the data configuration process performed twice (ST110 and ST115) and the proportionality coefficient γ.

Next, a result of simulation of configuration of the element data will be described in detail with reference to FIGS. 9A to 14B. FIGS. 9A to 14B are diagrams illustrating results of simulation performed for a method for obtaining a convergence value of the element data P by repeatedly performing the data configuration process (FIG. 8) a number of times and for a method for obtaining an estimation value of the element data P from results of the data configuration process performed twice.

Here, simulation is performed for three cases which have different relative positional relationships between two objects (fingers or the like) approaching the operation plane 11. FIGS. 9A and 9B and FIGS. 10A and 10B are diagrams illustrating simulation results in a case where a distance between the two objects is comparatively short. FIGS. 11A and 11B and FIGS. 12A and 12B are diagrams illustrating simulation results in a case where a distance between the two objects is about intermediate. FIGS. 13A and 13B and FIGS. 14A and 14B are diagrams illustrating simulation results in a case where a distance between the two object is comparatively long.

Figure 9A:
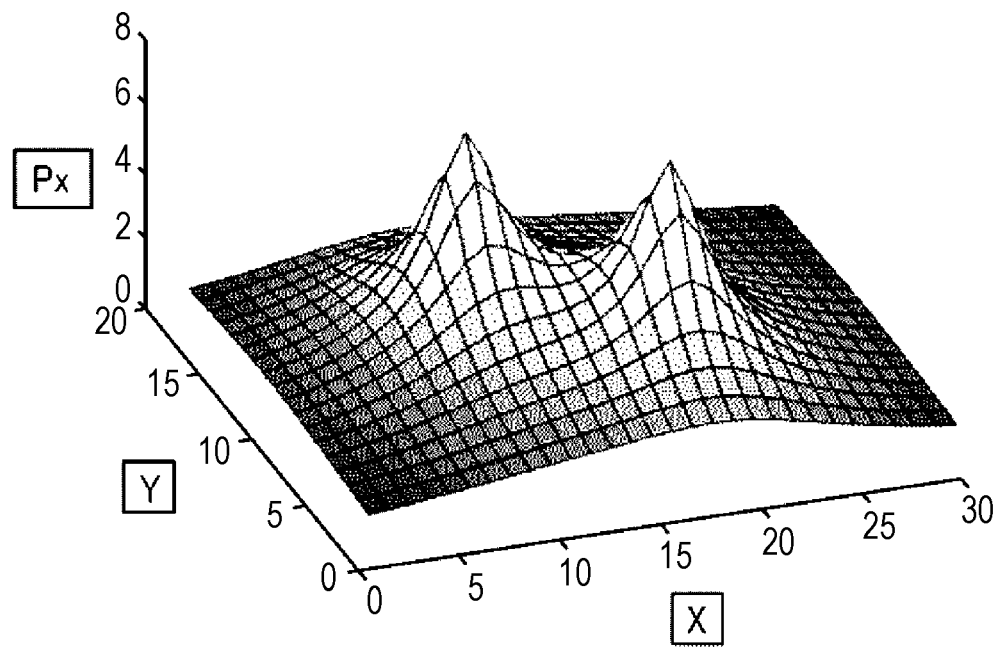
FIGS. 9A and 9B are diagrams illustrating an example of a simulation result of the element data configuration process in a case where a distance of two objects is comparatively short which is repeatedly performed a large number of times, where
Figure 9B:
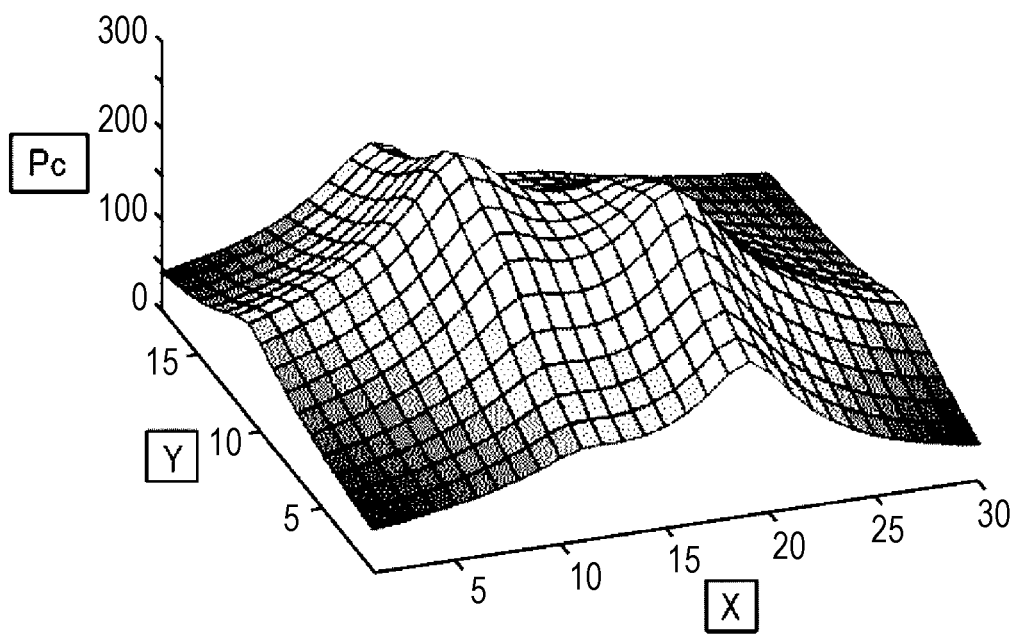
Figure 11A:
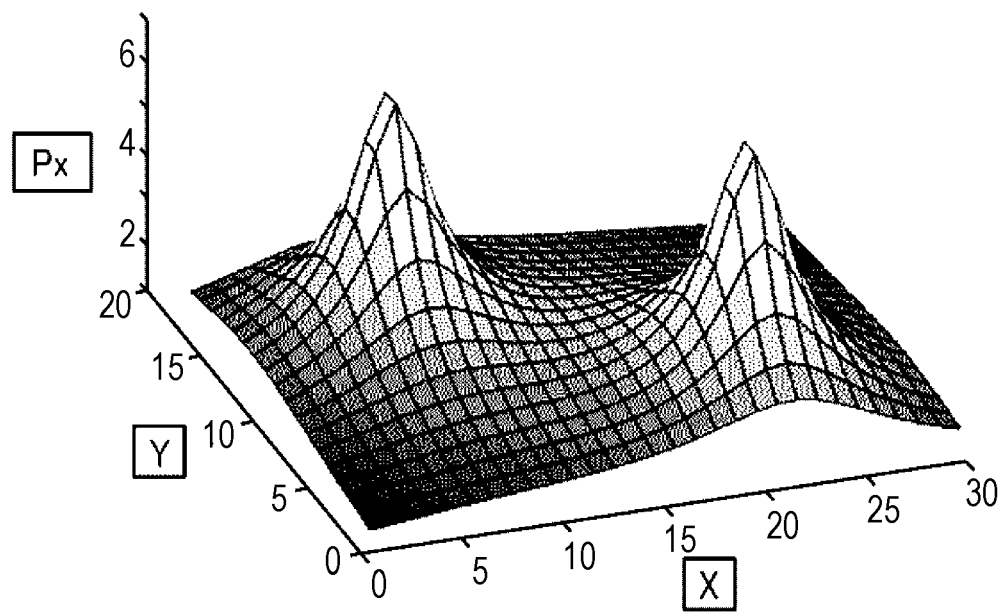
FIGS. 11A and 11B are diagrams illustrating an example of a simulation result of the element data configuration process in a case where a distance of two objects is a middle degree which is repeatedly performed a large number of times, where
Figure 11B:
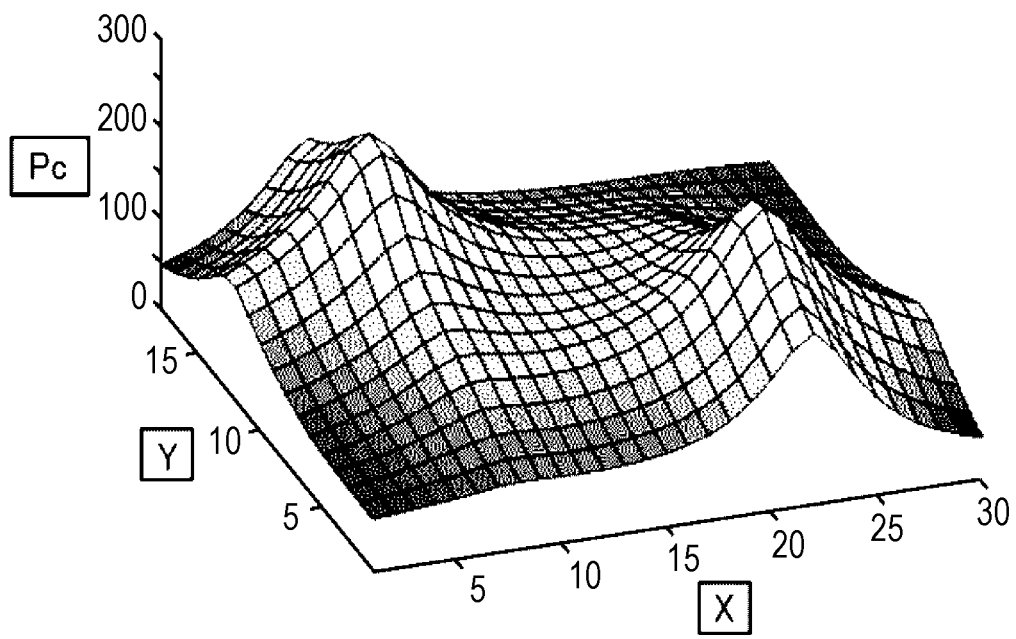
Figure 13A:
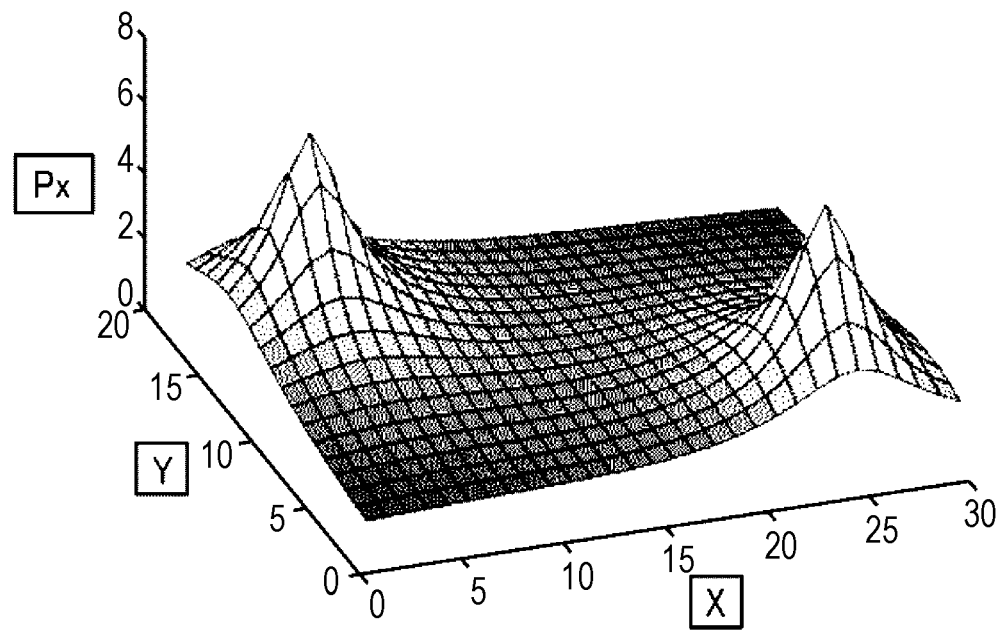
FIGS. 13A and 13B are diagrams illustrating an example of a simulation result of the element data configuration process in a case where a distance of two objects is comparatively long which is repeatedly performed a large number of times, where
Figure 13B:
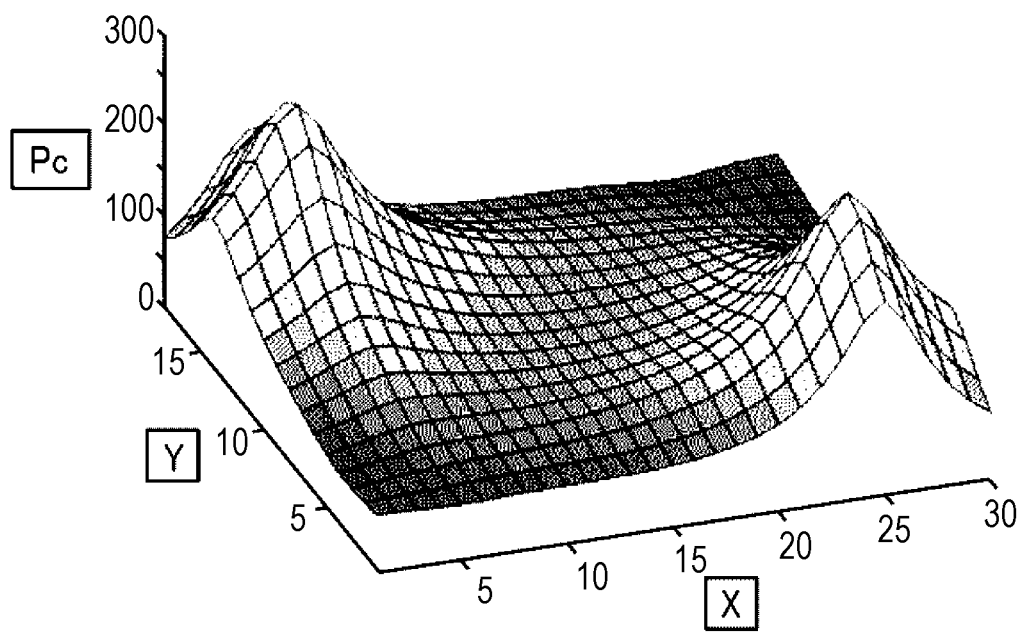

FIGS. 9A and 9B, FIGS. 11A and 11B, and FIGS. 13A and 13B show simulation results in a case where a convergence value of the element data P is obtained by repeatedly performing the data configuration process a number of times. FIGS. 9A, 11A, and 13A are diagrams illustrating two-dimensional distributions of a proximity degree Px of the objects which is virtually set as a condition of the simulation. In the simulation, the sensor unit 10 calculates N pieces of detection data $S_1$ to $S_N$ based on the proximity degree Px, and element data $P_1$ to $P_M$ are configured based on the detection data $S_1$ to $S_N$. A numerical value of the proximity degree Px is a dimensionless relative value. FIGS. 9B, 11B, and 13B are diagrams illustrating two-dimensional distributions of the element data Pc which is converged after the data configuration process is repeatedly performed 1000 times. A numerical value of the element data Pc is also a dimensionless relative value.

Note that "X" and "Y" in the drawings of the two-dimensional distributions are coordinate axes indicating positions of the individual sections A and numbers on the coordinate axes are values of coordinates.

As is apparent from FIGS. 9B, 11B, and 13B, the two-dimensional distribution of the element data Pc which is converged by repeatedly performing the data configuration process many times is substantially approximated to the two-dimensional distribution of the proximity degree Px of the object.

Figure 10A:
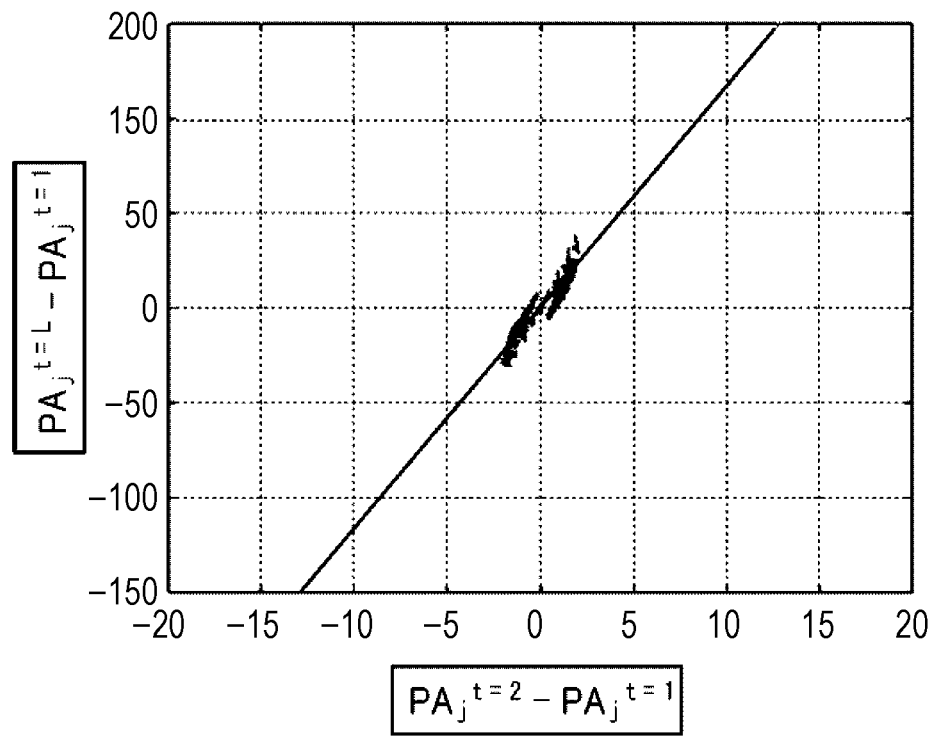
FIGS. 10A and 10B are diagrams illustrating an example of a simulation result of the element data configuration process in the input device according to the first embodiment under the same condition as FIG. 9A, where
Figure 10B:
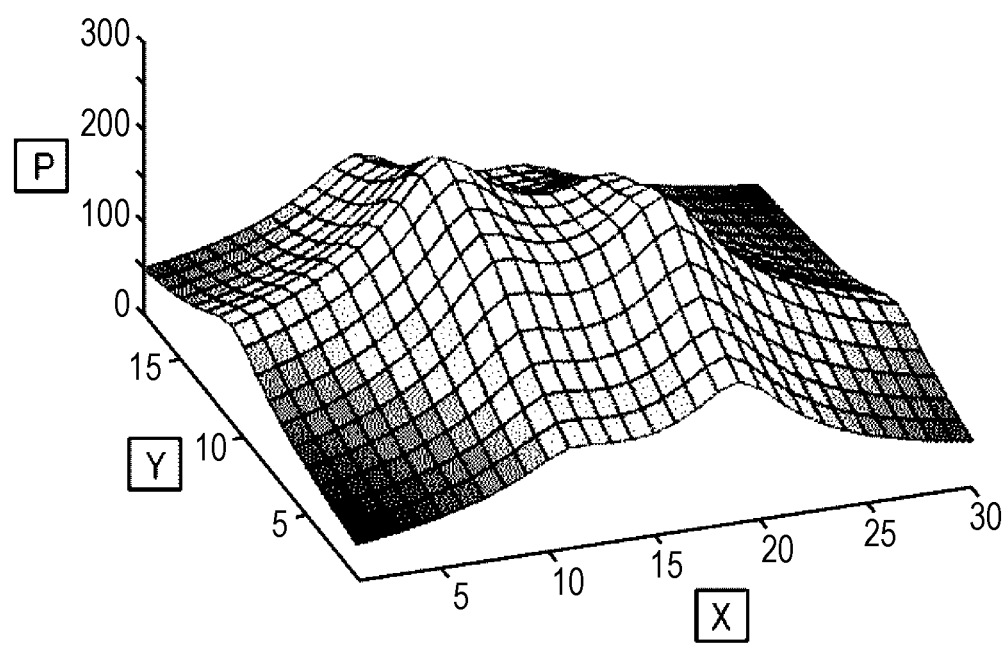
Figure 12A:
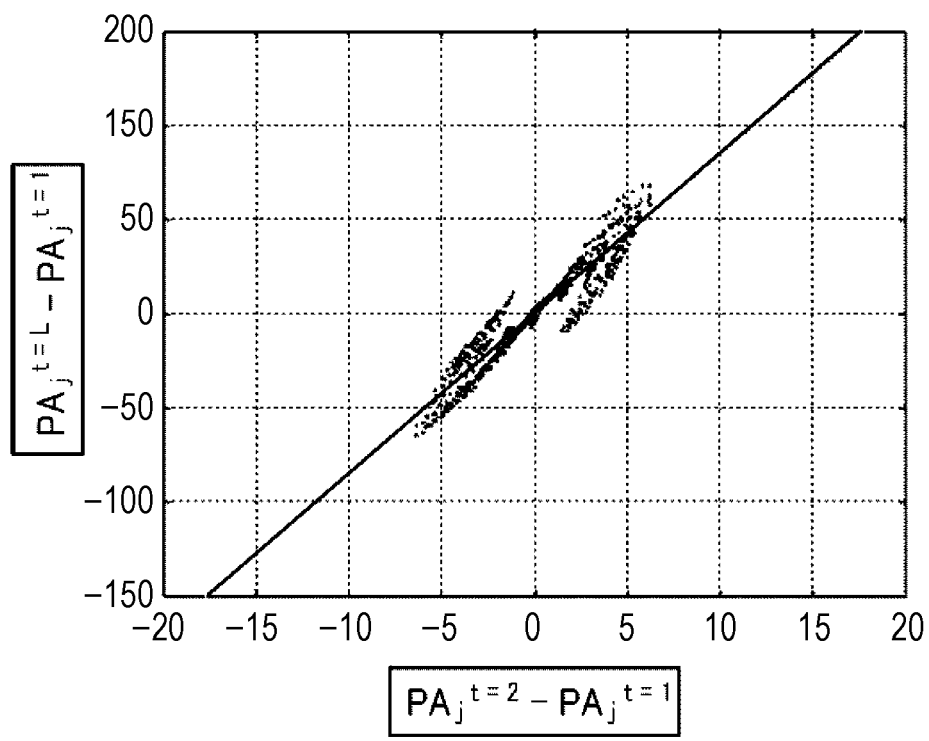
FIGS. 12A and 12B are diagrams illustrating an example of a simulation result of the element data configuration process in the input device according to the first embodiment under the same condition as FIG. 11A, where
Figure 12B:
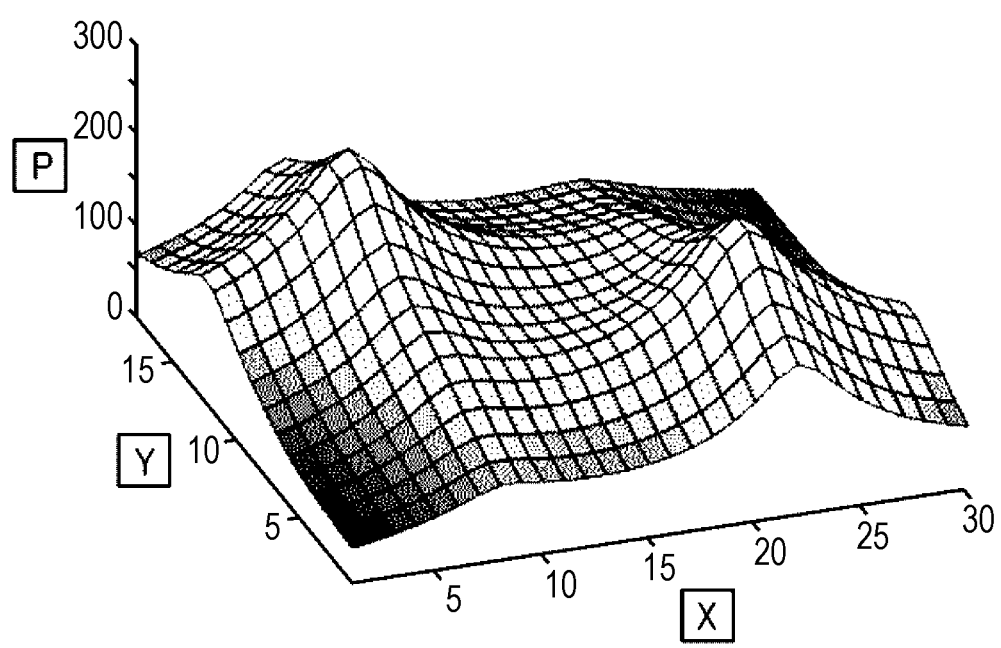
Figure 14A:
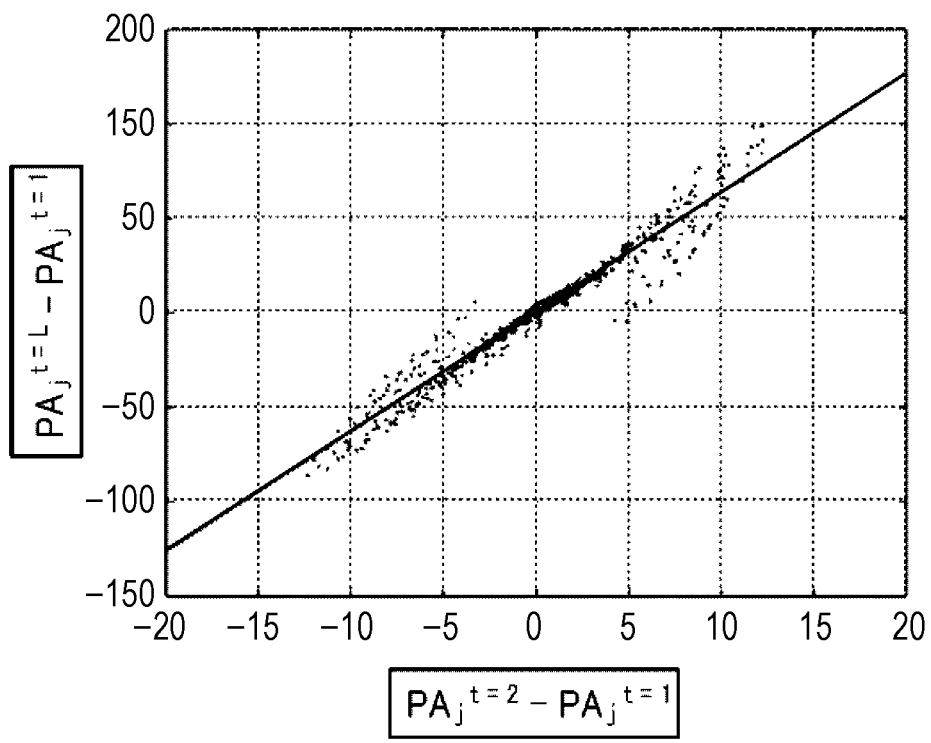
FIGS. 14A and 14B are diagrams illustrating an example of a simulation result of the element data configuration process in the input device according to the first embodiment under the same condition as FIG. 13A, where
Figure 14B:
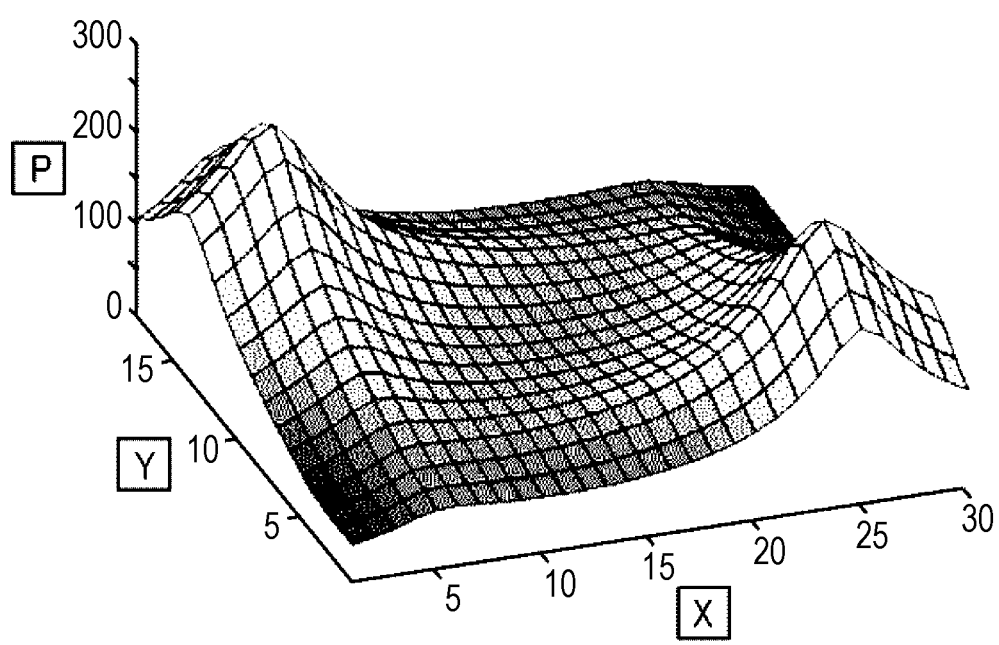

On the other hand, FIGS. 10A and 10B, FIGS. 12A and 12B, and FIGS. 14A and 14B are diagrams illustrating simulation results of the element data configuration process of this embodiment for obtaining an estimation value of the element data P based on the data configuration process (FIG. 8) performed twice. FIGS. 10A and 10B are diagrams illustrating simulation results under a condition which is the same as the condition of FIG. 9A (in the case where a distance between the two objects is short). FIGS. 12A and 12B are diagrams illustrating simulation results under a condition which is the same as the condition of FIG. 11A (in the case where a distance between the two objects is about intermediate). FIGS. 14A and 14B are diagrams illustrating simulation results under a condition which is the same as the condition of FIG. 13A (in the case where a distance between the two objects is long).

FIGS. 10A, 12A, and 14A are diagrams illustrating the correlation between a value obtained by subtracting the first temporary value $(PA_j^{t=1})$ from the second temporary value $(PA_j^{t=2})$ and a value obtained by subtracting the first temporary value $(PA_j^{t=1})$ from the convergence value $(PA_j^{t=L})$. Axes of abscissae in each diagram denote a value obtained by subtracting the first temporary value $PA_j^{t=1}$ obtained by the first data configuration process from the second temporary value $PA_j^{t=2}$ obtained by the second data configuration process. Axes of ordinates in each diagram denote a value obtained by subtracting the first temporary value $PA_j^{t=1}$ from the temporary value $PA_j^{t=L}$ (the convergence value) obtained by the L-th (L=1000) data configuration process. Each of plots in FIGS. 10A, 12A, and 14A corresponds to single element data $P_j$.

As is apparent from FIGS. 10A, 12A, and 14A, the value obtained by subtracting the first temporary value $(PA_j^{t=1})$ from the second temporary value $(PA_j^{t=2})$ and the value obtained by subtracting the first temporary value $(PA_j^{t=1})$ from the convergence value $(PA_j^{t=L})$ have the proportional relationship. A coefficient representing an inclination of the proportional relationship corresponds to the coefficient γ described above. Straight lines in each drawing indicate the coefficient γ calculated in accordance with Expressions (14-1) and (14-2). The straight lines substantially fit inclinations of the proportional relationship represented by distribution of the plots.

The inclinations of the proportional relationship indicated by the distributions of the plots in FIGS. 10A, 12A, and 14A are changed in accordance with the relative positional relationship of the two objects approaching the operation plane 11, and the longer a distance between the objects becomes, the gentler the inclination becomes. Furthermore, a distribution range of values in the axes of abscissae (values obtained by subtracting the first temporary values from the second temporary values) is changed in accordance with the relative positional relationship between the two objects approaching the operation plane 11, and the longer the distance between the objects becomes, the larger an absolute value of the value obtained by subtracting the first temporary value from the second temporary value becomes as a whole. Accordingly, as results of the simulation, it is found that the larger an absolute value of a difference between the two temporary values in each of the element data becomes, the gentler the inclinations of the proportional relationship indicated by the distributions of the plots in FIGS. 10A, 12A, and 14A become.

FIGS. 10B, 12B, and 14B are diagrams illustrating a two-dimensional distribution of the element data P estimated by using the coefficient γ calculated in accordance with Expressions (14-1) and (14-2). As is apparent from a comparison between the simulation results of FIGS. 10B, 12B, and 14B and the simulation results of FIGS. 9B, 11B, and 13B, a two-dimensional distribution of the element data P estimated from a result of the two data configuration processes is closely approximated to a two-dimensional distribution of the element data Pc converged by repetition of the data configuration process performed 1000 times.

Figure 15:
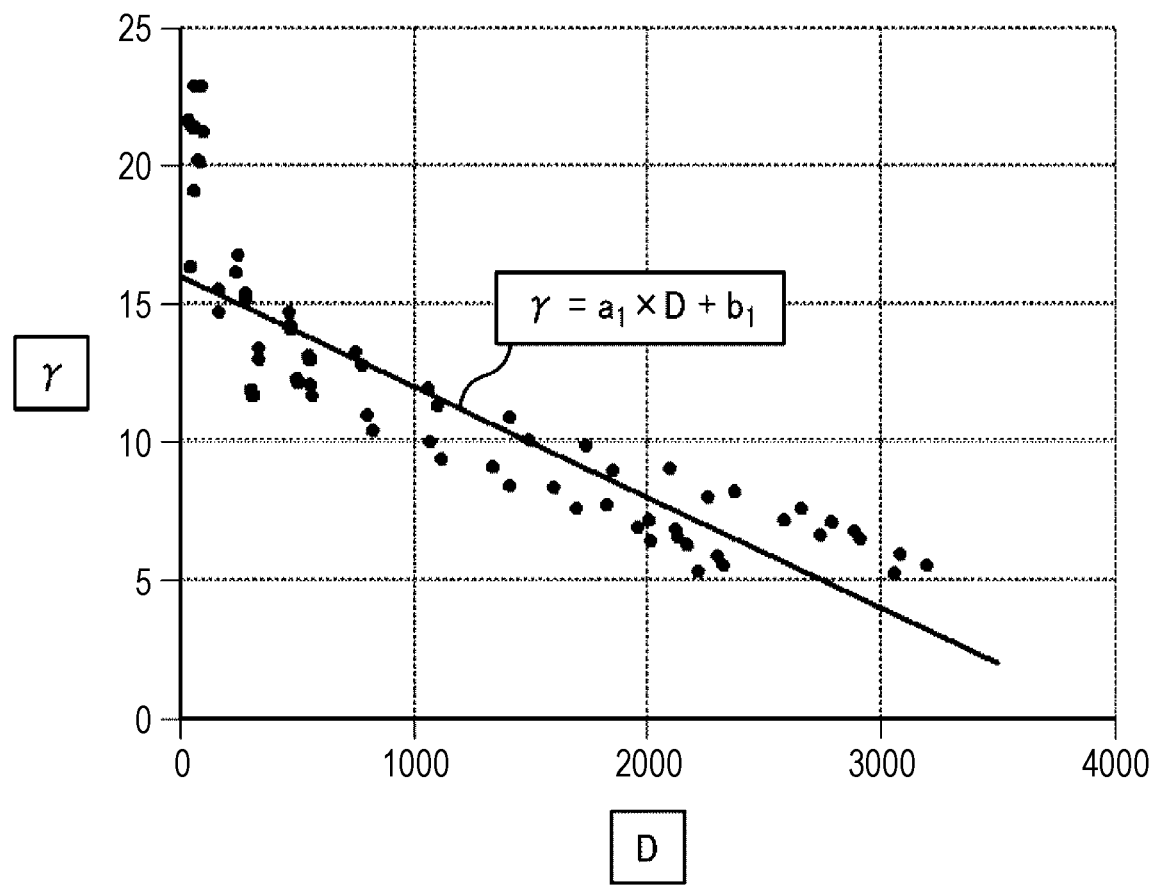
FIG. 15 is a diagram illustrating the correlation between an evaluation value D which is associated with a difference degree of two temporary values obtained by performing the data configuration process twice and a coefficient $\gamma$.

FIG. 15 is a diagram illustrating the correlation between the evaluation value D calculated in accordance with Expression (14-1) and the coefficient γ. The coefficient γ in an axis of ordinates in FIG. 15 is an optimum coefficient obtained by a numerical calculation based on simulation results (FIGS. 10A, 12A, 14A, and the like) indicating the correlation between the value obtained by subtracting the first temporary value $(PA_j^{t=1})$ from the second temporary value $(PA_j^{t=2})$ and the value obtained by subtracting the first temporary value $(PA_j^{t=1})$ from the convergence value $(PA_j^{t=L})$. Each of plots in FIG. 15 corresponds to a single simulation result (FIG. 10A, 12A, FIG. 14A, or the like). The different plots having different evaluation values D may be obtained as illustrated in FIG. 15 by performing simulation after changing the relative positional relationship of the plurality of objects approaching the operation plane 11 in various manners.

As illustrated in FIG. 15, the coefficient γ indicating the proportional relationship between the value obtained by subtracting the first temporary value $(PA_j^{t=1})$ from the second temporary value $(PA_j^{t=2})$ and the value obtained by subtracting the first temporary value $(PA_j^{t=1})$ from the convergence value $(PA_j^{t=L})$ tends to be approximated to a linear function having a negative inclination and the evaluation value D as a variable. The inclination "$a_1$" in Expression (14-2) and the intercept "$b_1$" may be obtained by numerical calculation, such as a least-square method, using the simulation results of FIG. 15 and a result of actual measurement.

Figure 16A:
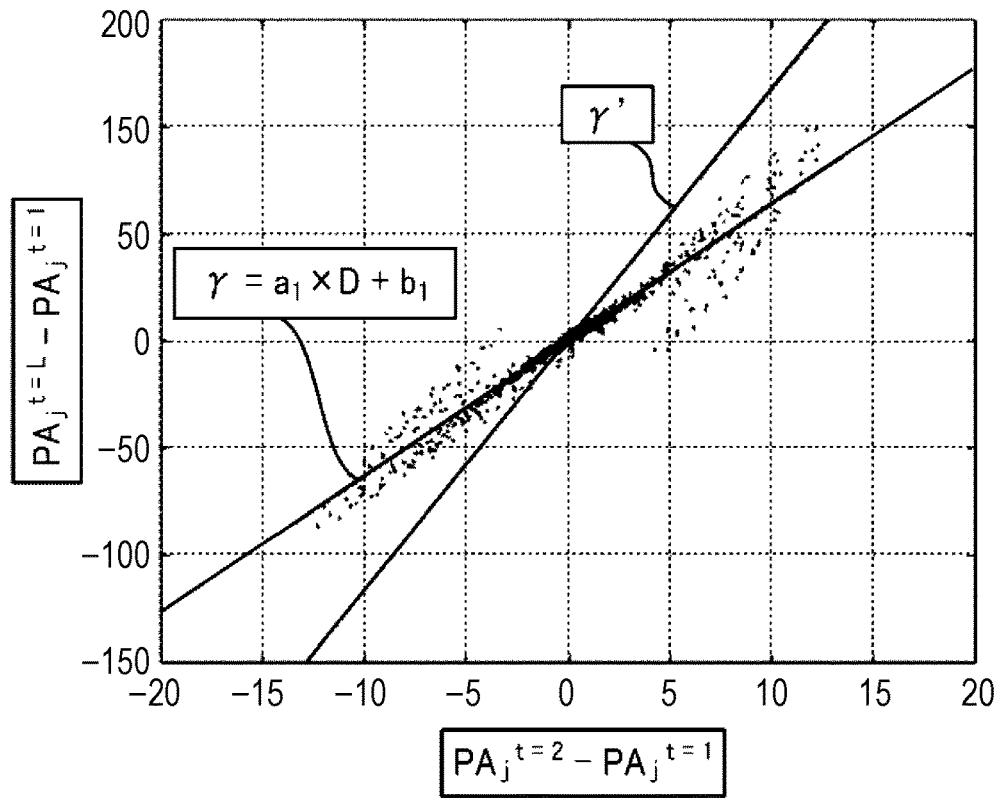
FIGS. 16A and 16B are diagrams illustrating a simulation result obtained when the element data configuration process is performed using a coefficient $\gamma'$ which is larger than the coefficient $\gamma$ calculated based on the evaluation value D under the same condition as FIG. 13A, where
Figure 16B:
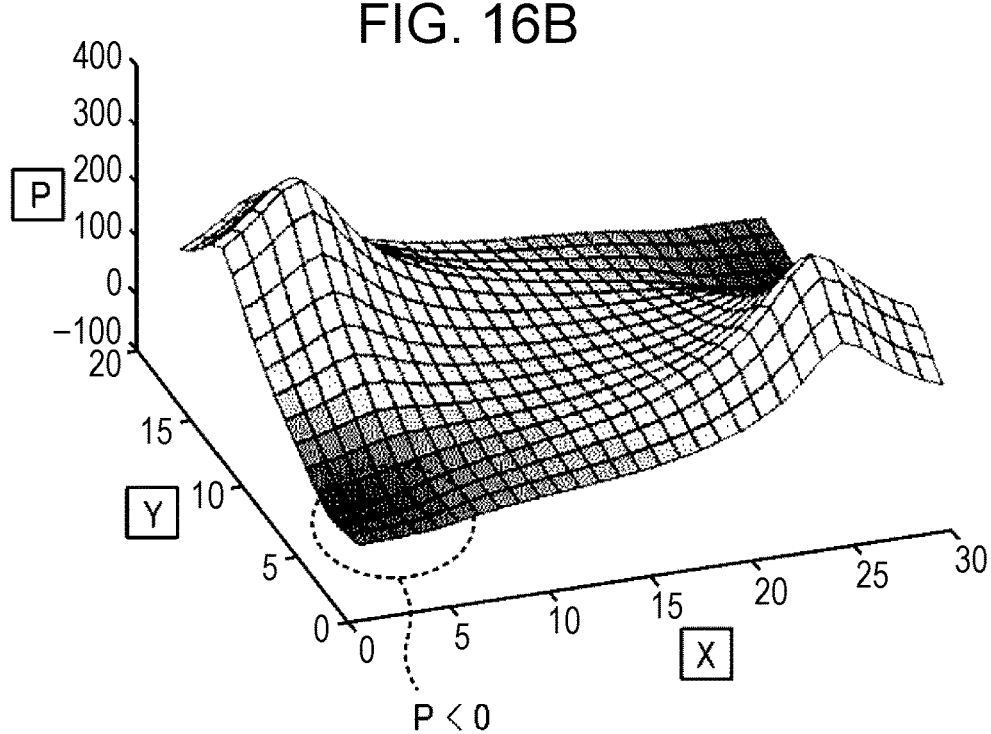

FIGS. 16A and 16B are diagrams illustrating simulation result in a case where the element data configuration process is performed by using a coefficient γ' which is larger than the coefficient γ calculated in accordance with Expression (14-2) based on the evaluation value D. The simulation result is obtained under the condition of FIG. 13A (in the case where a distance between the two objects is long). FIG. 16A is a diagram illustrating the correlation between the value obtained by subtracting the first temporary value $PA_j^{t=1}$) from the second temporary value ($PA_1^{t=2}$) and the value obtained by subtracting the first temporary value ($PA_j^{t=1}$) from the convergence value ($PA_j^{t=L}$). FIG. 16B is a diagram illustrating a two-dimensional distribution of the element data P estimated by using the coefficient γ' in accordance with Expression (13).

As is apparent from a comparison between FIG. 16B and FIG. 14B, in a case where the coefficient γ' which is shifted by an optimum value is used, the estimated two-dimensional distribution of the element data P has a larger error relative to a two-dimensional distribution to be reproduced (FIG. 13A). In particular, in a region surrounded by a dotted line in FIG. 16B, the element data P has a negative value which is smaller than an actual value. Even if a weak peak indicating presence of an object in a far position is included in the region, it is likely that the peak may be cancelled due to an error in a negative direction. Accordingly, the coefficient γ of an appropriate value calculated in accordance with the relative positional relationship between the objects approaching the operation plane 11 is preferably used. By this, an error of the element data described above is reduced.

As described above, according to this embodiment, each of the M sections $A_1$ to $A_M$ which virtually divide the operation plane 11 has at least one overlapping portion with the detection region R, and the sensor unit 10 generates at least one piece of detection data S for each detection region R. Therefore, at least one piece of detection data S indicating a degree of proximity of an object is generated for each of the M sections $A_1$ to $A_M$.

Furthermore, each of the M pieces of element data $P_1$ to $P_M$ is a sum of partial element data $U_{ij}$ distributed in predetermined rates (the constant data $K_{ij}$, Expression (3)) to the individual N pieces of detection data $S_1$ to $S_N$ (Expression (1)), and each of the N pieces of detection data $S_1$ to $S_N$ is approximated to the sum of the partial element data $U_{ij}$ distributed in the predetermined rates (the constant data $K_{ij}$) from the individual M pieces of element data $P_1$ to $P_M$ (Expression (2)). Specifically, conversion from the M pieces of element data $P_1$ to $P_M$ to the N pieces of detection data $S_1$ to $S_N$ is specified (Expression (5)) by the N constant data $K_{ij}$ set for the individual M pieces of element data $P_1$ to $P_M$ (Expression (5)).

In the data configuration process of the element data configuration unit 22, the temporary values $SA_1$ to $SA_N$ of the N pieces of detection data are individually calculated as a sum of the partial element data $U_{ij}$ distributed in the predetermined rates (the constant data $K_{ij}$) from the individual temporary value $PA_1$ to $PA_M$ of the M pieces of element data (Expression (6)). Furthermore, the temporary values $PA_1$ to $PA_M$ of the M pieces of element data are corrected based on the M×N constant data $K_{ij}$ so that the calculated temporary values $SA_1$ to $SA_N$ of the N pieces of detection data become close to the N pieces of detection data $S_1$ to $S_N$. By repeatedly performing the data configuration process many times, convergence values of the M pieces of element data suitable for the N pieces of detection data $S_1$ to $S_N$ may be obtained (FIGS. 9A and 9B, FIGS. 11A and 11B, and FIGS. 13A and 13B).

However, the element data configuration unit 22 repeatedly performs the data configuration process at least twice so that a sum of a value obtained by multiplying a difference between the first temporary value ($PA_j^{t=1}$) of the element data obtained by the first data configuration process and the second temporary value ($PA_j^{t=2}$) of the element data obtained by the second data configuration process by the coefficient γ and the first temporary value ($PA_j^{t=1}$) is calculated for each of the M sections $A_1$ to $A_M$ as an estimation value of the element data P obtained by repeatedly performing the data configuration processes (Expression (13)). Accordingly, as compared with the case where a convergence value of the element data P is obtained by repeatedly performing the data configuration process many times, the number of repetition times for the data configuration process may be considerably reduced and calculation is simplified.

According to this embodiment, by calculating the estimation value of the element data P by using the temporary value ($PA_j^{t=1}$) of the first data configuration process and the temporary value ($PA_j^{t=2}$) of the second data configuration process (Expression (13)), the data configuration process is performed only twice and the calculation is considerably simplified.

Furthermore, the estimation value of the element data P obtained as a sum of the value obtained by multiplying the difference between the first temporary value ($PA_j^{t=1}$) and the second temporary value ($PA_j^{t=2}$) by the coefficient γ and the first temporary value ($PA_j^{t=1}$) has a certain degree of error relative to the convergence value of the element data P obtained by repeatedly performing the data configuration process many times. An absolute value of the coefficient γ which minimizes the error has a tendency to become smaller as the difference between the two temporary values PA becomes larger in the element data P. Accordingly, the coefficient γ is calculated such that the absolute value becomes small as the difference between the two temporary values PA becomes large in each of the M pieces of element data P based on the two temporary values PA obtained by the data configuration process performed twice on each of the M pieces of element data P, so that an error from an optimum value of the coefficient γ may be reduced as compared with a case where the coefficient γ is set as a fixed value.

Furthermore, according to this embodiment, the evaluation value D corresponding to a difference degree of the two temporary values PA in each of the M pieces of element data P is calculated, and a value of a predetermined function having the evaluation value D as a variable is obtained as the coefficient γ. In this way, an optimum coefficient γ corresponding to a difference degree of the two temporary values PA in each of the M pieces of element data P may be obtained.

Furthermore, since the first temporary value ($PA_j^{t=1}$) and the second temporary value ($PA_j^{t=2}$) to be used in the calculation of the estimation value of the element data P (Expression (13)) are also used in calculation of the coefficient γ (Expression (14)), calculation of the coefficient γ may be easily performed.

Second Embodiment

Next, a second embodiment of the present invention will be described. An input device according to the second embodiment performs the process of the element data configuration unit 22 included in the input device according to the first embodiment except for a portion of the process, and other configurations of the input device are the same as those of the input device according to the first embodiment.

Figure 17:
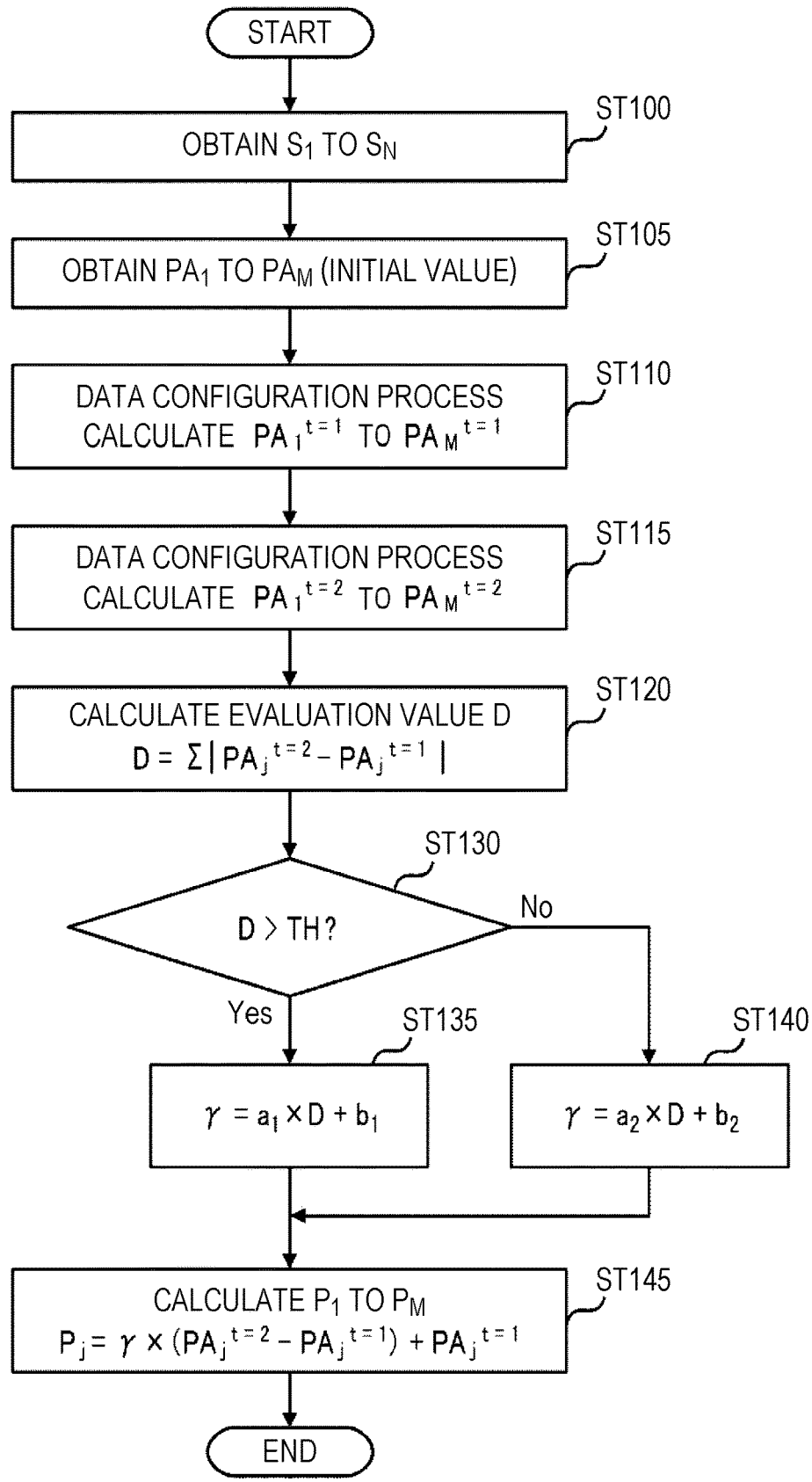
FIG. 17 is a flowchart of an example of a method for configuring M pieces of element data using N pieces of detection data in an input device according to a second embodiment.

FIG. 17 is a flowchart of an example of a method for configuring M pieces of element data from N pieces of detection data in the input device according to the second embodiment. The flowchart of FIG. 17 is obtained by replacing step ST125 in the flowchart of FIG. 7 by step ST130, step ST135, and step ST140, and other steps are the same as those in the flowchart of FIG. 7.

The element data configuration unit 22 selects a function to be used to calculate a coefficient γ from among the following two equations in accordance with the magnitude relationship between an evaluation value D and a threshold value TH.

$$D > TH \quad \gamma = a_1 \times D + b_1 \quad (15\text{-}1)$$

$$D \leq TH \quad \gamma = a_2 \times D + b_2 \quad (15\text{-}2)$$

When an evaluation value D calculated in step ST120 is larger than a threshold value TH (Yes in ST130), the element data configuration unit 22 calculates the coefficient γ in accordance with Expression (15-1) (ST135), and when the evaluation value D is equal to or smaller than the threshold value TH (No in ST130), the element data configuration unit 22 calculates the coefficient γ in accordance with Expression (15-2) (ST140).

Figure 18:
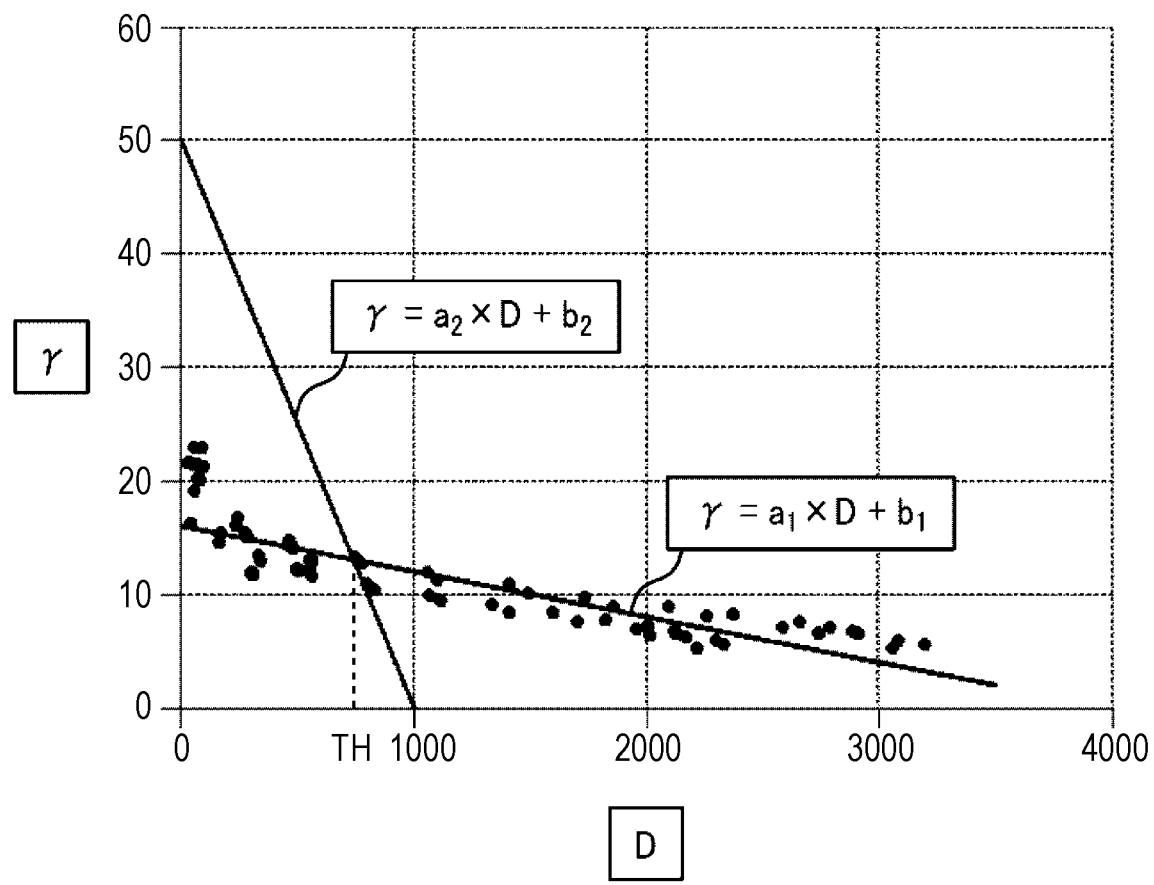
FIG. 18 is a diagram illustrating the correlation between an evaluation value D which is associated with a difference degree of two temporary values obtained by performing a data configuration process twice and a coefficient γ and illustrating determination of conversion from the evaluation value D to the coefficient γ using two types of linear function having different inclinations.

FIG. 18 is a diagram illustrating the correlation between the evaluation value D calculated in accordance with Expression (14-1) and the coefficient γ. A graph illustrated in FIG. 18 is basically the same as that of FIG. 15, but a range of the coefficient γ in an axis of ordinates is larger than that in FIG. 15.

As illustrated in FIG. 18, the element data configuration unit 22 changes a linear function to be used to calculate the coefficient γ by using a threshold value TH as a boundary. Specifically, when the evaluation value D is larger than the threshold value TH, the element data configuration unit 22 calculates the coefficient γ in accordance with Expression (15-1) in which an absolute value of a negative inclination is comparatively small, and when the evaluation value D is equal to or smaller than the threshold value TH, the element data configuration unit 22 calculates the coefficient γ in accordance with Expression (15-2) in which an absolute value of a negative inclination is comparatively large.

Figure 19A:
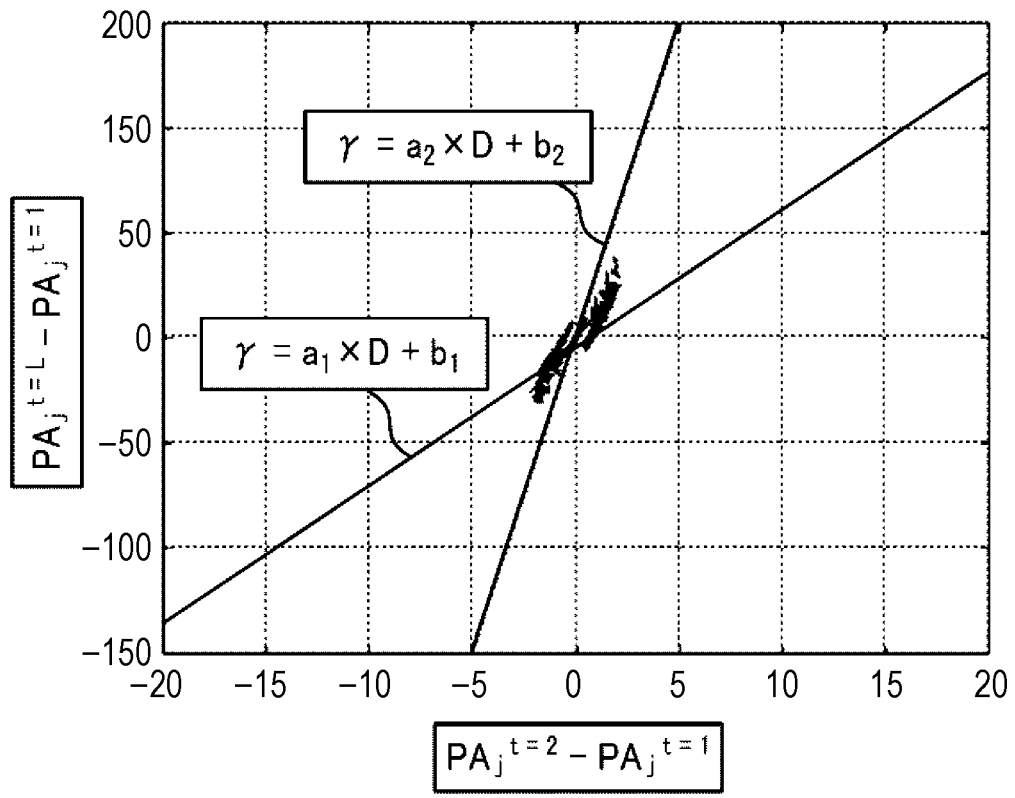
FIGS. 19A and 19B are diagrams illustrating an example of a simulation result of the element data configuration process in the input device according to the second embodiment under the same condition as FIG. 9A, where
Figure 19B:
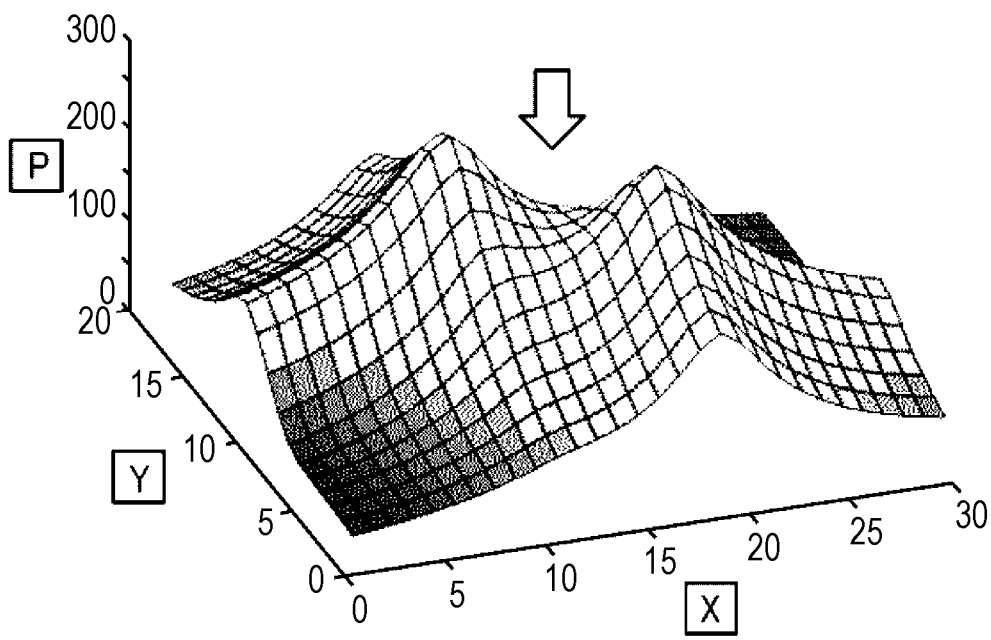

FIGS. 19A and 19B are diagrams illustrating an example of a simulation result of the element data configuration process performed by the input device according to this embodiment. The simulation result is obtained under the condition of FIG. 9A (in the case where a distance between two objects is short). FIG. 19A is a diagram illustrating the correlation between a value obtained by subtracting a first temporary value $(PA_j^{t-1})$ from a second temporary value $(PA_j^{t-2})$ and a value obtained by subtracting the first temporary value $(PA_j^{t-1})$ from a convergence value $(PA_j^{t=L})$. FIG. 19B is a diagram illustrating a two-dimensional distribution of the element data P estimated by using the coefficient γ obtained by a method of this embodiment.

As is apparent from a comparison between FIGS. 19B and 9B, a boundary (a position of an arrow mark in FIG. 19B) between two objects in the two-dimensional distribution of FIG. 19B is clarified as compared with the two-dimensional distribution of FIG. 9B. Accordingly, when a distance between the two objects is small (when the evaluation value D is small), it is found that a boundary between the two objects is clarified by increasing an absolute value of an inclination of the linear function to be used in the calculation of the coefficient γ.

As described hereinabove, according to this embodiment, as a distance between the objects approaching the operation plane 11 is reduced, a difference degree of the two temporary values PA for each of the M pieces of element data P tends to be small, and accordingly, the evaluation value D also becomes small. Furthermore, when the distance between the objects is short, the boundary between the objects approaching the operation plane 11 tends to be clarified by increasing a coefficient γ (FIGS. 19A and 19B). Accordingly, by making an absolute value of an inclination ($a_2$) of the linear function in a range in which the evaluation value D is smaller than the threshold value TH to be larger than an absolute value of the inclination ($a_1$) of the linear function in a range in which the evaluation value D is larger than the threshold value TH, the coefficient γ is easily increased when the evaluation value D is reduced since the distance between the objects approaching the operation plane 11 is reduced. By this, the boundary between the objects may be clarified as compared with the distribution of the element data P converted by the data configuration process which is repeatedly performed.

Note that the function of calculating the coefficient γ by using the evaluation value D is not limited to the linear function but may be a quadratic function including a curved line. In this case, the same effect described above may be obtained when the coefficient γ is calculated by using a function in which an absolute value of a derivative in a range in which the evaluation value D is smaller than the threshold value is larger than an absolute value of a derivative in a range in which the evaluation value D is larger than the threshold value. Specifically, by making an absolute value of the derivative in the range in which the evaluation value D is smaller than the threshold value to be larger than an absolute value of the derivative in the range in which the evaluation value D is larger than the threshold value, the coefficient γ is easily increased when the evaluation value D is reduced since the distance between the objects approaching the operation plane 11 is reduced, and accordingly, it is possible to clarify the boundary between the objects.

Third Embodiment

Figure 20:
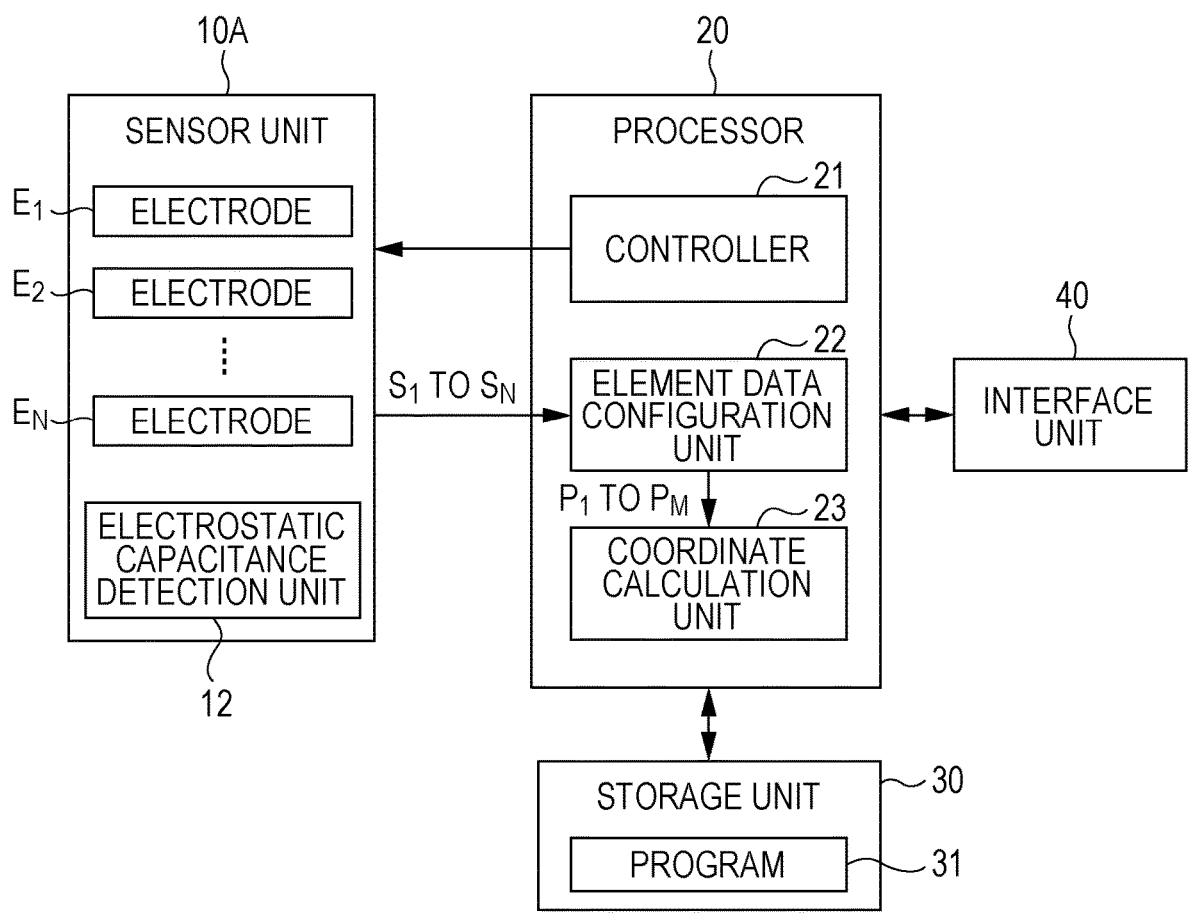
FIG. 20 is a diagram illustrating an example of a configuration of an input device according to a third embodiment.

Next, a third embodiment of the present invention will be described. FIG. 20 is a diagram illustrating an example of a configuration of an input device according to the third embodiment. The input device according to this embodiment is obtained by embodying the sensor unit 10 of the input device according to the first embodiment as a sensor employing an electrostatic capacitance method, and an entire configuration is the same as the input device according to the first embodiment.

A sensor unit 10A included in the input device of this embodiment has N electrodes $E_1$ to $E_N$ formed in respective detection regions R. In a description below, the N electrodes $E_1$ to $E_N$ are referred to as an "electrode E" without distinguishing the N electrodes $E_1$ to $E_N$ from one another where appropriate.

Furthermore, the sensor unit 10A includes an electrostatic capacitance detection unit 12 which generates detection data S corresponding to an electrostatic capacitance (a first electrostatic capacitance) generated between an object approaching an operation plane 11 and the electrode E. The electrostatic capacitance detection unit 12 generates the detection data S for each of the N electrodes E.

The electrostatic capacitance detection unit 12 samples charges corresponding to electrostatic capacitances of capacitors formed between the N detection electrodes and the object, and outputs detection data S corresponding to the sampled charges. The electrostatic capacitance detection unit 12 includes, for example, an electrostatic capacitance/voltage conversion circuit (CV conversion circuit) and an analog/digital (A/D) conversion circuit. Based on a control of the processor 20, the CV conversion circuit causes the capacitors formed between the N detection electrodes E and the object to be charged or to perform discharge, transfers charges of the capacitors transmitted through the detection electrodes E due to the charge/discharge to capacitors for reference, and outputs signals corresponding to voltages generated in the capacitors for reference. Based on a control of the processor 20, the A/D conversion circuit converts a signal output from the CV conversion circuit into a digital signal in a predetermined cycle so as to output detection data S. In a description hereinafter, detection data of an electrostatic capacitance of an electrode $E_i$ is denoted by "$S_i$".

Figure 21:
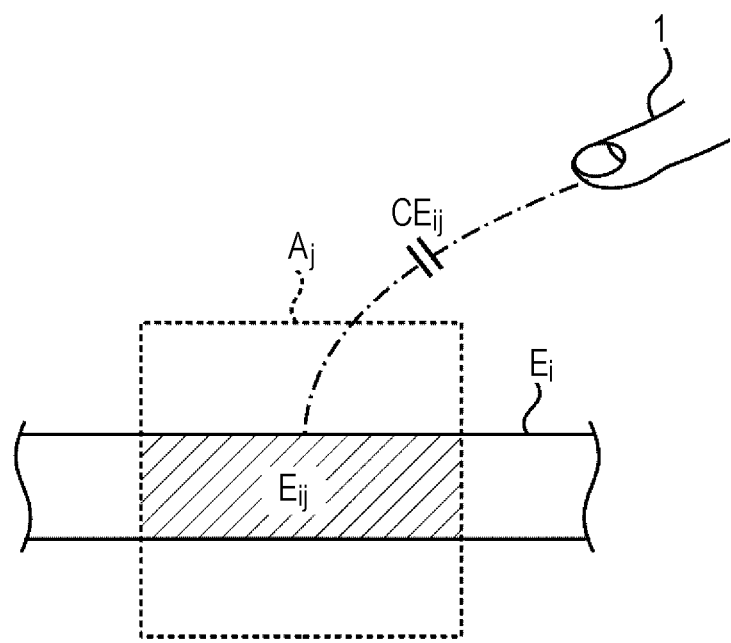
FIG. 21 is a diagram illustrating a second electrostatic capacitance between an overlapping portion of a single electrode in a single section and an object.

FIG. 21 is a diagram for explaining a second electrostatic capacitance $CE_{ij}$ between an overlapping portion $E_{ij}$ of a single electrode $E_i$ in a single section $A_j$ and an object 1. In FIG. 21, "$E_{ij}$" indicates an overlapping portion of the electrode $E_i$ relative to the section $A_j$. Furthermore, "$CE_{ij}$" indicates an electrostatic capacitance (a second electrostatic capacitance) formed between the overlapping portion $E_{ij}$ of the electrode $E_i$ and the object 1, such as a finger.

The number of electrodes $E_1$ to $E_N$ is smaller than the number of sections $A_1$ to $A_M$, and the electrodes $E_1$ to $E_N$ are disposed such that at least one electrode E has an overlapping portion $E_{ij}$ in each of the sections A.

Furthermore, the electrodes $E_1$ to $E_N$ are disposed such that the different electrodes $E_1$ to $E_N$ have different combinations of the sections A for overlapping portions. For example, when the electrode $E_1$ has overlapping portions in the sections $A_1$ and $A_2$, the other electrodes E have overlapping portions in the sections A other than the combination of the sections $A_1$ and $A_2$. Note that, in a case where some of the electrodes E have the overlapping portions in the same combination of the sections A, areas of the overlapping portions of the electrodes E may be differentiated in at least portions of the sections. Specifically, the electrodes $E_1$ to $E_N$ are disposed on the operation plane 11 so as to have different overlapping patterns on the sections $A_{11}$ to $A_M$.

Assuming that an electrostatic capacitance generated between the entire overlapping portion $E_{ijij}$ of the electrode E included in the section $A_j$ and the object 1 is referred to as a "third electrostatic capacitance $CA_i$", a change $\Delta CA_i$ of the third electrostatic capacitance $CA_i$ is substantially equal to a value obtained by adding second electrostatic capacitance changes $\Delta CE_{ij}$ of the electrodes E in the section $A_j$, and is represented by the following equation.

$$\Delta CA_j = \sum_{i=1}^{N} \Delta CE_{ij} \quad (16)$$

In Expression (16), in case that the section $A_j$ and the electrode $E_i$ do not have an overlapping portion $E_{ij}$, the second electrostatic capacitance change $\Delta CE_{ij}$ is treated as zero.

When the electrostatic capacitance formed between the electrode $E_i$ and the object is referred to as a "first electrostatic capacitance $CE_i$", a change $\Delta CE_i$ of the first electrostatic capacitance $CE_i$ is substantially the same as a value obtained by adding of the changes $\Delta CE_{ij}$ of the second electrostatic capacitances of all overlapping portions $E_{ij}$ included in the electrode $E_i$, and therefore, is represented by the following equation.

$$\Delta CE_i = \sum_{j=1}^{M} \Delta CE_{ij} \quad (17)$$

The second electrostatic capacitance $CE_{ij}$ formed between a single overlapping portion $E_{ij}$ and the object 1 is substantially proportional to an area of the overlapping portion $E_{ij}$. Furthermore, the third electrostatic capacitances $CA_j$ (Expression (16)) formed between the overlapping portions of all the electrodes $E_i$ included in the section $A_j$ and the object 1 are substantially proportional to an area of all overlapping portions included in the section $A_j$. Therefore, when a rate of an area of a single overlapping portion $E_{ij}$ to an area of all overlapping portions which are positioned in the same section $A_j$ is represented as constant data $K_{ij}$, as represented by the following equation, the constant data $K_{ij}$ represents a rate of the second electrostatic capacitance change $\Delta CE_{ij}$ to the third electrostatic capacitance change $\Delta CA_j$.

$$K_{ij} = \frac{\Delta CE_{ij}}{\Delta CA_j} \quad (18)$$

When the relationship of Expression (18) is used, Expression (17) is represented as follows.

$$\Delta CE_i = \sum_{j=1}^{M} K_{ij} \Delta CA_j \quad (19)$$

Expression (19) is represented as follows using matrices.

$$\underbrace{\begin{bmatrix} K_{11} & K_{12} & \cdots & K_{1M} \\ K_{21} & & & K_{2M} \\ \vdots & & & \vdots \\ K_{N1} & K_{N2} & \cdots & K_{NM} \end{bmatrix}}_{K} \begin{bmatrix} \Delta CA_1 \\ \Delta CA_2 \\ \vdots \\ \Delta CA_M \end{bmatrix} = \begin{bmatrix} \Delta CE_1 \\ \Delta CE_2 \\ \vdots \\ \Delta CE_N \end{bmatrix} \quad (20)$$

Here, the element data $P_j$ of the section $A_j$ is proportional to the third electrostatic capacitance change $\Delta CA_j$, the detection data $S_i$ of the electrostatic capacitance detected by the electrostatic capacitance detection unit 12 is proportional to the first electrostatic capacitance change $\Delta CE_i$, and the partial element data $U_{ij}$ of the overlapping portion $E_{ij}$ is proportional to the second electrostatic capacitance change $\Delta CE_{ij}$. Specifically, the following expressions are established.

$$P_j \propto \Delta CA_j \quad (21\text{-}1)$$

$$S_i \propto \Delta CE_i \quad (21\text{-}2)$$

$$U_{ij} \propto \Delta CE_{ij} \quad (21\text{-}3)$$

According to Expressions (21-1) to (21-3), Expressions (16) to (20) are equal to Expressions (1) to (5), respectively, described above. Accordingly, even in this embodiment, M pieces of element data $P_1$ to $P_M$ may be configured by using N pieces of detection data $S_1$ to $S_N$ similarly to the first embodiment.

Figure 22A:
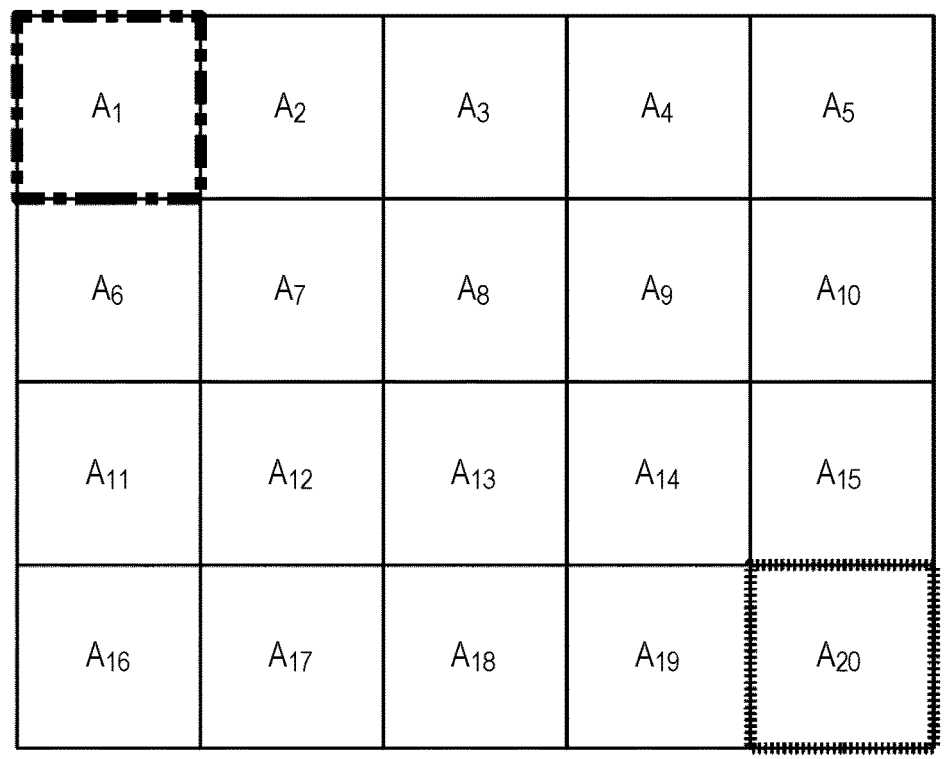
FIGS. 22A and 22B are diagrams illustrating an example of a pattern of electrodes in the input device according to the third embodiment, where
Figure 22B:
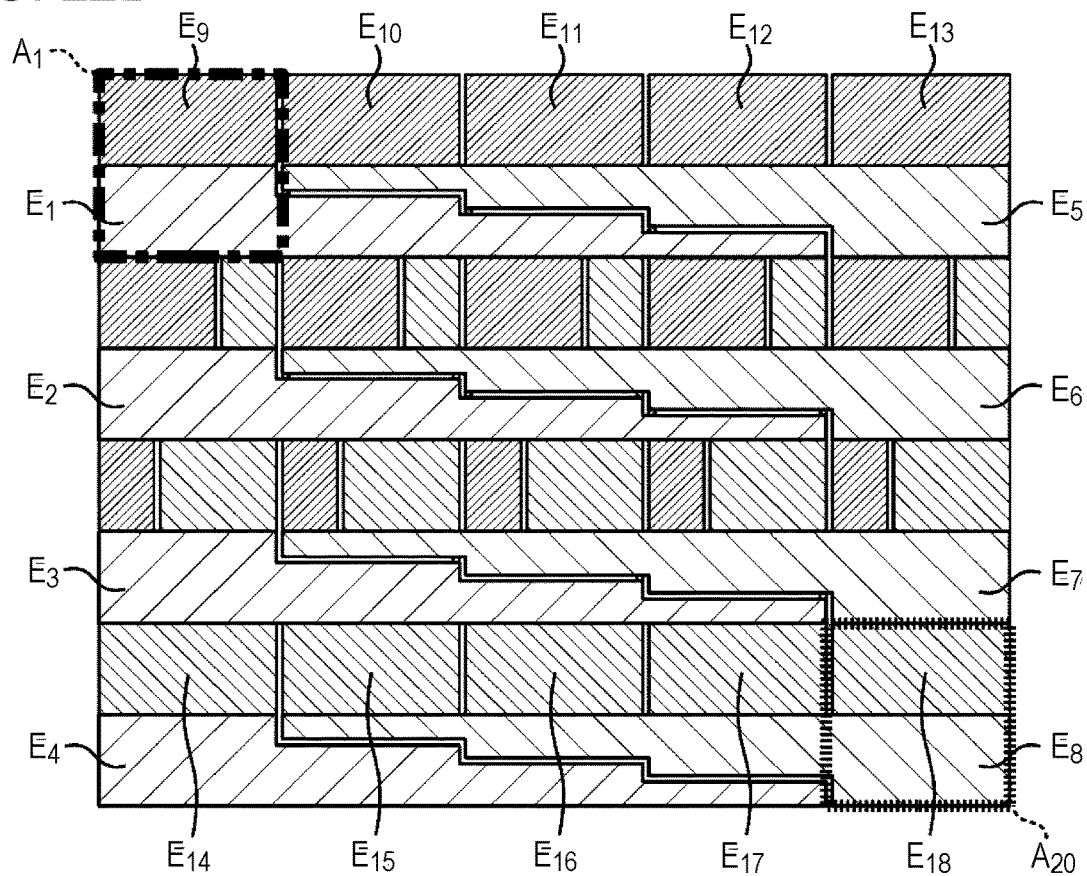
Figure 23A:
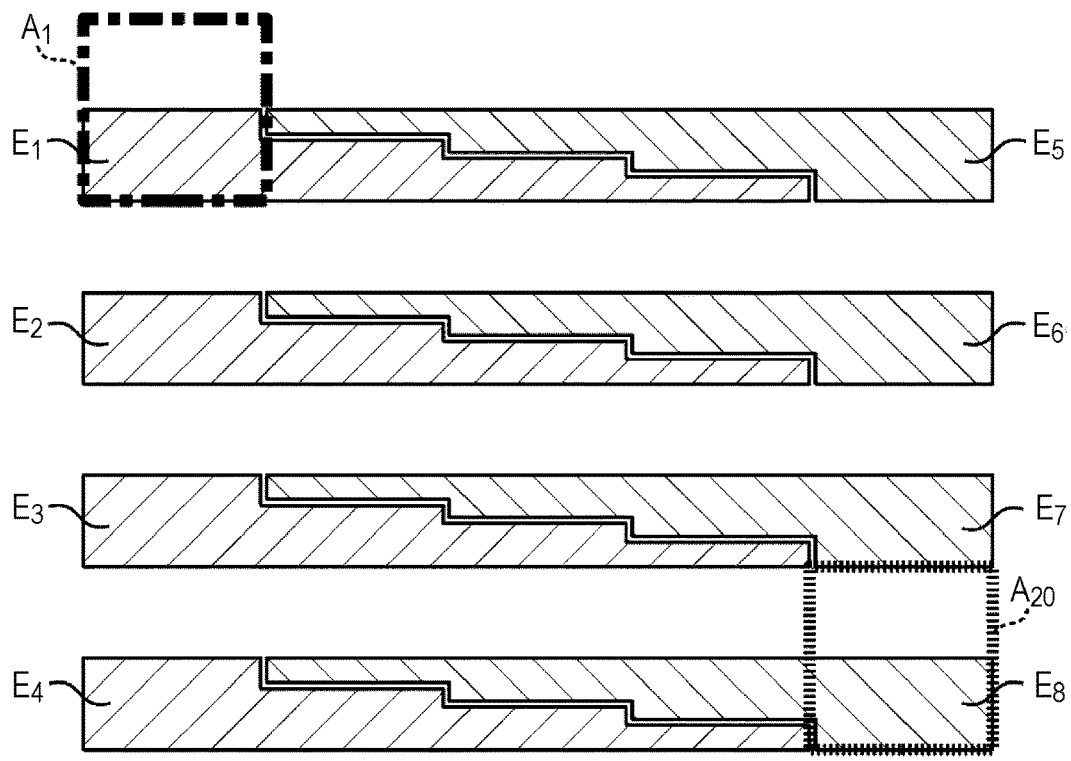
FIGS. 23A and 23B are diagrams illustrating the pattern of electrodes of FIG. 22B in detail, where
Figure 23B:
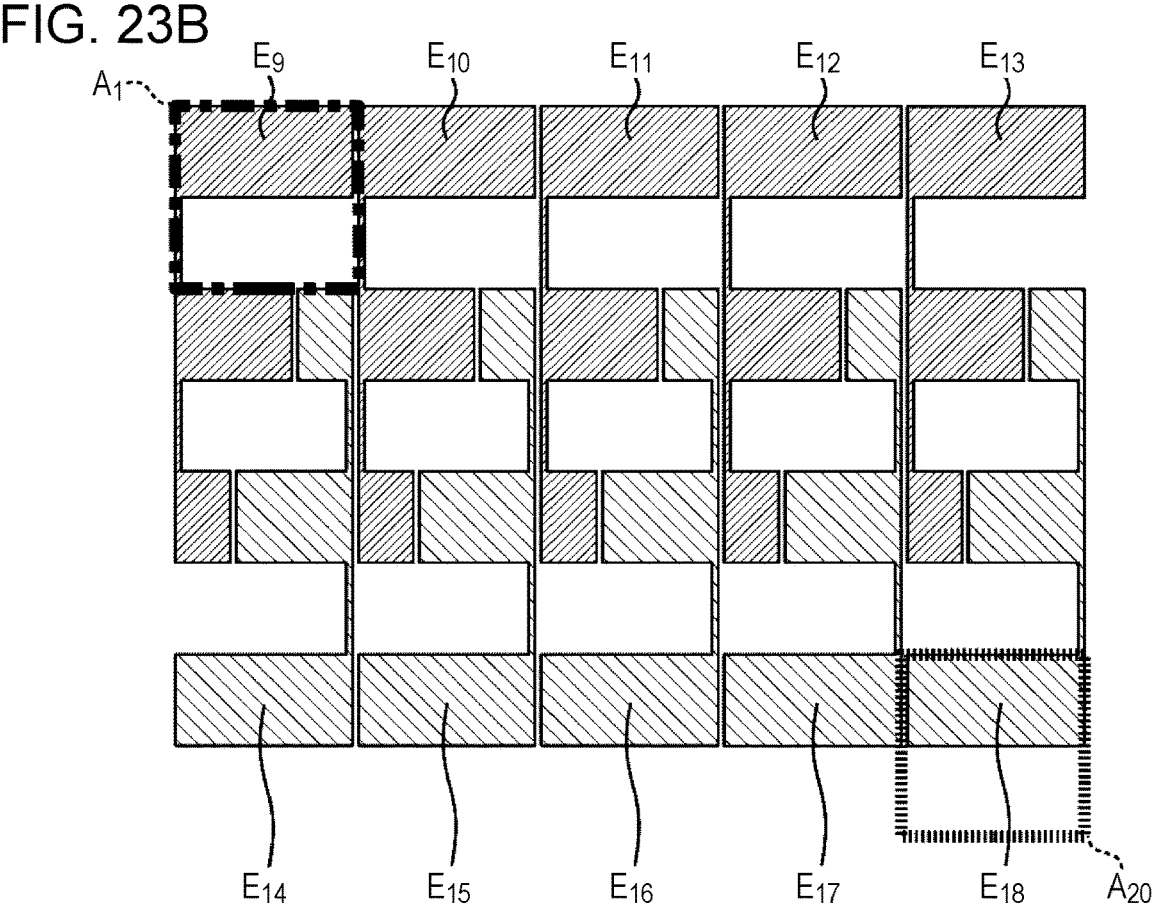

FIGS. 22A and 22B are diagrams illustrating an example of an electrode pattern of the input device according to the third embodiment. In FIG. 22A, 20 sections ($A_1$ to $A_{20}$) on the operation plane 11 are illustrated, and in FIG. 22B, 18 electrode patterns ($E_1$ to $E_{18}$) which overlap with the individual sections A are illustrated. FIGS. 23A and 23B are diagrams illustrating the electrode patterns ($E_1$ to $E_{18}$) of FIG. 22B in detail. In FIG. 23A, eight electrode patterns ($E_1$ to $E_8$) formed on an upper layer are illustrated, and in FIG. 23B, ten electrode patterns ($E_9$ to $E_{18}$) formed on a lower layer are illustrated.

In the examples of FIGS. 22A and 22B, the operation plane 11 of the sensor unit 10A has a substantially rectangle shape and is divided into a grid pattern in a matrix of 4 rows by 5 columns by using the 20 sections $A_1$ to $A_{20}$. The sections $A_1$ to $A_5$ are arranged starting from a first row in a first column to the first row in a fifth column in numerical order, the sections $A_6$ to $A_{10}$ are arranged starting from a second row in the first column to the second row in the fifth column in numerical order, the sections $A_{11}$ to $A_{15}$ are arranged starting from a third row in the first column to the third row in the fifth column in numerical order, and the sections $A_{16}$ to $A_{20}$ are arranged starting from a fourth row in the first column to the fourth row in the fifth column in numerical order.

In the example of FIG. 23A, the electrodes $E_1$ to $E_4$ are positioned in the first to fourth rows in the grid pattern in this order and extend from the first column to the fourth column. Rates of areas which are occupied by the electrodes $E_1$ to $E_4$ in the individual sections are 4/8 in the first column, 3/8 in the second column, 2/8 in the third column, and 1/8 in the fourth column. Furthermore, the electrodes $E_5$ to $E_8$ are positioned in the first to fourth rows in the grid pattern in this order and extend from the fifth column to the second column. Rates of areas which are occupied by the electrodes $E_5$ to $E_8$ in the individual sections are 4/8 in the fifth column, 3/8 in the fourth column, 2/8 in the third column, and 1/8 in the second column.

In the example of FIG. 23B, the electrodes $E_9$ to $E_{13}$ are positioned in the first to fifth columns in the grid pattern in this order and extend from the first row to the third row. Rates of areas which are occupied by the electrodes $E_9$ to $E_{13}$ in the individual sections are 3/6 in the first row, 2/6 in the second row, and 1/6 in the third row. Furthermore, the electrodes $E_{14}$ to $E_{18}$ are positioned in the first to fifth columns in the grid pattern in this order and extend from the fourth row to the second row. Rates of areas which are occupied by the electrodes $E_{14}$ to $E_{18}$ in the individual sections are 3/6 in the fourth row, 2/6 in the third row, and 1/6 in the second row.

When the electrode $E_1$ in the first row is focused, the electrode $E_1$ has an area of 4/8 of the section $A_{11}$, an area of 3/8 of the section $A_2$, an area of 2/8 of the section $A_3$, and an area of 1/8 of the section $A_4$. Therefore, constant data $K_{11}$ of the electrode $E_1$ relative to the section $A_1$ is 4/8, constant data $K_{12}$ of the electrode $E_1$ relative to the section $A_2$ is 3/8, constant data $K_{13}$ of the electrode $E_1$ relative to the section $A_3$ is 2/8, and constant data $K_{14}$ of the electrode $E_1$ relative to the section $A_4$ is 1/8. By performing the similar calculation, the first conversion matrix K formed by constant data $K_{ij}$ in a matrix of 18 rows by 20 columns is represented as follows.

$$K = \begin{bmatrix} 0.5 & 0.38 & 0.25 & 0.13 & 0 & 0 & 0 & 0 & 0 & 0 & 0 & 0 & 0 & 0 & 0 & 0 & 0 & 0 & 0 & 0 \\ 0 & 0 & 0 & 0 & 0 & 0.5 & 0.38 & 0.25 & 0.13 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0.5 & 0.38 & 0.25 & 0.13 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0.5 & 0.38 & 0.25 & 0.13 & 0 \\ 0 & 0.13 & 0.25 & 0.38 & 0.5 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0.13 & 0.25 & 0.38 & 0.5 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0.13 & 0.25 & 0.38 & 0.5 & 0 & 0 & 0 & 0 & 0 \\ 0 & 0 & 0 & 0 & 0 & 0 & 0 & 0 & 0 & 0 & 0 & 0 & 0 & 0 & 0 & 0 & 0.13 & 0.25 & 0.38 & 0.5 \\ 0.5 & 0 & 0 & 0 & 0 & 0.33 & 0 & 0 & 0 & 0 & 0.17 & 0 & 0 & 0 & 0 & 0 & 0 & 0 & 0 & 0 \\ 0 & 0.5 & 0 & 0 & 0 & 0 & 0.33 & 0 & 0 & 0 & 0 & 0.17 & 0 & 0 & 0 & 0 & 0 & 0 & 0 & 0 \\ 0 & 0 & 0.5 & 0 & 0 & 0 & 0 & 0.33 & 0 & 0 & 0 & 0 & 0.17 & 0 & 0 & 0 & 0 & 0 & 0 & 0 \\ 0 & 0 & 0 & 0.5 & 0 & 0 & 0 & 0 & 0.33 & 0 & 0 & 0 & 0 & 0.17 & 0 & 0 & 0 & 0 & 0 & 0 \\ 0 & 0 & 0 & 0 & 0.5 & 0 & 0 & 0 & 0 & 0.33 & 0 & 0 & 0 & 0 & 0.17 & 0 & 0 & 0 & 0 & 0 \\ 0 & 0 & 0 & 0 & 0 & 0.17 & 0 & 0 & 0 & 0 & 0.33 & 0 & 0 & 0 & 0 & 0.5 & 0 & 0 & 0 & 0 \\ 0 & 0 & 0 & 0 & 0 & 0 & 0.17 & 0 & 0 & 0 & 0 & 0.33 & 0 & 0 & 0 & 0 & 0.5 & 0 & 0 & 0 \\ 0 & 0 & 0 & 0 & 0 & 0 & 0 & 0.17 & 0 & 0 & 0 & 0 & 0.33 & 0 & 0 & 0 & 0 & 0.5 & 0 & 0 \\ 0 & 0 & 0 & 0 & 0 & 0 & 0 & 0 & 0.17 & 0 & 0 & 0 & 0 & 0.33 & 0 & 0 & 0 & 0 & 0.5 & 0 \\ 0 & 0 & 0 & 0 & 0 & 0 & 0 & 0 & 0 & 0.17 & 0 & 0 & 0 & 0 & 0.33 & 0 & 0 & 0 & 0 & 0.5 \end{bmatrix} \quad (22)$$

As described above, even the input device according to the third embodiment which detects a degree of proximity of the object based on an electrostatic capacitance may configure a larger number of element data P than a number of detection data S by the calculation process simplified similarly to the first embodiment.

Fourth Embodiment

Figure 24:
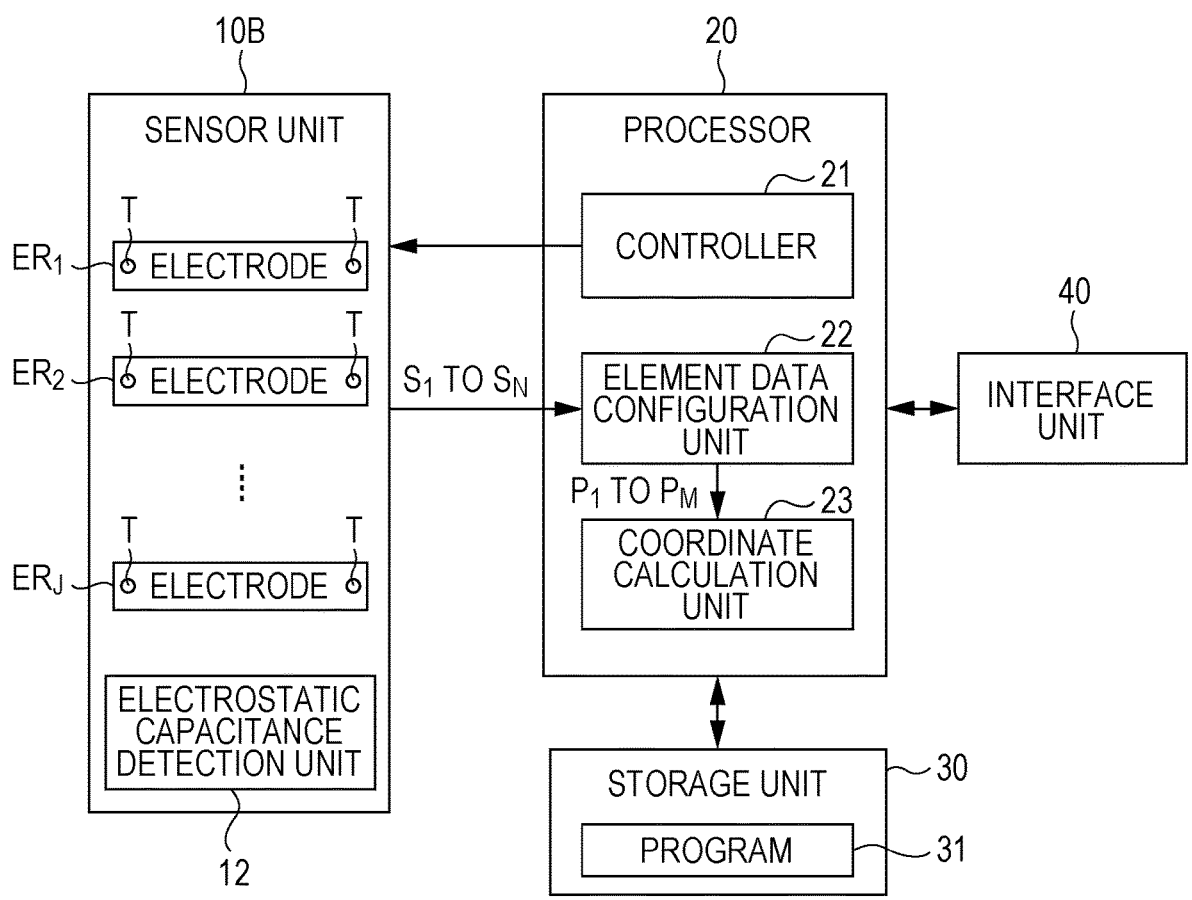
FIG. 24 is a diagram illustrating an example of a configuration of an input device according to a fourth embodiment.

Next, a fourth embodiment of the present invention will be described. FIG. 24 is a diagram illustrating an example of a configuration of an input device according to a fourth embodiment. The input device according to this embodiment is obtained by replacing the sensor unit 10A included in the input device according to the third embodiment by a sensor unit 10B, and an entire configuration is the same as the input device according to the third embodiment.

The sensor unit 10B has J electrodes $ER_1$ to $ER_J$ formed in respective different detection regions R. In a description below, the J electrodes $ER_1$ to $ER_J$ are referred to as an "electrode ER" without distinguishing the J electrodes $ER_1$ to $ER_J$ from one another where appropriate.

Each of the electrodes ER has a plurality of terminals T, and the J electrodes ER have N terminals T as a whole. In the example of FIG. 24, each of the electrodes ER has two terminals T, and therefore, the number J of the electrodes ER is half of the number N of terminals T. Note that, as a modification of this embodiment, the electrode ER may have 3 or more terminals T.

The electrode ER is formed of material having a resistance value higher than those of general metal members (for example, ITO used for a transparent conductive film).

The electrostatic capacitance detection unit 12 inputs charges to be accumulated between the object approaching the operation plane 11 and the electrodes ER from the N terminals T, and generates detection data S corresponding to electrostatic capacitances between the object and the electrodes ER based on the input charges for each of the N terminals T.

Furthermore, when inputting a charge to be accumulated in a single electrode ER, the electrostatic capacitance detection unit 12 simultaneously inputs the charge from the plurality of terminals T disposed in the single electrode ER. By this, the charge accumulated in the electrode ER is distributed to the plurality of terminals T. Here, it is expected that a rate of the distribution of the charge is proportional to conductance (an inverse number of a resistance value) in a range from a portion in the electrode ER where the charge is accumulated to the terminals T. Specifically, a larger amount of charge is distributed to a terminal T having larger conductance.

Figure 25:
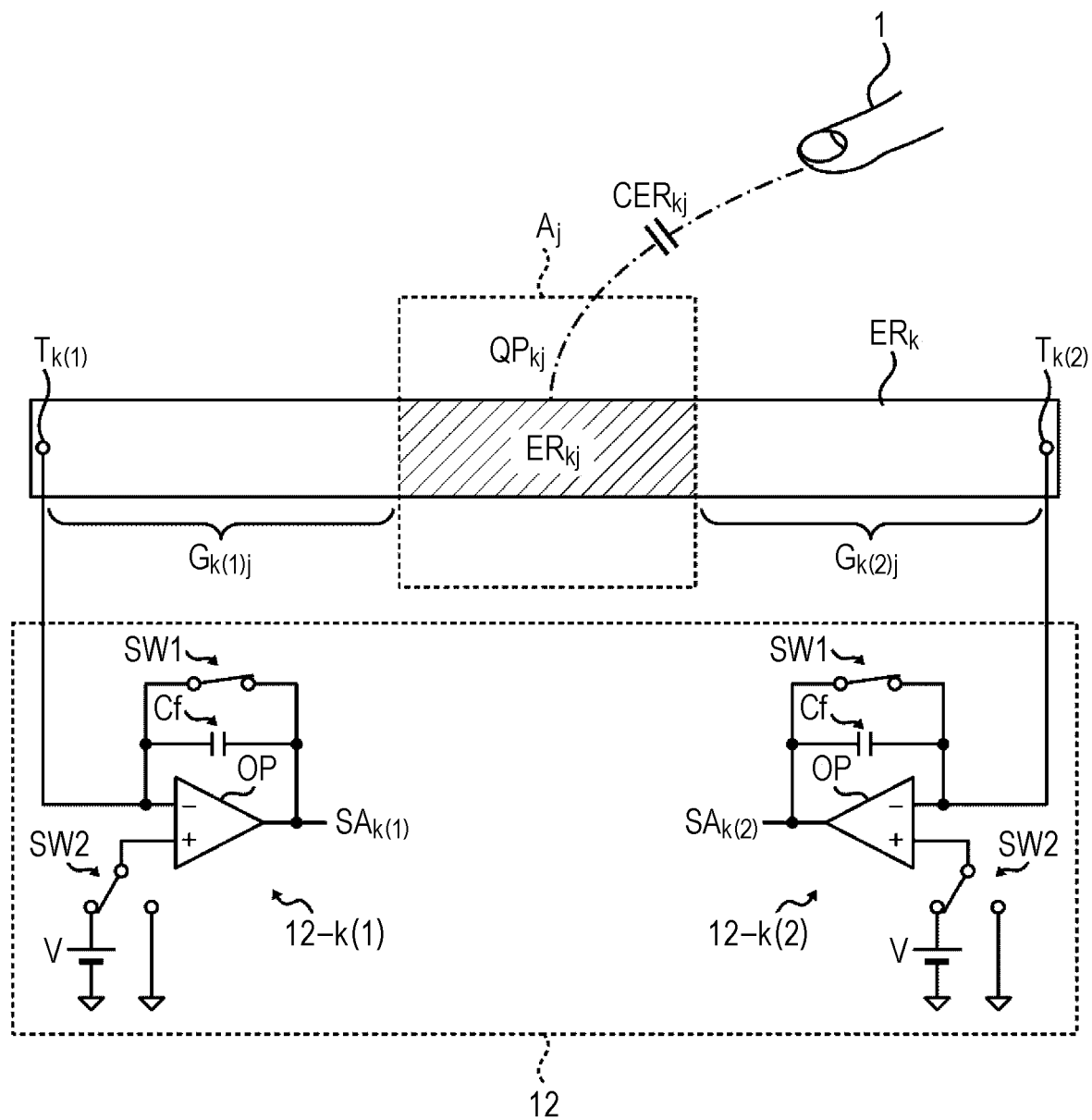
FIG. 25 is a diagram illustrating a state in which charge is accumulated between an overlapping portion of a single electrode in a single section and an object.
Figure 26:
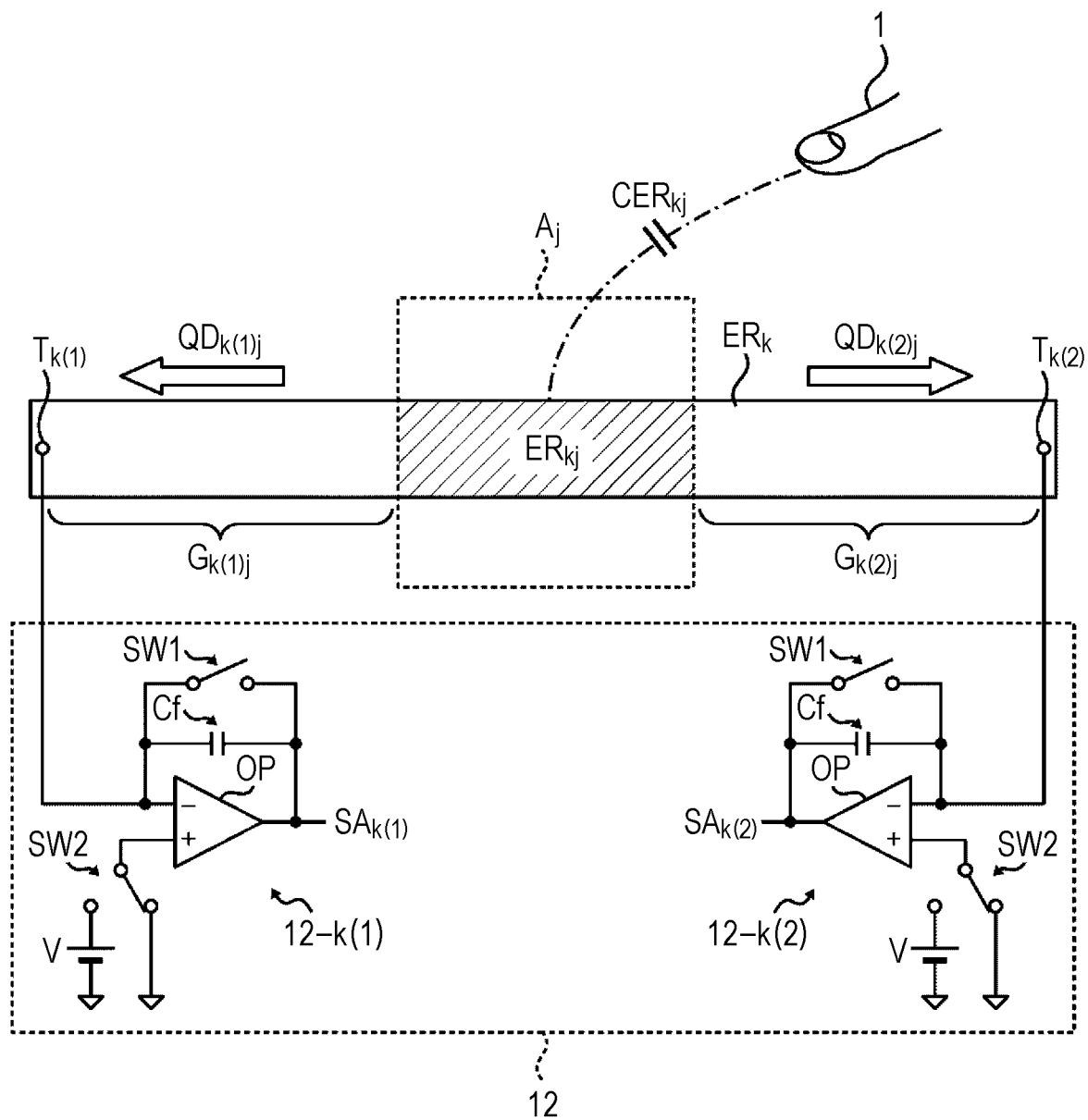
FIG. 26 is a diagram illustrating a state in which charge accumulated in a single electrode in a single section is distributed to two terminals.

FIG. 25 is a diagram illustrating a state in which a partial charge $QP_{kj}$ is accumulated between an overlapping portion $ER_{kj}$ of a single electrode $ER_k$ in a single section $A_j$ and the object 1. FIG. 26 is a diagram illustrating a state in which the partial charge $Q_{kj}$ is distributed to two terminals $T_{k(1)}$ and $T_{k(2)}$ of the electrode $ER_k$. Note that "k" indicates an integer in a range from 1 to J. Furthermore, "k(1)" and "k(2)" indicate integers in a range from 1 to N individually associated with the integer k.

In FIGS. 25 and 26, "$G_{k(1)j}$" indicates conductance in a range from the overlapping portion $ER_{kj}$ to the terminal $T_{k(1)}$, and "$G_{k(2)j}$" indicates conductance in a range from the overlapping portion $ER_{kj}$ to the terminal $T_{k(2)}$. Furthermore, "$CER_{kj}$" indicates an electrostatic capacitance between the overlapping portion $ER_{kj}$ and the object 1.

In FIG. 26, "$QD_{k(1)j}$" indicates distribution charge distributed to the terminal $T_{k(1)}$ in the partial charge $QP_{kj}$. Furthermore, "$QD_{k(2)j}$" indicates distribution charge distributed to the terminal $T_{k(2)}$ in the partial charge $QP_{kj}$.

The electrostatic capacitance detection unit 12 includes two charge amplifiers 12-k(1) and 12-k(2) which simultaneously input charge from the two terminals $T_{k(1)}$ and $T_{k(2)}$. Each of the charge amplifiers 12-k(1) and 12-k(2) includes an operation amplifier OP, a capacitor Cf, and switches SW1 and SW2. The capacitor Cf and the switch SW1 are connected in parallel between an output of the operation amplifier OP and an inversion input terminal. The switch SW2 selectively inputs a ground potential or a driving voltage V to a non-inversion input terminal of the operation amplifier OP. The inversion input terminal of the operation amplifier OP is connected to a corresponding one of the terminals T of the electrode $ER_{kj}$.

In the state of FIG. 25, the switches SW1 of the charge amplifiers 12-k(1) and 12-k(2) are individually turned on, and the switches SW2 individually input driving voltages V to the non-inversion input terminals of the operation amplifiers OP. By this, a voltage which is substantially the same as the driving voltage V is applied to the two terminals $T_{k(1)}$ and $T_{k(2)}$, and the partial charge $QP_{kj}$ is accumulated between the overlapping portion $ER_{kj}$ and the object 1.

In the state of FIG. 26, the switches SW1 of the charge amplifiers 12-k(1) and 12-k(2) are simultaneously turned off, and the switches SW2 simultaneously input the ground potential to the non-inversion input terminals of the operation amplifiers OP. By this, charge is transferred to the charge amplifiers 12-k(1) and 12-k(2) so that the two terminals $T_{k(1)}$ and $T_{k(2)}$ have the ground potential. The transfers of the charge are almost simultaneously started.

The partial charge $QP_{kj}$ is a sum of an distribution charge $QD_{k(1)j}$ distributed to the terminal $T_{k(1)}$ and an distribution charge $QD_{k(2)j}$ distributed to the terminal $T_{k(2)}$, and the following equation is established.

$$QP_{kj} = QD_{k(1)j} + QD_{k(2)j} \tag{23}$$

The distribution charge $QD_{k(1)j}$ and $QD_{k(2)j}$ are proportional to conductance $G_{k(1)j}$ and $G_{k(2)j}$ in the ranges from the overlapping portion $ER_{kj}$ to the two terminals $T_{k(1)}$ and $T_{k(2)}$, respectively. Assuming that coefficients indicating conductance rates are denoted by "$KG_{k(1)j}$" and "$KG_{k(2)j}$", the distribution charges $QD_{k(1)j}$ and $QD_{k(2)j}$ are represented by the following equations.

$$QD_{k(1)j} = KG_{k(1)j} \times QP_{kj} \tag{24-1}$$

$$QD_{k(2)j} = KG_{k(2)j} \times QP_{kj} \tag{24-2}$$

The coefficients $KG_{k(1)j}$ and $KG_{k(2)j}$ are represented by the following equation using the conductance $G_{k(1)j}$ and $G_{k(2)j}$.

$$KG_{k(1)j} = \frac{G_{k(1)j}}{(G_{k(1)j} + G_{k(2)j})} \tag{25-1}$$

$$KG_{k(2)j} = \frac{G_{k(2)j}}{(G_{k(2)j} + G_{k(2)j})} \tag{25-2}$$

Furthermore, a combined charge obtained by combining all partial charges $QP_{kj}$ accumulated in the overlapping portions $ER_{kj}$ of all the electrodes $ER_k$ in the section $A_j$ is denoted by "$Q_j$". The combined charge $Q_j$ is represented as follows.

$$Q_j = \sum_{k=1}^{J} QP_{kj} \tag{26}$$

The partial charge $QP_{kj}$ is proportional to the electrostatic capacitance $CER_{kj}$ between the overlapping portion $ER_{kj}$ and the object 1 in the section $A_j$, and the electrostatic capacitance $CER_{kj}$ is substantially proportional to an area of the overlapping portion $ER_{kj}$. Accordingly, assuming that an area rate of the overlapping portion $ER_{kj}$ of the electrode $ER_k$ in the section $A_j$ to the overlapping portions of all the electrodes is denoted by "$KS_{kj}$", the partial charge $QP_{kj}$ is represented by the following equation.

$$QP_{kj} = KS_{kj} \times Q_j \tag{27}$$

When Expression (27) is substituted for Expressions (24-1) and (24-2), the following equations are obtained.

$$QD_{k(1)j} = KG_{k(1)j} \times KS_{kj} \times Q_j \tag{28-1}$$

$$QD_{k(2)j} = KG_{k(2)j} \times KS_{kj} \times Q_j \tag{28-2}$$

In Expressions (28-1) and (28-2), when coefficients by which the combined charge $Q_j$ is multiplied are replaced by "$K_{k(1)j}$" and "$K_{k(2)j}$", the coefficients are represented by the following equations, respectively.

$$K_{k(1)j} = KG_{k(1)j} \times KS_{kj} \quad (29\text{-}1)$$

$$K_{k(2)j} = KG_{k(2)j} \times KS_{kj} \quad (29\text{-}2)$$

Since "k(1)" and "k(2)" are integers in a range from 1 to N, when "k(1)" and "k(2)" are replaced by an integer i, Expressions (29-1) and (29-2) are represented by the following equation.

$$K_{ij} = KG_{ij} \times KS_{kj} \quad (30)$$

When Expression (30) is substituted for Expressions (28-1) and (28-2), the distribution charge $QD_{ij}$ is represented by the following equation.

$$QD_{ij} = K_{ij} \times Q_j \quad (31)$$

When a detection charge input from a terminal $T_i$ to the electrostatic capacitance detection unit 12 is denoted by "$QD_i$", the detection charge $QD_i$ is obtained by adding all distribution charges $QD_{ij}$ associated with the terminal $T_i$ to one another, and therefore, the following equation is obtained in accordance with Expression (31).

$$QD_i = \sum_{j=1}^{M} K_{ij} Q_j \quad (32)$$

Expression (32) may be represented as follows by using matrices.

$$\underbrace{\begin{bmatrix} K_{11} & K_{12} & \cdots & K_{1M} \\ K_{21} & & & K_{2M} \\ \vdots & & & \vdots \\ K_{N1} & K_{N2} & \cdots & K_{NM} \end{bmatrix}}_{K} \begin{bmatrix} Q_1 \\ Q_2 \\ \vdots \\ Q_M \end{bmatrix} = \begin{bmatrix} QD_1 \\ QD_2 \\ \vdots \\ QD_N \end{bmatrix} \quad (33)$$

Furthermore, the combined charge $Q_j$ in the section $A_j$ is also obtained by adding all the distribution charges $QD_{ij}$ associated with the section $A_j$, and is represented by the following equation.

$$Q_j = \sum_{i=1}^{N} QD_{ij} \quad (34)$$

Here, the element data $P_j$ of the section $A_j$ is proportional to the combined change $Q_j$, the detection data $S_i$ of the terminal $T_i$ detected by the electrostatic capacitance detection unit 12 is proportional to the detection charge $QD_i$, and the partial element data $U_{ij}$ of the overlapping portion $E_{ij}$ is proportional to the distribution charge $QD_{ij}$. Specifically, the following expressions are established.

$$P_j \propto Q_j \quad (35\text{-}1)$$

$$S_i \propto QD_i \quad (35\text{-}2)$$

$$U_{ij} \propto QD_{ij} \quad (35\text{-}3)$$

According to Expressions (35-1) to (35-3), Expressions (31), (32), (33), and (34) are equal to Expressions (3), (4), (5), and (1) described above, respectively. Accordingly, even in this embodiment, M pieces of element data $P_1$ to $P_M$ may be configured by using N pieces of detection data $S_1$ to $S_N$ similarly to the first embodiment.

Figure 27A:
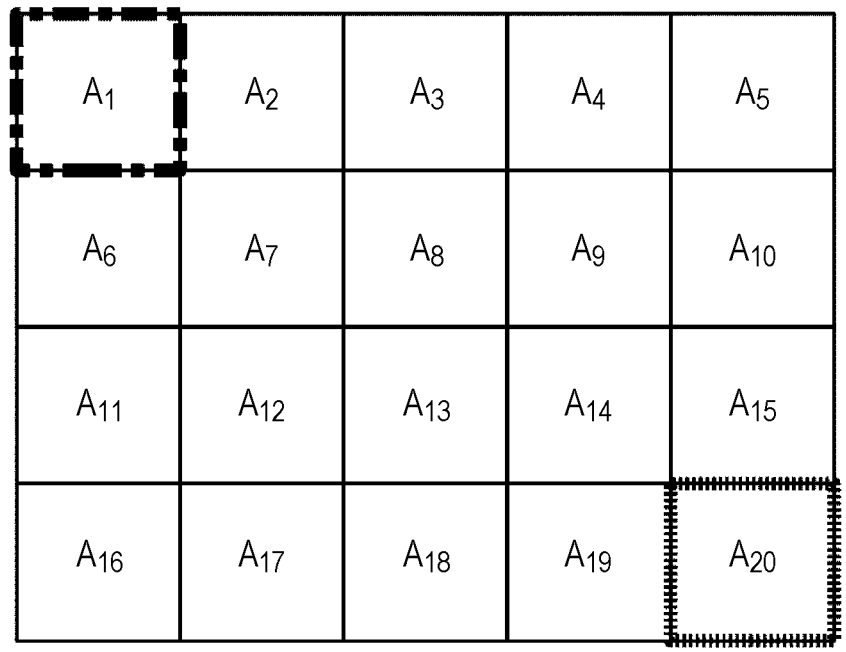
FIGS. 27A and 27B are diagrams illustrating examples of a pattern of electrodes in the input device according to the fourth embodiment, where
Figure 27B:
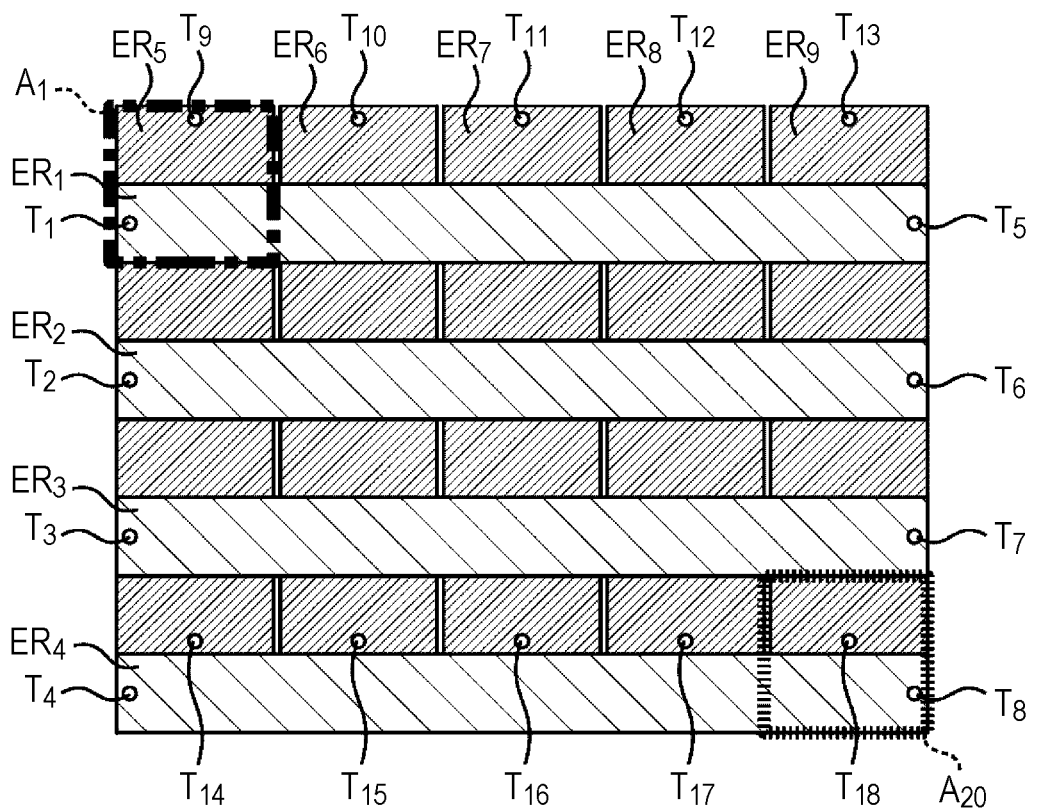
Figure 28A:
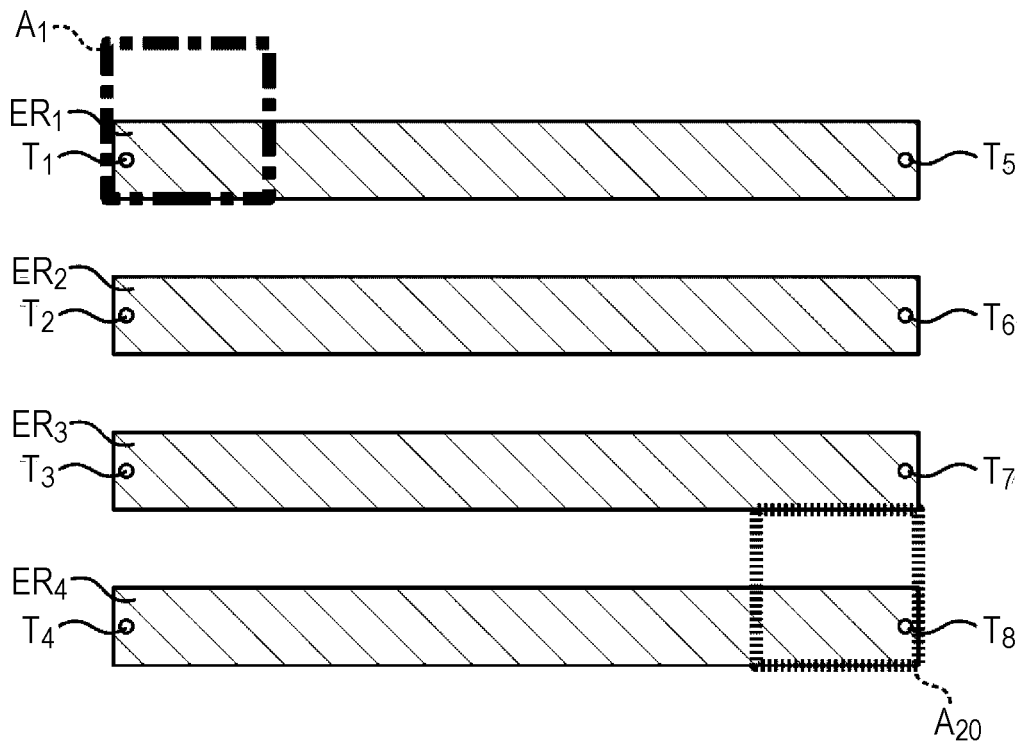
FIGS. 28A and 28B are diagrams illustrating the pattern of electrodes of FIG. 27B in detail, where
Figure 28B:
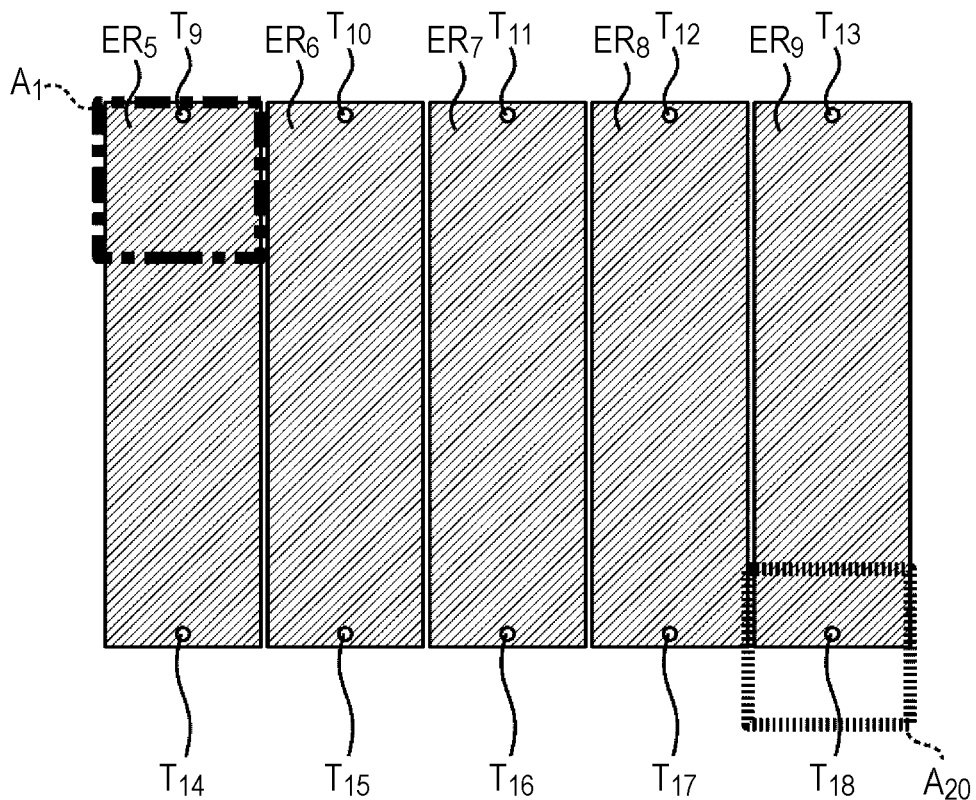

FIGS. 27A and 27B are diagrams illustrating an example of electrode patterns of the input device according to the fourth embodiment. In FIG. 27A, 20 sections ($A_1$ to $A_{20}$) on the operation plane 11 are illustrated, and in FIG. 27B, 9 electrode patterns ($ER_1$ to $ER_9$) which overlap with the individual sections A are illustrated. FIGS. 28A and 28B are diagrams illustrating the electrode patterns ($ER_1$ to $ER_9$) of FIG. 27B in detail. FIG. 28A shows four electrode patterns ($ER_1$ to $ER_4$) formed on an upper layer, and FIG. 28B shows five electrode patterns $ER_5$ to $ER_9$) formed on a lower layer.

The 20 sections $A_1$ to $A_{20}$ of FIG. 27A are arranged in a grid pattern in a matrix of 4 rows by 5 columns similarly to FIG. 22A.

In the example of FIG. 28A, the electrodes $ER_1$ to $ER_4$ are positioned in first to fourth rows in the grid pattern in this order and individually extend from a first column to a fifth column. Rates of areas of the electrodes $ER_1$ to $ER_4$ in each of the sections are all 1/2. The electrodes $ER_1$ to $ER_4$ have terminals $T_1$ to $T_4$, respectively, at its end portions on the first column side, and have terminals $T_5$ to $T_8$, respectively, at its end portions on the fifth column side.

In the example of FIG. 28B, the electrodes $ER_5$ to $ER_9$ are positioned in the first to fifth columns in the grid pattern in this order and extend from the first row to the fourth row. Rates of areas of the electrodes $ER_5$ to $ER_9$ in each of the sections are all 1/2. The electrodes $ER_5$ to $ER_9$ have terminals $T_9$ to $T_{13}$, respectively, at its end portions on the first column side, and have terminals $T_{14}$ to $T_{18}$, respectively, at its end portions on the fourth column side.

As an example, the terminal $T_1$ of the electrode $ER_1$ is focused. The terminal $T_1$ is directly connected to an overlapping portion $ER_{11}$ of the section $A_1$ and the electrode $ER_1$. Therefore, all the partial charge $QP_{11}$ accumulated in the overlapping portion $ER_{11}$ is approximated to be distributed to the terminal $T_1$. Furthermore, the partial charge $QP_{11}$ is half of a combined charge $Q_1$ in accordance with a rate of an area of the overlapping portion $ER_{11}$ in the section $A_1$. Accordingly, constant data $K_{11}$ of the electrode $ER_1$ relative to the section $A_1$ is 1/2.

An overlapping portion $ER_{12}$ in which the section $A_2$ and the electrode $ER_1$ are overlapped with each other is connected to the terminal $T_1$ with one section interposed therebetween and connected to the terminal $T_5$ with three sections interposed therebetween. Therefore, in a partial charge $QP_{12}$ accumulated in the overlapping portion $ER_{12}$, 3/4 of the partial charge $QP_{12}$ is approximated to be distributed to the terminal $T_1$ and 1/4 of the partial charge $QP_{12}$ is approximated to be distributed to the terminal $T_5$. Furthermore, the partial charge $QP_{12}$ is half of a combined charge $Q_2$ in accordance with a rate of an area of the overlapping portion $ER_{12}$ in the section $A_2$. Accordingly, constant data $K_{12}$ of the electrode $ER_1$ relative to the section $A_2$ is 3/8.

An overlapping portion $ER_{13}$ in which the section $A_3$ and the electrode $ER_1$ overlap with each other is connected to the terminal $T_1$ with two sections interposed therebetween and connected to the terminal $T_5$ with two sections interposed therebetween. Therefore, in the partial charge $QP_{13}$ accumulated in the overlapping portion $ER_{13}$, 1/2 of the partial charge $QP_{13}$ is approximated to be distributed to the terminal $T_1$ and 1/2 of the partial charge $QP_{13}$ is approximated to be distributed to the terminal $T_5$. Furthermore, the partial charge $QP_{13}$ is half of a combined charge $Q_3$ in accordance with a rate of an area of the overlapping portion $ER_{13}$ in the section $A_3$. Accordingly, constant data $K_{13}$ of the electrode $ER_1$ relative to the section $A_2$ is 1/4.

An overlapping portion $ER_{14}$ in which the section $A_4$ and the electrode $ER_1$ overlap with each other is connected to the terminal $T_1$ with three sections interposed therebetween and connected to the terminal $T_5$ with one section interposed therebetween. Therefore, in the partial charge $QP_{14}$ accumulated in the overlapping portion $ER_{14}$, 1/4 of the partial charge $QP_{14}$ is approximated to be distributed to the terminal $T_1$ and 3/4 of the partial charge $QP_{14}$ is approximated to be distributed to the terminal $T_5$. Furthermore, the partial charge $QP_{14}$ is half of a combined charge $Q_4$ in accordance with a rate of an area of the overlapping portion $ER_{14}$ in the section $A_4$. Accordingly, constant data $K_{14}$ of the electrode $ER_1$ relative to the section $A_4$ is 1/8.

The terminal $T_5$ is directly connected to an overlapping portion $ER_{15}$ in which the section $A_5$ and the electrode $ER_1$ overlap with each other. Therefore, all the partial charge $QP_{15}$ accumulated in the overlapping portion $ER_{15}$ is approximated to be distributed to the terminal $T_5$. Accordingly, constant data $K_{15}$ of the electrode $ER_1$ relative to the section $A_5$ is zero.

Accordingly, the constant data $K_{11}$, $K_{12}$, $K_{13}$, $K_{14}$, and $K_{15}$ are 1/2, 3/8, 1/4, 1/8, and 0, respectively. By performing the similar calculation, the first conversion matrix K formed by constant data $K_{ij}$ in the matrix of 18 rows by 20 columns may be obtained. The first conversion matrix K is represented by Expression (22).

As described above, even in this embodiment, the element data P larger in number than those of detection data S may be configured by a calculation process simplified similarly to the first embodiment.

Furthermore, according to this embodiment, the plurality of terminals T are disposed for one electrode ER and single detection data S is generated for each terminal T, and therefore, the number of electrodes ER is smaller than the number of detection data S. Accordingly, the sensor unit 10B may be configured simpler.

Note that the present invention is not limited to the foregoing embodiments and includes various modifications. Although a fixed value is used as an initial value of the data configuration process to be repeatedly performed as an example in the foregoing embodiments, the present invention is not limited to this.

Figure 29:
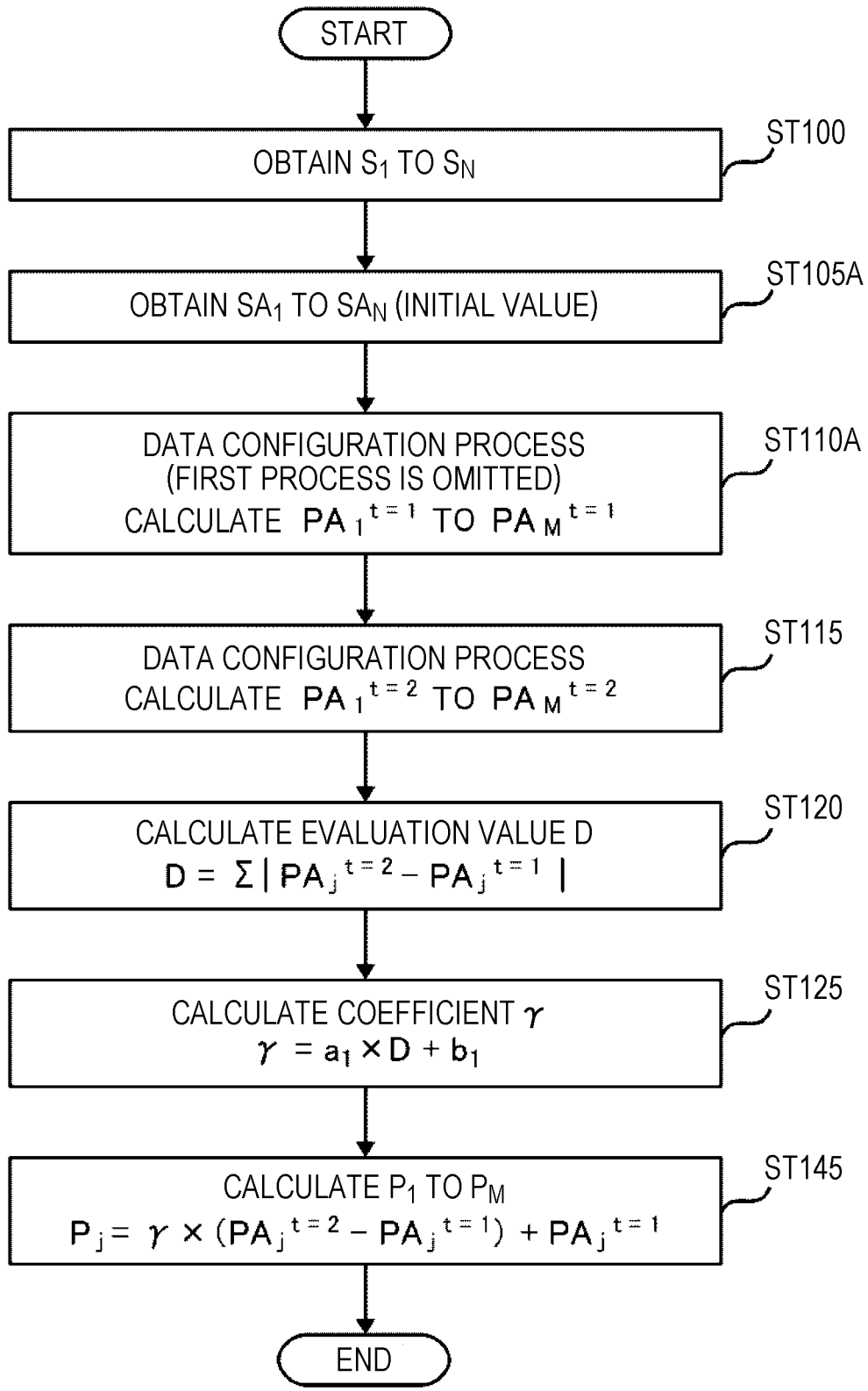
FIG. 29 is a flowchart of a modification of a process of configuring M pieces of element data using N pieces of detection data.

FIG. 29 is a flowchart for explaining a modification of a process of configuring M pieces of element data P from N pieces of detection data S.

Figure 7:
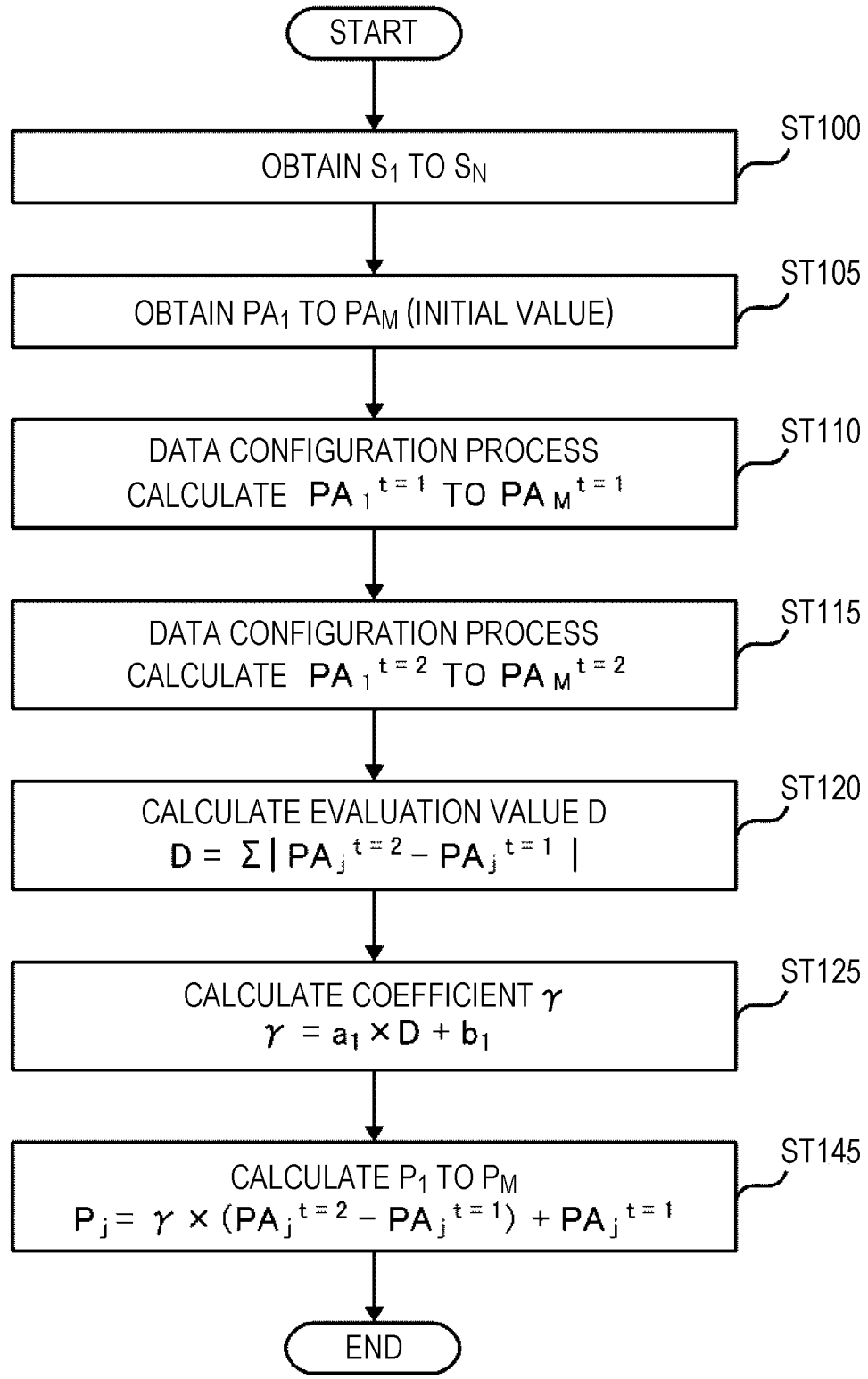
FIG. 7 is a flowchart of an example of a method for configuring M pieces of element data using N pieces of detection data in the input device according to the first embodiment.
Figure 8:
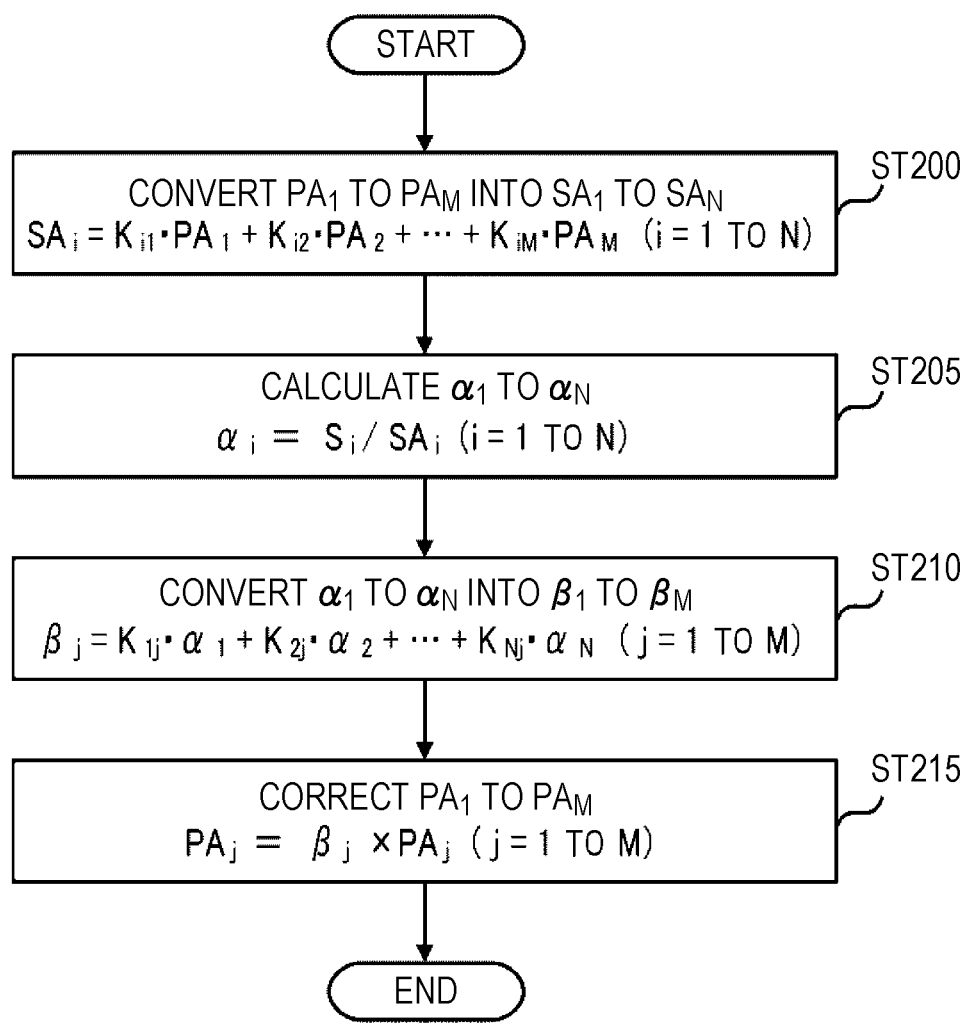
FIG. 8 is a flowchart of an example of a data configuration process.

In the flowchart of FIG. 7, when a first data configuration process (ST110) is performed, temporary values $SA_1$ to $SA_N$ of detection data are calculated by using the temporary values $PA_1$ to $PA_M$ of the element data obtained in step ST105 as initial values. However, as a calculation result is constant all the time independent from the detection data $S_1$ to $S_N$, the calculation may not be performed every time one of the element data $P_1$ to $P_M$ is configured. Therefore, in the flowchart of the modification shown in FIG. 29, a calculation step (the first process) of calculating the temporary values $SA_1$ to $SA_N$ of the detection data is omitted when the first data configuration process (ST110A) is performed.

Specifically, the element data configuration unit 22 does not perform the calculation process (the first process in ST200 of FIG. 8) of calculating the temporary values $SA_1$ to $SA_N$ of the detection data when the first data configuration process (ST110A) is performed, but obtains the temporary values $SA_1$ to $SA_N$ of the detection data from the storage unit 30 or the like as initial values (ST105A). When a second data configuration process (ST115) is performed, the element data configuration unit 22 calculates the temporary values $SA_1$ to $SA_N$ of the detection data based on the temporary values $PA_1$ to $PA_M$ of the element data corrected by the preceding data configuration process (ST110A) (the first process).

In this way, a processing speed may be improved by omitting the calculation step (the first process) of calculating the temporary values $SA_1$ to $SA_N$ of the detection data when the first data configuration process is performed (ST110A).

Figure 30:
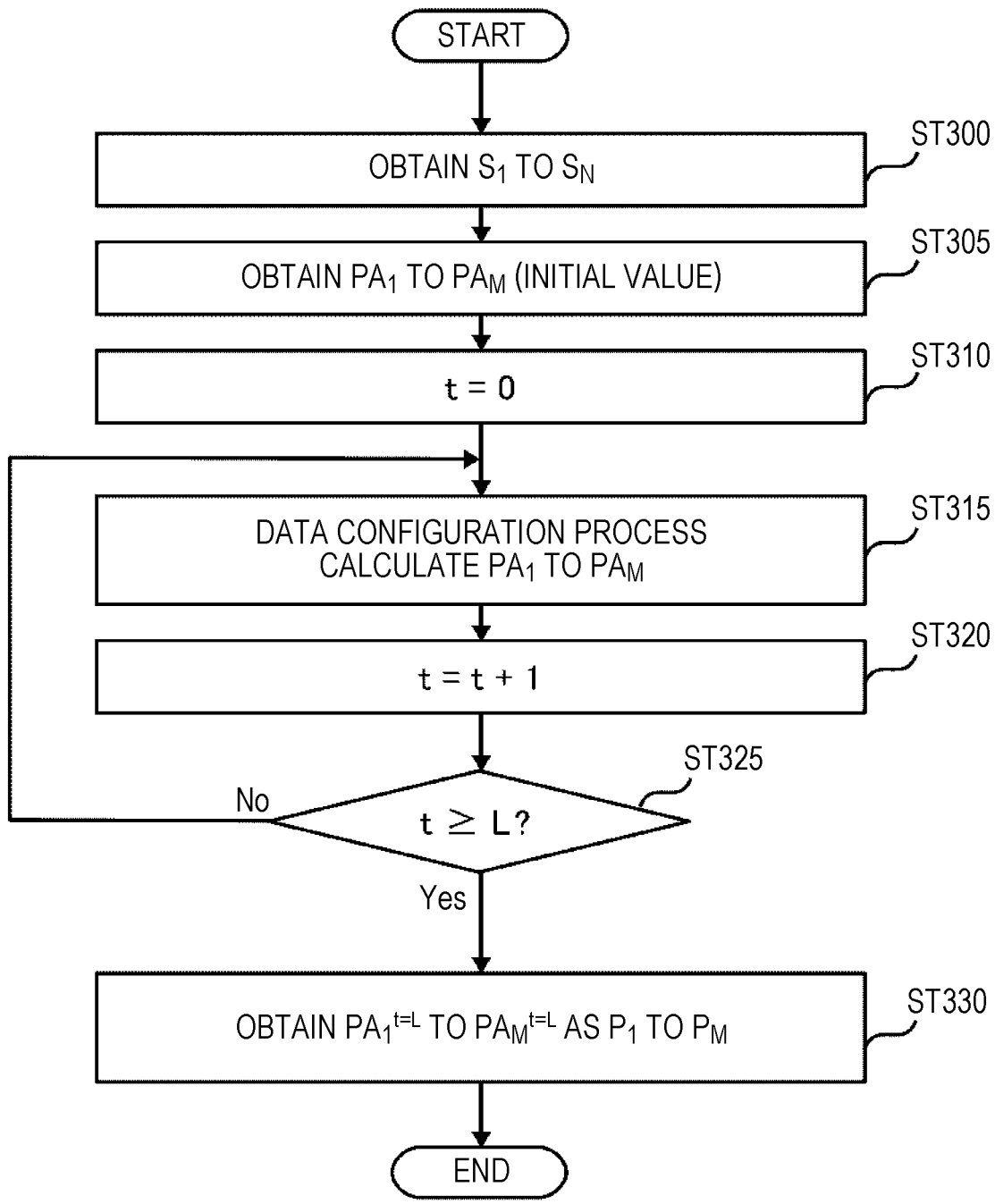
FIG. 30 is a flowchart of another modification of a process of configuring M pieces of element data from N pieces of detection data.

FIG. 30 is a flowchart for explaining another modification of a process of configuring M pieces of element data P from N pieces of detection data S.

Although estimation values are calculated as results of a data configuration process performed a plurality of times by using results of the data configuration process performed twice in the foregoing embodiment, an error may be increased when a value of the detection data S is small or the like. In this case, accuracy of definite values of the element data $P_1$ to $P_M$ may be enhanced by repeatedly performing the data configuration process many times (L times) according to the process of the flowchart in FIG. 30. Step ST300 to step ST305 in the flowchart of FIG. 30 are the same as step ST100 to step ST105 shown in the flowchart of FIG. 7. The element data configuration unit 22 repeatedly performs the data configuration process (FIG. 8) L times in accordance with the process from step ST310 to step ST325. The element data configuration unit 22 obtains the temporary values $PA_1$ to $PA_M$ of the element data obtained by the data configuration process performed L times as definite values of the element data $P_1$ to $P_M$ (ST330).

What is claimed is:

1. An input device which inputs information corresponding to proximity of an object to an operation plane, the input device comprising:
    a sensor unit configured to detect a degree of proximity of the object in one or more detection regions on the operation plane, generate one or more pieces of detection data corresponding to a result of the detection for each detection region, and generate N pieces of detection data as a whole; and
    an element data configuration unit configured to configure, based on the N pieces of detection data, M pieces of element data indicating degrees of proximity of the object in each of M sections (M is a natural number larger than N) which virtually divide the operation plane,
    wherein M is a natural number larger than N,
    each of the M sections has at least one overlapping portion which overlaps with any one of the one or more detection regions,
    each of the M pieces of element data is a sum of partial element data distributed to each of the N pieces of detection data in predetermined rates,
    each of the N pieces of detection data is approximated to a sum of the partial element data individually distributed from each of the M pieces of element data in the predetermined rates, and
    the element data configuration unit
        calculates each of temporary values of the N pieces of detection data as sums of the partial element data distributed from each of temporary values of the M pieces of element data in the predetermined rates and repeatedly performs a data configuration process of correcting the temporary values of the M pieces of element data at least twice based on N pieces of the predetermined rates set for each of the M pieces of element data so that the calculated temporary values of the N pieces of detection data are approximated to the N pieces of detection data, calculates, based on two temporary values obtained by the data configuration process performed twice on each of the M pieces of element data, a coefficient having an absolute value which becomes small as a difference between the two temporary values in each of the element data becomes large, and calculates, for each of the M sections, a sum of a value obtained by multiplying a difference between a first temporary value of the element data obtained by a first data configuration process and a second temporary value of the element data obtained by a second data configuration process by the coefficient and the first temporary value as an estimation value of the element data obtained by repeatedly performing the data configuration process.

2. The input device according to claim 1, wherein the element data configuration unit calculates an evaluation value corresponding to a difference degree between the two temporary values of each of the M pieces of element data, and obtains a value of a predetermined function using the evaluation value as a variable as the coefficient.

3. The input device according to claim 2, wherein the evaluation value is increased as the difference degree of the two temporary values of each of the M pieces of element data is increased, and in the predetermined function, an absolute value of a derivative in a range in which the evaluation value is smaller than a threshold value is larger than an absolute value of a derivative in a range in which the evaluation value is larger than the threshold value.

4. The input device according to claim 2, wherein the difference degree is an absolute value of a difference between the two temporary values, and the element data configuration unit calculates the evaluation value according to a sum of the M difference degrees corresponding to the M pieces of element data.

5. The input device according to claim 4, wherein the predetermined function is a linear function having a negative inclination.

6. The input device according to claim 5, wherein the evaluation value is increased as the difference degree of the two temporary values of each of the M pieces of element data is increased, and in the predetermined function, an absolute value of an inclination in a range in which the evaluation value is smaller than a threshold value is larger than an absolute value of an inclination in a range in which the evaluation value is larger than the threshold value.

7. The input device according to claim 2, wherein the evaluation value is changed in accordance with the relative positional relationship between a plurality of objects approaching the operation plane.

8. The input device according to claim 1, wherein the two temporary values are the first and second temporary values.

9. The input device according to claim 1, wherein the first temporary values are temporary values of the element data obtained by the first data configuration process, and the second temporary values are temporary values of the element data obtained by the second data configuration process.

10. The input device according to claim 1, wherein the data configuration process includes a first process of converting temporary values of the M pieces of element data into temporary values of the N pieces of detection data based on the N predetermined rates set to each of the M pieces of element data, a second process of calculating N first coefficients indicating magnifications by which temporary values of the N pieces of detection data are to be multiplied so that the temporary values of the N pieces of detection data become equal to the N pieces of detection data, a third process of converting the N first coefficients into M second coefficients indicating magnifications by which the M pieces of element data are to be multiplied based on the N predetermined rates set to each of the M pieces of element data, and a fourth process of correcting the temporary values of the M pieces of element data based on the M second coefficients.

11. The input device according to claim 10, wherein the element data configuration unit converts, in the first process, a matrix having temporary values of the M pieces of element data as components into a matrix having temporary values of the N pieces of detection data as components based on a first conversion matrix including M×N components corresponding to the M pieces of element data and the N pieces of detection data, one component corresponding to the predetermined rate associated with the single partial element data distributed to the single detection data from the single element data.

12. The input device according to claim 10, wherein the element data configuration unit converts, in the third process, a matrix having the N first coefficients as components into a matrix having the M second coefficients as components based on a second conversion matrix including M×N components corresponding to the M pieces of element data and the N pieces of detection data, one component corresponding to the predetermined rate associated with the single partial element data distributed to the single detection data from the single element data.

13. The input device according to claims 10, wherein the element data configuration unit omits the first process but performs the second process using predetermined N initial values as temporary values of the N pieces of detection data in the first data configuration process.

14. The input device according to claims 10, wherein in the first data configuration process, the element data configuration unit performs the first process using M initial values based on at least a group of M pieces of element data which has been just configured as temporary values of the M pieces of element data.

15. The input device according to claims 1, wherein the sensor unit includes

N electrodes formed in the respectively different detection regions, and an electrostatic capacitance detection unit configured to generate detection data corresponding to first electrostatic capacitances in portions between an object approaching the operation plane and the electrodes for each of the N electrodes, the single partial element data is approximated to a second electrostatic capacitance generated between an overlapping portion of the single electrode in the single section and the object, and the single element data is approximated to a third electrostatic capacitance obtained by combining all the second electrostatic capacitances in the single section.

16. The input device according to claim 15, wherein each of the predetermined rates has a value corresponding to a rate of an area of an overlapping portion of a corresponding one of the electrodes in a corresponding one of the sections to an area of overlapping portions of all the electrodes in the corresponding one of the sections.

17. The input device according to claims 1, wherein the sensor unit includes a plurality of electrodes which are formed in the respectively different detection regions and which have N terminals as a whole, each of the electrodes having a plurality of terminals, and an electrostatic capacitance detection unit configured to input charges to be accumulated in portions between an object approaching the operation plane and the electrodes from the N terminals respectively and generate the detection data corresponding to electrostatic capacitances between the object and the electrodes for each of the N terminals based on the input charges, the electrostatic capacitance detection unit simultaneously inputs the charges accumulated in the single electrode from the plurality of terminals disposed in the electrode, by the simultaneous input, partial charges accumulated in portions between an overlapping portion of the single electrode in the single section and the object are distributed to each of the plurality of terminals as distribution charges in accordance with conductance in a range from the overlapping portion to the plurality of terminals, the single partial element data is approximated to the distribution charge distributed to the single terminal by the simultaneous input, and the single element data is approximated to a combined charge obtained by combining all the partial charges accumulated in the overlapping portions of all the electrodes in the single section.

18. The input device according to claim 17, wherein one of the predetermined rates has a value corresponding to a rate of an area of an overlapping portion of the single electrode in the single section to an area of overlapping portions of all the electrodes in the single section, and a rate of conductance in a range from one of the terminals in the single electrode to the overlapping portion to conductance in a range from all the terminals in the single electrode to the overlapping portion.

19. An element data configuration method which causes an input device including a sensor unit which detects degrees of proximity of an object in a plurality of different detection regions on an operation plane and generates N pieces of detection data in accordance with a result of the detection to configure M pieces of element data indicating degrees of proximity of the object in each of M sections (M is a natural number larger than N) which virtually divide the operation plane based on the N pieces of detection data, wherein M is a natural number larger than N, each of the M sections has at least one overlapping portion which overlaps with any one of the one or more detection regions, each of the M pieces of element data is a sum of partial element data distributed to each of the N pieces of detection data in predetermined rates, each of the N pieces of detection data is approximated to a sum of the partial element data distributed from each of the M pieces of element data in the predetermined rates, the element data configuration method includes:

calculating respective temporary values of the N pieces of detection data as sums of the partial element data distributed from each of temporary values of the M pieces of element data in the predetermined rates and repeatedly performing a data configuration process of correcting the temporary values of the M pieces of element data at least twice based on N pieces of the predetermined rates set for each of the M pieces of element data so that the calculated temporary values of the N pieces of detection data approximate the N pieces of detection data;

calculating a coefficient having an absolute value which becomes smaller as a difference between the two temporary values in each of the element data becomes larger based on the two temporary values obtained by the data configuration process performed twice for each of the M pieces of element data; and calculating, for each of the M sections, a sum of a value obtained by multiplying a difference between a first temporary value of the element data obtained by a first data configuration step and a second temporary value of the element data obtained by a second data configuration step by the coefficient and the first temporary value as an estimation value of the element data obtained by repeatedly performing the data configuration process.

20. A program that causes a computer to execute the element data configuration method set forth in claim 19.

* * * * *